(12) United States Patent
Oteri et al.

(10) Patent No.: US 11,191,104 B2
(45) Date of Patent: *Nov. 30, 2021

(54) SYSTEMS AND METHODS FOR FRACTIONAL CARRIER SENSE MULTIPLE ACCESS WITH COLLISION AVOIDANCE (CSMA/CA) FOR WLANS

(71) Applicant: InterDigital Patent Holdings, Inc., Wilmington, DE (US)

(72) Inventors: Oghenekome Oteri, San Diego, CA (US); Hanging Lou, Syosset, NY (US); Monisha Ghosh, Chicago, IL (US); Robert L. Olesen, Huntington, NY (US); Frank La Sita, Setauket, NY (US); Xiaofei Wang, Cedar Grove, NJ (US); Pengfei Xia, San Diego, CA (US); Nirav B. Shah, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/895,775

(22) Filed: Jun. 8, 2020

(65) Prior Publication Data

US 2020/0367286 A1 Nov. 19, 2020

Related U.S. Application Data

(63) Continuation of application No. 15/980,665, filed on May 15, 2018, now Pat. No. 10,681,734, which is a (Continued)

(51) Int. Cl.
*H04W 74/08* (2009.01)
*H04W 4/08* (2009.01)
(Continued)

(52) U.S. Cl.
CPC ......... *H04W 74/0816* (2013.01); *H04W 4/08* (2013.01); *H04W 24/02* (2013.01); *H04W 64/00* (2013.01); *H04W 84/12* (2013.01)

(58) Field of Classification Search
None
See application file for complete search history.

(56) References Cited

U.S. PATENT DOCUMENTS 10,015,821 B2 * 7/2018 Oteri ................ H04W 74/0816
10,681,734 B2 * 6/2020 Oteri ................ H04W 72/0426
(Continued)

FOREIGN PATENT DOCUMENTS

CN 102239717 11/2011
GB 2 490 963 11/2012
(Continued)

OTHER PUBLICATIONS

3rd Generation Partnership Project (3GPP), R1-072714, "Uplink Inter-Cell Interference Management for LTE," Sharp, 3GPP TSG RAN WG1 Meeting #49bis, Orlando, Florida, USA, 11 pages (Jun. 25-29, 2007).

(Continued)

*Primary Examiner* — Bunjob Jaroenchonwanit
(74) *Attorney, Agent, or Firm* — Volpe Koenig

(57) ABSTRACT

Systems, methods, and instrumentalities are described to implement an interference management method in WLAN. An access point (AP) or an inter-BSS coordinator (IBC) may identify a station (STA) associated with a first basic service set (BSS) as an edge STA or a non-edge STA. The AP or the IBC may group the edge STA into an edge group and a non-edge STA into a non-edge group. The AP or the IBC may receive information associated with a second BSS. The AP or the IBC may coordinate access of the edge group and/or the non-edge group. The access may be coordinated (Continued)

to minimize interference of the edge STA. The access may be based at least on the received information associated with the second BSS. The AP or the IBC may adjust transmit power of a plurality of STAs identified as edge group STAs and non-edge group STAs.

14 Claims, 25 Drawing Sheets

Related U.S. Application Data continuation of application No. 14/888,274, filed as application No. PCT/US2014/036610 on May 2, 2014, now Pat. No. 10,015,821.

(60) Provisional application No. 61/819,233, filed on May 3, 2013, provisional application No. 61/877,575, filed on Sep. 13, 2013.

(51) Int. Cl.
*H04W 24/02* (2009.01)
*H04W 64/00* (2009.01)
*H04W 84/12* (2009.01)

(56) References Cited

U.S. PATENT DOCUMENTS

| | | | |
|---|---|---|---|
| 2006/0121928 A1* | 6/2006 | Itsuki | H04W 52/08 455/522 |
| 2008/0063106 A1 | 3/2008 | Hahm et al. | |
| 2008/0144493 A1* | 6/2008 | Yeh | H04W 74/0816 370/230 |
| 2010/0329365 A1* | 12/2010 | Li | H04L 5/0007 375/259 |
| 2011/0090885 A1* | 4/2011 | Safavi | H04W 52/244 370/338 |
| 2011/0158118 A1 | 6/2011 | Chou et al. | |
| 2011/0205929 A1 | 8/2011 | Quek et al. | |
| 2011/0223962 A1* | 9/2011 | Kuwahara | H04W 16/30 455/522 |
| 2012/0044815 A1* | 2/2012 | Geirhofer | H04W 72/082 370/248 |
| 2012/0243431 A1* | 9/2012 | Chen | H04W 72/0406 370/252 |
| 2013/0034091 A1 | 2/2013 | Kim et al. | |
| 2013/0159458 A1* | 6/2013 | Yu | H04L 67/10 709/217 |
| 2013/0230028 A1* | 9/2013 | Calcev | H04W 72/1231 370/336 |
| 2013/0294347 A1* | 11/2013 | Das | H04L 1/0088 370/328 |
| 2014/0243002 A1* | 8/2014 | Muruganathan | H04W 72/0426 455/450 |
| 2014/0301383 A1* | 10/2014 | Sohn | H04B 7/0452 370/338 |
| 2015/0319724 A1* | 11/2015 | Chae | H04W 8/005 370/315 |
| 2016/0021577 A1 | 1/2016 | Du et al. | |
| 2016/0081010 A1 | 3/2016 | Seok | |

FOREIGN PATENT DOCUMENTS

| | | |
|---|---|---|
| WO | 2010/050899 | 5/2010 |
| WO | 2012/015698 | 2/2012 |
| WO | 2012160474 A1 | 11/2012 |

OTHER PUBLICATIONS

3rd Generation Partnership Project (3GPP), R1-083690, "Resource Management Cooperation Scheme for CoMP," Hitachi, Ltd., 3GPP TSG RAN WG1 #54bis, Prague, Czech Republic, 4 pages (Sep. 29-Oct. 3, 2008).
Costa et al., "Review of Overlapping 802.11 Networks (OBSS) Status and IEEE 802.11 Solutions," IEEE 802.11-12/936r0, 13 pages (Jul. 2012).
De Vegt, "Potential Compromise for 802.11ah Use Case Document," IEEE 802.11-11/0457r0, 27 pages (Mar. 2011).
Fraimis et al., "A Distributed Radio Resource Allocation Algorithm with Interference Coordination for Multi-Cell OFDMA Systems," $21^{st}$ Annual IEEE International Symposium on Personal, Indoor, and Mobile Radio Communications, pp. 1354-1359 (2010).
Ghosh et al., "Restricted Access Window Signaling for Uplink Channel Access," IEEE 802.11-12/0843r0, 13 pages (Jul. 2012).
Holma et al., "WCDMA for UMTS: HSPA Evolution and LTE," $5^{th}$ edition, Nokia Siemens Network, Finland, 18 pages (pp. 55-57, 220-232) (2010).
IEEE P802.11ac/D1.0, Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Enhancements for Very High Throughput for Operation in Bands below 6GHz, IEEE P802.11ac/D1.0 (May 2011).
IEEE P802.11ac/D4.1, Draft Standard for Information Technology—Telecommunications and information exchange between systems—Local and metropolitan area networks—Specific requirements; Part 11: Wireless LAN Medium Access Control (MAC) and Physical Layer (PHY) specifications, Amendment 4: Enhancements for Very High Throughput for Operation in Bands below 6 GHz, IEEE P802.11ac/D4.1 (Jan. 2013).
IEEE P802.11af/D4.0, Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: TV White Spaces Operation, IEEE P802.11af/D4.0 (Apr. 2013).
IEEE P802.11ah/D1.0, Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation, IEEE P802.11ah/D0.1 (May 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Std 802.11ac-2013, IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE, "Part 11, Wireless LAN Medium Access Control (MAC) and Physical Layer (PHY) specifications, Amendment 3: Enhancements for Very High Throughput in the 12 60 GHz Band," IEEE 802.11ad-2012 (Dec. 2012).
Kraemer, "P802.11 High Efficiency WLAN (HEW) Study Group Press Release," IEEE 802.11-13/385r2 (Mar. 2013).
Lin et al., "Saturation Throughput of IEEE 802.11e EDCA based on Mean Value Analysis," IEEE Wireless Communications and Networking Conference, pp. 475-480 (2006).
Liu et al., "Interference-Aware Transmission Power Control for Dense Wireless Networks," in Proceedings of the Annual Conference of ITA, 7 pages (2007).

(56) References Cited

OTHER PUBLICATIONS

Liu et al., "Open-Link Loop Margin Index for Fast Link Adaptation," IEEE 802.11-12/0645, 11 pages (May 2012).
Marinier et al., "Power Control in 802.11 Wireless LANs," IEEE Vehicular Technology Conference, pp. 1-5 (Sep. 2006).
Park, "Proposed Specification Framework for TGah," IEEE P802.11 Wireless LANs, IEEE 802.11-11/1137r13, 58 pages (Jan. 2013).
Perahia et al., "Next Generation Wireless LANs-Throughput, Robustness, and Reliability in 802.11n," Cambridge University Press, 410 pages (2008).
Porat et al., "TGah Channel Model-Proposed Text," IEEE 802.11-11-0968r3.
Qiao et al., "Interference Analysis and Transmit Power Control in IEEE 802.11a/h Wireless LANs," IEEE/ACM Transactions on Networking, vol. 15, No. 5, 14 pages (Oct. 2007).
Sesia et al., "LTE—The UMTS Long Term Evolution, From Theory to Practice," $2^{nd}$ edition, Wiley, 794 pages (2011).
Wang et al., "Overlapping IEEE 802.11ah Networks of Different Types," IEEE 802.11-12/0619r3, 11 pages (May 12, 2012).

\* cited by examiner

FIG. 5

SYSTEMS AND METHODS FOR FRACTIONAL CARRIER SENSE MULTIPLE ACCESS WITH COLLISION AVOIDANCE (CSMA/CA) FOR WLANS

CROSS REFERENCE TO RELATED APPLICATIONS

This application is a continuation of U.S. patent application Ser. No. 15/980,665, filed May 15, 2018, which is a continuation of U.S. patent application Ser. No. 14/888,274, filed Oct. 30, 2015, and issued as U.S. Pat. No. 10,015,821 on Jul. 3, 2018, which is the National Stage Entry under 35 U.S.C. § 371 of Patent Cooperation Treaty Application No. PCT/US2014/036610 filed May 2, 2014, which claims the benefit of U.S. Provisional Application Nos. 61/819,233 filed on May 3, 2013, and 61/877,575 filed on Sep. 13, 2013, the contents of which are hereby incorporated by reference herein.

BACKGROUND

Wireless networks (e.g., IEEE 802.11 based networks) may be deployed in dense environments (e.g., mesh networks). The high-density deployments of such networks may result in overlap of basic service sets (BSSs). Simultaneous transmission from multiple access points (APs) and stations (STAs) in such deployments may cause heavy collisions, which may result in excessive management traffic, and reduction of throughput. Techniques used to mitigate interference in such deployments may be inadequate.

SUMMARY

Systems, methods, and instrumentalities are described to implement interference management in a Wireless Local Area Network (WLAN). An access point (AP) or an inter-BSS coordinator (IBC) may receive an information element (IE) indicating fractional carrier sense multiple access with collision avoidance (F-CSMA/CA) support. The IE may be received via one of a control frame, a management frame, or an extension frame. The AP or the IBC may identify a station (STA) associated with a first basic service set (BSS) as an edge STA or a non-edge STA. The STA may be identified as the edge STA or the non-edge STA, for example, using one or more of a path loss from an AP to the STA, physical or geographic location of the STA, information received from the STA, or information received from a central IBC.

The AP or the IBC may group the edge STA into an edge group and a non-edge STA into a non-edge group. The AP or the IBC may receive information associated with a second BSS. The information received from the STA may include a difference between a received signal strength indication (RSSI) of the AP at the STA and a next strongest AP at the STA.

The AP or the IBC may coordinate access of the edge group and/or the non-edge group. The access may be coordinated to minimize interference of the edge STA associated with the first BSS. The coordinating access may include coordinating timing between groups associated with the first BSS and the second BSS. The access may be based at least on the received information associated with the second BSS.

The AP or the IBC may adjust transmit power of a plurality of stations (STAs) associated with the first BSS by limiting a maximum power of the plurality of STAs to a worst STA. The plurality of STAs may include a STA identified as non-edge STA and at least one STA identified as edge STA.

One or more STAs in one or more edge groups may be orthogonal. For example, a first station associated with a first edge group may be orthogonal to a second station associated with a second edge group. The orthogonality between the first station and the second station is partial or full.

BRIEF DESCRIPTION OF THE DRAWINGS

A more detailed understanding may be had from the following description, given by way of example in conjunction with the accompanying drawings.

FIG. 5 illustrates an example of full and partial orthogonality of one or more groups.

DETAILED DESCRIPTION

A detailed description of illustrative embodiments will now be described with reference to the various figures. Although this description provides a detailed example of possible implementations, it should be noted that the details are intended to be exemplary and in no way limit the scope of the application.

Figure 1:
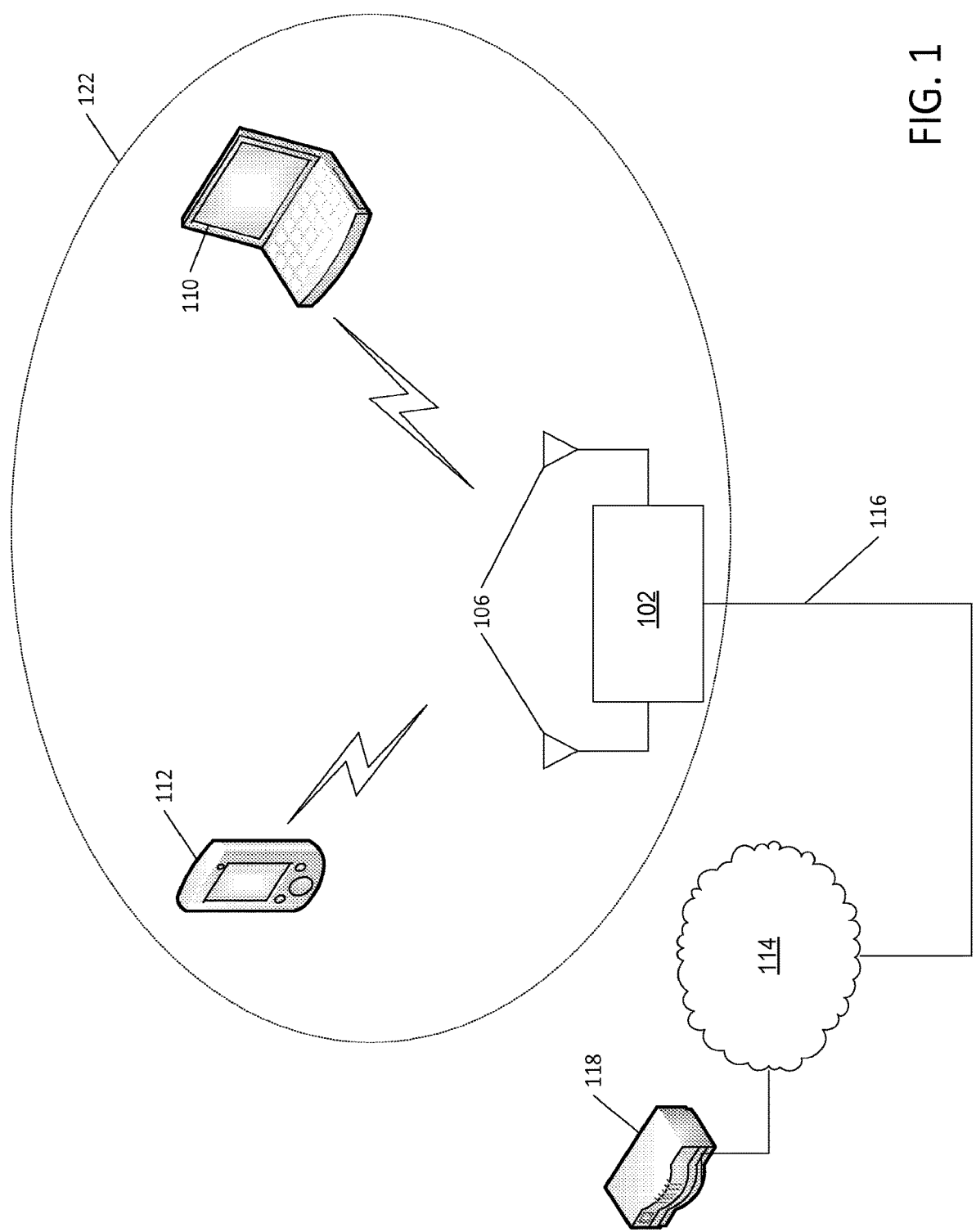
FIG. 1 illustrates an example of Wireless Local Area Network (WLAN) devices.

FIG. 1 illustrates exemplary wireless local area network (WLAN) devices. The WLAN may include, but is not limited to, access point (AP) 102, station (STA) 110, and STA 112. STA 110 and 112 may be associated with AP 102. The WLAN may be configured to implement one or more protocols of the IEEE 802.11 communication standard, which may include a channel access scheme, such as DSSS, OFDM, OFDMA, etc. A WLAN may operate in a mode, e.g., an infrastructure mode, an ad-hoc mode, etc.

A WLAN operating in an infrastructure mode may comprise one or more APs communicating with one or more associated STAs. An AP and STA(s) associated with the AP may comprise a basic service set (BSS). For example, AP 102, STA 110, and STA 112 may comprise BSS 122. An extended service set (ESS) may comprise one or more APs (with one or more BSSs) and STA(s) associated with the APs. An AP may have access to, and/or interface to, distribution system (DS) 116, which may be wired and/or wireless and may carry traffic to and/or from the AP. Traffic to a STA in the WLAN originating from outside the WLAN may be received at an AP in the WLAN, which may send the traffic to the STA in the WLAN. Traffic originating from a STA in the WLAN to a destination outside the WLAN, e.g., to server 118, may be sent to an AP in the WLAN, which may send the traffic to the destination, e.g., via DS 116 to network 114 to be sent to server 118. Traffic between STAs within the WLAN may be sent through one or more APs. For example, a source STA (e.g., STA 110) may have traffic intended for a destination STA (e.g., STA 112). STA 110 may send the traffic to AP 102, and, AP 102 may send the traffic to STA 112.

A WLAN may operate in an ad-hoc mode. The ad-hoc mode WLAN may be referred to as independent basic service set (IBSS). In an ad-hoc mode WLAN, the STAs may communicate directly with each other (e.g., STA 110 may communicate with STA 112 without such communication being routed through an AP).

IEEE 802.11 devices (e.g., IEEE 802.11 APs in a BSS) may use beacon frames to announce the existence of a WLAN network. An AP, such as AP 102, may transmit a beacon on a channel, e.g., a fixed channel, such as a primary channel. A STA may use a channel, such as the primary channel, to establish a connection with an AP.

STA(s) and/or AP(s) may use a Carrier Sense Multiple Access with Collision Avoidance (CSMA/CA) channel access mechanism. In CSMA/CA a STA and/or an AP may sense the primary channel. For example, if a STA has data to send, the STA may sense the primary channel. If the primary channel is detected to be busy, the STA may back off. For example, a WLAN or portion thereof may be configured so that one STA may transmit at a given time, e.g., in a given BSS. Channel access may include RTS and/or CTS signaling. For example, an exchange of a request to send (RTS) frame may be transmitted by a sending device and a clear to send (CTS) frame that may be sent by a receiving device. For example, if an AP has data to send to a STA, the AP may send an RTS frame to the STA. If the STA is ready to receive data, the STA may respond with a CTS frame. The CTS frame may include a time value that may alert other STAs to hold off from accessing the medium while the AP initiating the RTS may transmit its data. On receiving the CTS frame from the STA, the AP may send the data to the STA.

A device may reserve spectrum via a network allocation vector (NAV) field. For example, in an IEEE 802.11 frame, the NAV field may be used to reserve a channel for a time period. A STA that wants to transmit data may set the NAV to the time for which it may expect to use the channel. When a STA sets the NAV, the NAV may be set for an associated WLAN or subset thereof (e.g., a BSS). Other STAs may count down the NAV to zero. When the counter reaches a value of zero, the NAV functionality may indicate to the other STA that the channel is now available.

The devices in a WLAN, such as an AP or STA, may include one or more of the following: a processor, a memory, a radio receiver and/or transmitter (e.g., which may be combined in a transceiver), one or more antennas (e.g., antennas 106 in FIG. 1), etc. A processor function may comprise one or more processors. For example, the processor may comprise one or more of: a general purpose processor, a special purpose processor (e.g., a baseband processor, a MAC processor, etc.), a digital signal processor (DSP), Application Specific Integrated Circuits (ASICs), Field Programmable Gate Array (FPGAs) circuits, any other type of integrated circuit (IC), a state machine, and the like. The one or more processors may be integrated or not integrated with each other. The processor (e.g., the one or more processors or a subset thereof) may be integrated with one or more other functions (e.g., other functions such as memory). The processor may perform signal coding, data processing, power control, input/output processing, modulation, demodulation, and/or any other functionality that may enable the device to operate in a wireless environment, such as the WLAN of FIG. 1. The processor may be configured to execute processor executable code (e.g., instructions) including, for example, software and/or firmware instructions. For example, the processor may be configured to execute computer readable instructions included on one or more of the processor (e.g., a chipset that includes memory and a processor) or memory. Execution of the instructions may cause the device to perform one or more of the functions described herein.

A device may include one or more antennas. The device may employ multiple input multiple output (MIMO) techniques. The one or more antennas may receive a radio signal. The processor may receive the radio signal, e.g., via the one or more antennas. The one or more antennas may transmit a radio signal (e.g., based on a signal sent from the processor).

The device may have a memory that may include one or more devices for storing programming and/or data, such as processor executable code or instructions (e.g., software, firmware, etc.), electronic data, databases, or other digital information. The memory may include one or more memory units. One or more memory units may be integrated with one or more other functions (e.g., other functions included in the device, such as the processor). The memory may include a read-only memory (ROM) (e.g., erasable programmable read only memory (EPROM), electrically erasable programmable read only memory (EEPROM), etc.), random access memory (RAM), magnetic disk storage media, optical storage media, flash memory devices, and/or other non-transitory computer-readable media for storing information. The memory may be coupled to the processor. The processor may communicate with one or more entities of memory, e.g., via a system bus, directly, etc.

In IEEE 802.11n, High Throughput (HT) STAs may use a 40 MHz wide channel for communication. This may be achieved, for example, by combining the primary 20 MHz channel, with an adjacent 20 MHz channel to form a 40 MHz wide contiguous channel.

In IEEE 802.11ac, very high throughput (VHT) STAs may support 20 MHz, 40 MHz, 80 MHz, and/or 160 MHz wide channels. The 40 MHz, and 80 MHz, channels may be formed, e.g., by combining contiguous 20 MHz channels. A 160 MHz channel may be formed, for example, by combining eight contiguous 20 MHz channels, or by combining two non-contiguous 80 MHz channels (e.g., referred to as an 80+80 configuration). For the 80+80 configuration, the data, after channel encoding, may be passed through a segment parser that may divide it into two streams. Inverse fast Fourier transform (IFFT), and time domain, processing may be done on each stream separately. The streams may be mapped on to the two channels, and the data may be transmitted. At the receiver, this mechanism may be reversed, and the combined data may be sent to the MAC.

IEEE 802.11af and IEEE 802.11ah may support sub 1 GHz modes of operation. For these specifications the channel operating bandwidths may be reduced relative to those used in IEEE 802.11n, and IEEE 802.11ac. IEEE 802.11af may support 5 MHz, 10 MHz and/or 20 MHz bandwidths in the TV White Space (TVWS) spectrum, and IEEE 802.11ah may support 1 MHz, 2 MHz, 4 MHz, 8 MHz, and/or 16 MHz bandwidths, e.g., using non-TVWS spectrum. IEEE 802.11ah may support Meter Type Control (MTC) devices in a macro coverage area. MTC devices may have capabilities including, for example, support for limited bandwidths, and a requirement for a very long battery life.

In WLAN systems that may support multiple channels, and channel widths, e.g., IEEE 802.11n, IEEE 802.11ac, IEEE 802.11af, and/or IEEE 802.11ah, may include a channel, which may be designated as the primary channel. The primary channel may have a bandwidth that may be equal to the largest common operating bandwidth supported by the STAs in the BSS. The bandwidth of the primary channel may be limited by a STA operating in a BSS that may support the smallest bandwidth operating mode. For example, in IEEE 802.11ah, the primary channel may be 1 MHz wide, if there may be STAs (e.g., MTC type devices) that may support a 1 MHz mode even if the AP, and other STAs in the BSS, may support a 2 MHz, 4 MHz, 8 MHz, 16 MHz, or other channel bandwidth operating modes. The carrier sensing, and NAV settings, may depend on the status of the primary channel. If the primary channel is busy, for example, due to a STA supporting a 1 MHz operating mode transmitting to the AP, the available frequency bands may be considered busy even though majority of the bands may stay idle and available.

In the United States, for example, the available frequency bands that may be used by IEEE 802.11ah may be from 902 MHz to 928 MHz. In Korea, for example, it may be from 917.5 MHz to 923.5 MHz. In Japan, for example, it may be from 916.5 MHz to 927.5 MHz. The total bandwidth available for IEEE 802.11ah may be 6 MHz to 26 MHz may depend on the country code.

Transmit Power Control (TPC) in a wireless network may be used for minimizing interference between nodes, improving wireless link quality, reducing energy consumption, controlling the network topology, reducing interference with satellites/radar or other technologies, or improving coverage in the network. TPC in wireless networks may be open loop or closed loop. In open loop TPC, the transmitter may control its transmit power independent of the receiver. In closed loop TPC, the receiver may direct the transmitter to increase or decrease the transmitter's transmit power based on one or more metrics.

TPC may be implemented in a number of ways in different wireless networks. For example, in wideband code division multiplexing (WCDMA) and high speed packet access (HSPA), TPC may be a combination of open loop power control, outer loop power control and inner loop power control. Using the TPC, the power at the receiver in the uplink may be equal for each of the User equipment (UEs) associated with a NodeB or a base station. In open loop power control, which may occur between the UE and the Radio Network Controller (RNC), each UE transmitter may set its output power to a value to compensate for the path loss. This power control may set the initial uplink and downlink transmission powers, e.g., when a UE is accessing the network. In outer loop power control (a form of closed loop power control), which may occur between the UE and the RNC, long term channel variations may be compensated. The power control may be used to maintain the quality of communication at the level of bearer service quality requirement, while using a low power level. In inner loop power control (a form of closed loop power control), which occurs between the UE and Node B, each UE may compensate for short term channel variations. The inner loop power control may be referred to as fast closed loop power control and may be updated at 1500 Hz.

In a 3GPP Long Term Evolution (LTE) uplink transmission, the power control may be a combination of a basic open loop TPC, a dynamic closed loop TPC, and a bandwidth factor compensation component. The basic open loop TPC may implement fractional power control in which the UE may compensate for a fraction of the path loss experience. The closed loop power control may be dynamic and may perform a mixture of interference control with channel condition adaptation. The bandwidth factor compensation may adjust the transmit power based on the bandwidth allocated to the UE.

The TPC in WLANs may be MAC based and may involve the transmission and reception of TPC MAC packets. The TPC may support the adaptation of the transmit power based on one or more information elements (IEs) including, for example, path loss, link margin estimates etc. This TPC is open loop and the transmitting node (e.g., an AP or a STA) may determine its transmit power independent of the receiving node.

In IEEE 802.11 WLANs, e.g., with the exception of IEEE 802.11ad, the receiving STA may send a TPC report element that may include the transmit power and link margin (e.g., the ratio of the received power to that needed by the STA to close the link). The transmitter may use the information received in the TPC report to decide on the transmit power. For example, the STA may use a criteria to dynamically adapt its transmit power to another STA based on information it may receive via the TPC report from that STA. The methods used to estimate the TPC may be proprietary. A TPC report may be requested by the transmitter to enable it estimate the correct transmit power. In this case, the transmitter may send an explicit TPC request frame to the receiver.

A TPC report may not be requested, in which a receiver may send a TPC report to its possible transmitters, for example, an AP in a BSS to each of the STAs in the BSS without a an explicit request for the report from each STA. For low duty cycle, the STAs may have a low overhead during TPC information exchanges. In case of IEEE802.11ah, an open loop link margin index may be used to improve the accuracy of the TPC estimate by including the receiver sensitivity or minimum received power for a modulation coding scheme (MCS).

Using directional multi-gigabit, millimeter (mm) Wave 802.11 WLAN transmission modes (e.g., 802.11ad), the directional multi-gigabit (DMG) link margin element may include a field that may recommend an increase or a decrease in transmit power. In this case, the transmitter may send a DMG link adaptation acknowledgement to indicate whether it may implement the recommendation or not.

Inter-cell coordination schemes may be used to manage interference by coordinating transmission and reception between cells. Inter-cell coordination in cellular networks may include fractional frequency re-use (FFR) with inter-cell interference coordination (ICIC), cooperative multi-point transmission (CoMP), and enhanced inter-cell interference Coordination (eICIC) for heterogeneous networks. With cellular networks, the coordination schemes may be based upon deliberate multiple-access scheduling over time and frequency in a fraction of the transmission bandwidth. As opposed to the cellular scenario, the scheme described herein may leverage the random access nature of CSMA/CA across the entire transmission bandwidth.

Interference coordination in wireless LAN networks may be proprietary and may be carried out in wireless network controller at layers higher than the PHY and MAC. Some of the wireless LAN networks may use techniques that may be coordinated to reduce the effect of a large number of APs and/or STAs. For example, in IEEE 802.11ah based networks, different types of overlapping BSS (OBSS) networks may interfere with each other. Such OBSS issues may be addressed by minimizing interference between the overlapping networks and sharing the channel in time domain. Time division mechanisms may be utilized with physical grouping or logical grouping of STAs with an emphasis on sectorized transmission.

User grouping in wireless networks may be provided. User grouping may manage multiple access and interference in wireless networks by grouping receivers (e.g., STAs and/or UEs) based on one or more metrics. For example, for cellular and WLANS, MU-MIMO STAs that have orthogonal channels may be grouped together to enable efficient multi-user transmission to each STA. In 802.11ah, the STAs that have the same directionality from the AP may be grouped together for common transmission, e.g., using sectorization. In cellular networks, the UEs that may be at the cell edge and UEs that may be at the cell center may be grouped separately to enable coordinated scheduling across resource blocks to limit interference.

802.11WLAN networks may be deployed in dense environments with multiple APs and BSSs. The high density deployment may result in an overlap of adjacent BSSs. When available, the adjacent APs may choose different frequency bands of operation. In some networks, the use of different frequency may not be possible. Independent operation of CSMA/CA in each OBSS may result in simultaneous transmissions from multiple APs resulting in collisions and causing excessive management traffic or prevention of transmissions due to collision avoidance, resulting in the reduction of throughput. When multiple OBSSs use the same frequency bands, interference may be a problem, e.g., for the STAs on the edge of coverage. The increased interference may result in a reduction in the network throughput as seen at the MAC layer, the MAC goodput, and an increase in energy expenditure. The effect of the interference on the MAC goodput and energy efficiency of the network may be mitigated.

Figure 2:
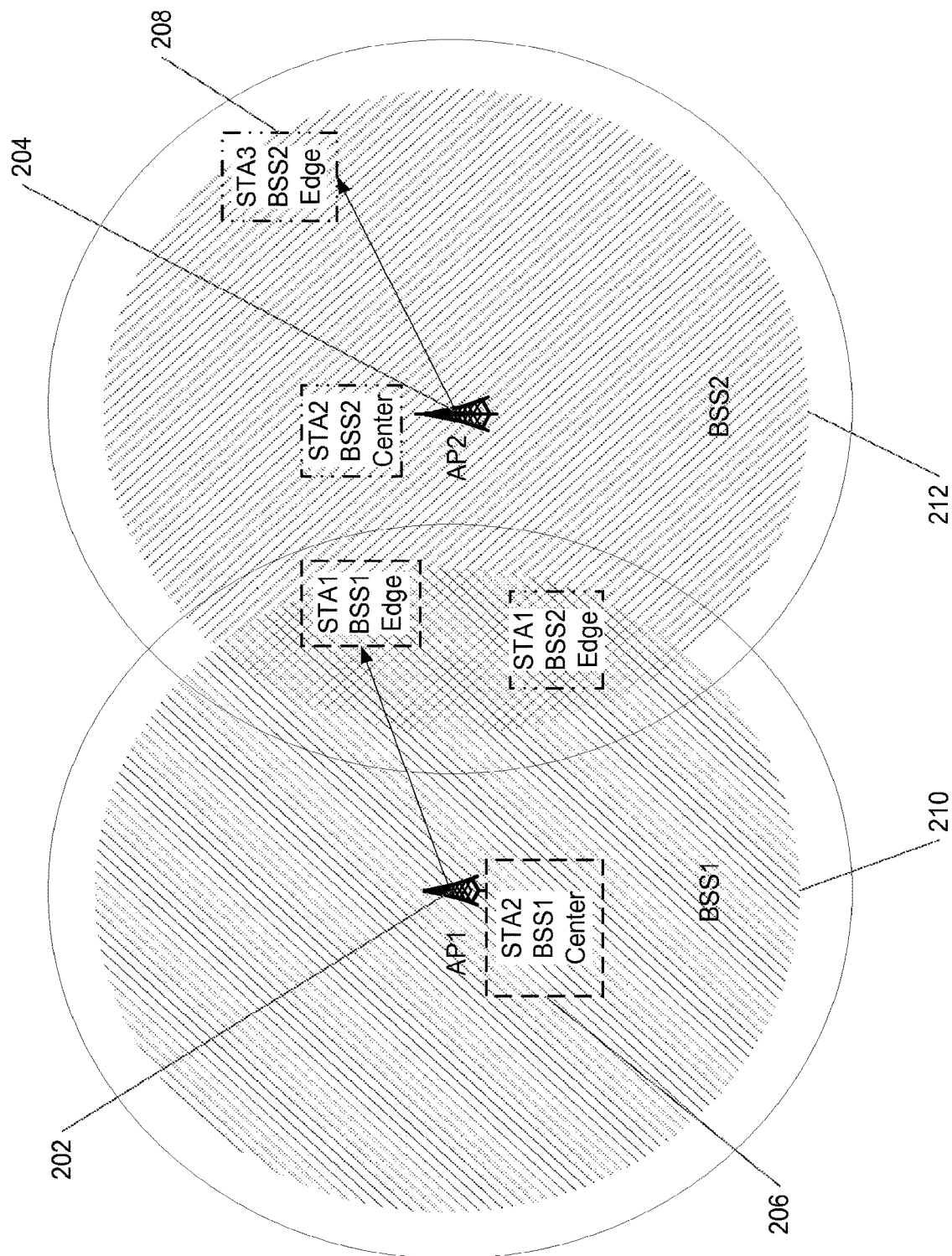
FIG. 2 illustrates an example of transmission in overlapping basic service set (BSS).

FIG. 2 illustrates an example of transmission in overlapping BSSs (e.g., BSS1 210 and BSS2 212). As illustrated in FIG. 2, AP1 202 and AP2 204 may transmit data (e.g., independently) to STAs in their BSSs. The APs may transmit data simultaneously. The transmission, for example, from AP1 202 to STA1 206 (STA1, BSS1) may fail due to the transmission from AP2 to STA3 208 (STA3, BSS2). The transmission failure issue may be addressed for network throughput improvement and energy efficiency.

Channel access timing and inter-BSS coordination for interfering CSMA/CA groups may result in increased interference in both overlapped and non-overlapped networks. To enable the mitigation of interference, the data transmission for interfering STAs or groups of STAs may be timed and coordinated between BSSs to reduce the amount of interference in the network.

For example, one or more of user grouping, enhanced transmit power control, or inter-BSS coordination may be used to improve the system performance of a dense, overlapped network with multiple BSSs. The system performance may be quantified, for example, by a combination of MAC layer throughput and energy efficiency. The user grouping, enhanced Transmit Power Control, and/or Inter-BSS timing and coordination may take into account CSMA/CA multiple access. Fractional frequency may be used in schedulers to allocate resources on a sub-channel granularity. Such an allocation may not be used in CSMA/CA based WLAN networks. The IEEE 802.11ah may provide grouping based sectors and may not perform coordinated inter-BSS TPC.

Using TPC, inter-BSS coordination, and user grouping two APs in an OBSS may transmit simultaneously with little or no collisions. In a fractional CSMA/CA method, a fraction of the total STAs may be permitted to access the channel at a particular time. To limit the amount of interference, the access duration may be coordinated between multiple BSSs. Using TPC, the interference resulting from the coordinated transmissions may be limited. Using the coordinated transmission as described herein, the area covered by the transmissions (e.g., the coverage area) of a subset of the BSSs in the network may be implicitly reduced, thereby reducing the amount of overlap between BSSs and improving the system performance.

The STAs in each BSS may be grouped into one or more groups based on the amount of interference the STAs may receive from other BSSs or offer to other BSSs in the network. For example, the STAs may be partitioned into BSS-edge STAs and/or BSS-center STAs. A BSS-edge STA may be adversely affected by a neighboring BSS during reception or may adversely affect a neighboring BSS during transmission. A BSS-center STA may be a non-BSS-edge STA.

Figure 3:
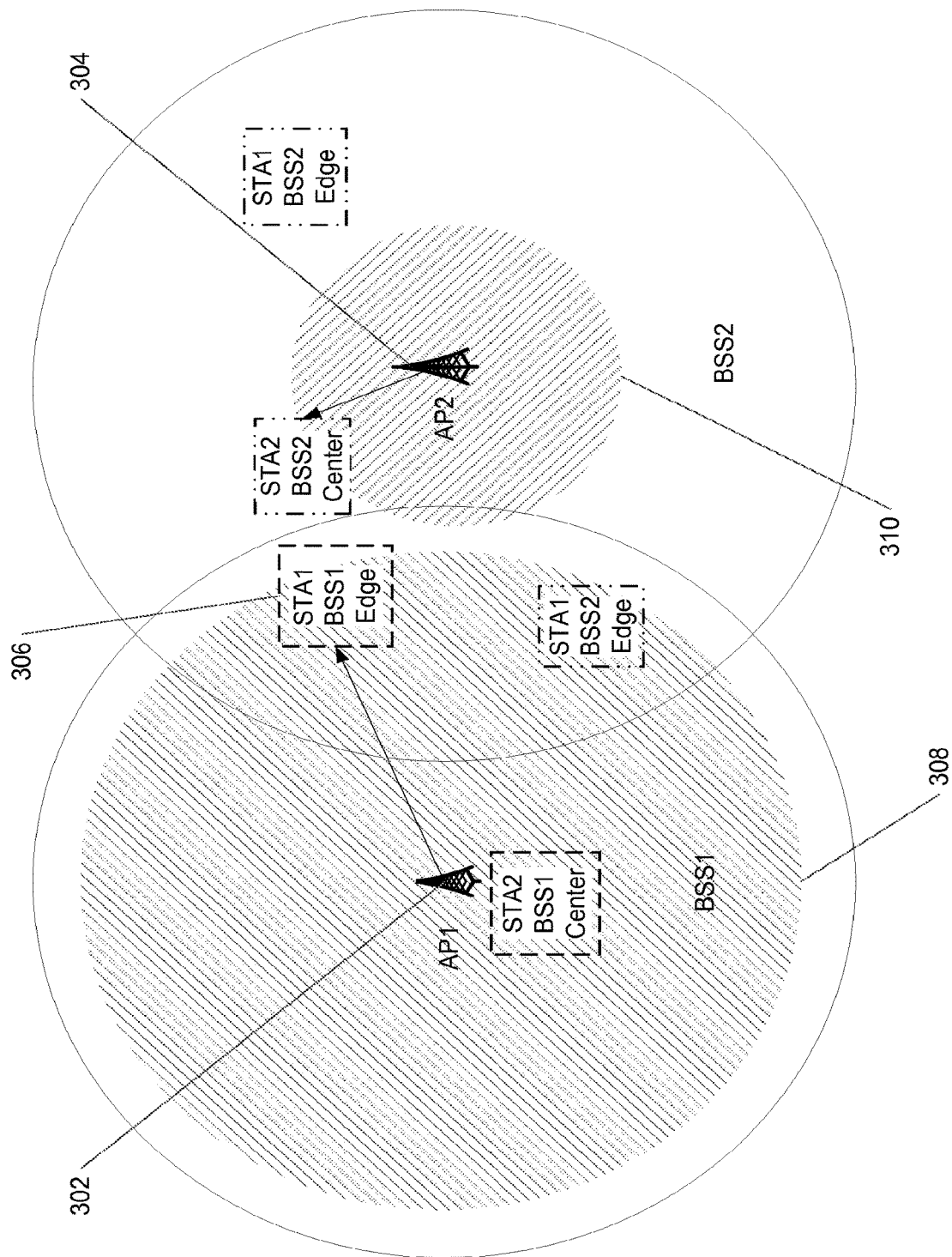
FIG. 3 illustrates an example of an overlapping Basic Service Sets (BSSs) with fractional Carrier Sense Multiple Access with Collision Avoidance (CSMA/CA) and transmit power control (TPC).

FIG. 3 illustrates an example of an overlapping BSS with fractional CSMA/CA and TPC. In case of transmission between an AP and a BSS-edge STA (e.g., AP1 302 to (STA1, BSS1) 306), the neighboring BSS, e.g., BSS2 310 may limit its transmission to BSS-center STAs. The neighboring BSS may also control its power. This may limit its interference effect on the STA in BSS1 (e.g., AP2 304 to (STA2, BSS2) 312).

Enhanced TPC in WLANs may be provided. For example, in IEEE802.11, the open loop transmission and reception of the TPC request and/or response frames may estimate the correct transmit power. Open loop TPC may suffer from inaccuracies due to the dependence on the receiver sensitivities and number of antennas used at the APs and/or STAs. In an outdoor scenario using IEEE802.11ah or High Efficiency Wireless (HEW), the possible change in the channel may use estimation of the transmit power for each transmission. The TPC request and/or response exchange may be inefficient. To reduce this inefficiency, the system may aggregate and transmit the TPC request and/or response frames with the RTS/CTS frames, which may result in data transmission with correct TPC levels. The system may add a field to the physical layer (PHY) signal field (SIG) to indicate the transmit power and link margin that may be needed in each of the frames. Each STA/AP may be able to estimate the path loss from the transmitter and estimate the instantaneous power needed. The system may implement different TPC loops for the control frames and the data frames.

Inter-BSS timing and coordination may be provided. For example, one or more BSS center STAs may be placed in the active CSMA/CA pool. To limit the amount of interference between adjacent or overlapping BSSs, the timing of the edge BSSs (e.g., placed in the active CSMA/CA pool) may be coordinated between overlapping BSSs. The coordination may be centralized or distributed. The timing of the edge BSSs may be controlled such that the adjacent groups are orthogonal or partially orthogonal.

The networks with F-CSMA/CA capabilities may be checked using an F-CSMA/CA capabilities signaling field. If neighboring APs do not support the feature or are instructed not to use the feature, the packet transmission may follow using legacy operation, e.g. 802.11ac, 802.11ah, etc.

If the APs in a network are F-CSMA/CA capable, each AP may identify the BSS-edge STAs and non BSS-edge STAs under its control. BSS-edge STAs may be identified using a one or more techniques including, for example, path loss, physical/geographic location, STA assisted, genie aided etc.

The AP may estimate the path loss from the difference of the channel to the STA and the RSSI of the individual STAs. This may be done by using TPC request and/or TPC response frames between the AP and/or STAs. The AP may rank the STAs based on path loss and designate the bottom x% as BSS-edge. The chosen percentages of STAs designated as center or edge may be proprietary. The AP may use the physical/geographical location of STAs, if available, to identify cell edge STAs and signals STAs. This may be based on Global Positioning System information or other location-based techniques. The APs may be assisted by the STAs. The STAs may signal the difference between the RSSI of associated AP and next strongest AP(s). STAs with differences less than a threshold may be elected as BSS edge STAs. The AP may be Genie-aided. For example, the information may be derived from a network management tool or a central AP controller.

The AP may transmit a BSS-edge flag to STAs at the BSS edge. The BSS edge indicator may be signaled as a MAC information element or as a flag to a modified CTS frame. Each STA may be signaled individually or the information may be aggregated and broadcasted in one frame.

In each BSS, the STAs may be grouped based on a desired criteria e.g. BSS edge, BSS center, etc. For example, Group 1 may include BSS center STAs in each of the BSSs, group 2 may include BSS edge STAs in odd numbered BSSs, and group 3 may include BSS edge STAs in even numbered BSSs.

One or more APs may coordinate to allow access of each to the pool of STAs performing CSMA/CA based on the BSS index. For example, Group 1 may be placed in the active CSMA/CA pool. Groups 2 and 3 may be placed in the active CSMA/CA pool in a coordinated manner during particular time slots. The coordination may be such that groups 2 and 3 are in orthogonal pools e.g., when group 2 is in the pool, group 3 may not be in the pool. The coordination may be such that groups 2 and 3 may in partially orthogonal pools. For example, groups 2 and 3 may be in a pool based on a desired orthogonality factor (f), where $0<=f<=1$, and $f=0$ implies fully orthogonal and $f=1$ implies no orthogonality.

The STA grouping may be combined with TPC to limit interference. The transmit power may be adjusted based on the group in the active CSMA/CA pool. The maximum transmit power may determine the power at which the control frames needed by each of the STAs may be sent. If group 1 is in the pool, the maximum transmit power may be limited to the worst STA in the limited group. For example, the STA that may require the maximum transmit power in group 1. The maximum transmit power may be used for both data and control frames. If each of the STAs are in the pool, the maximum transmit power may be limited to the worst STA in the BSS. For example, the STA that may require the maximum transmit power in the BSS.

Figure 4:
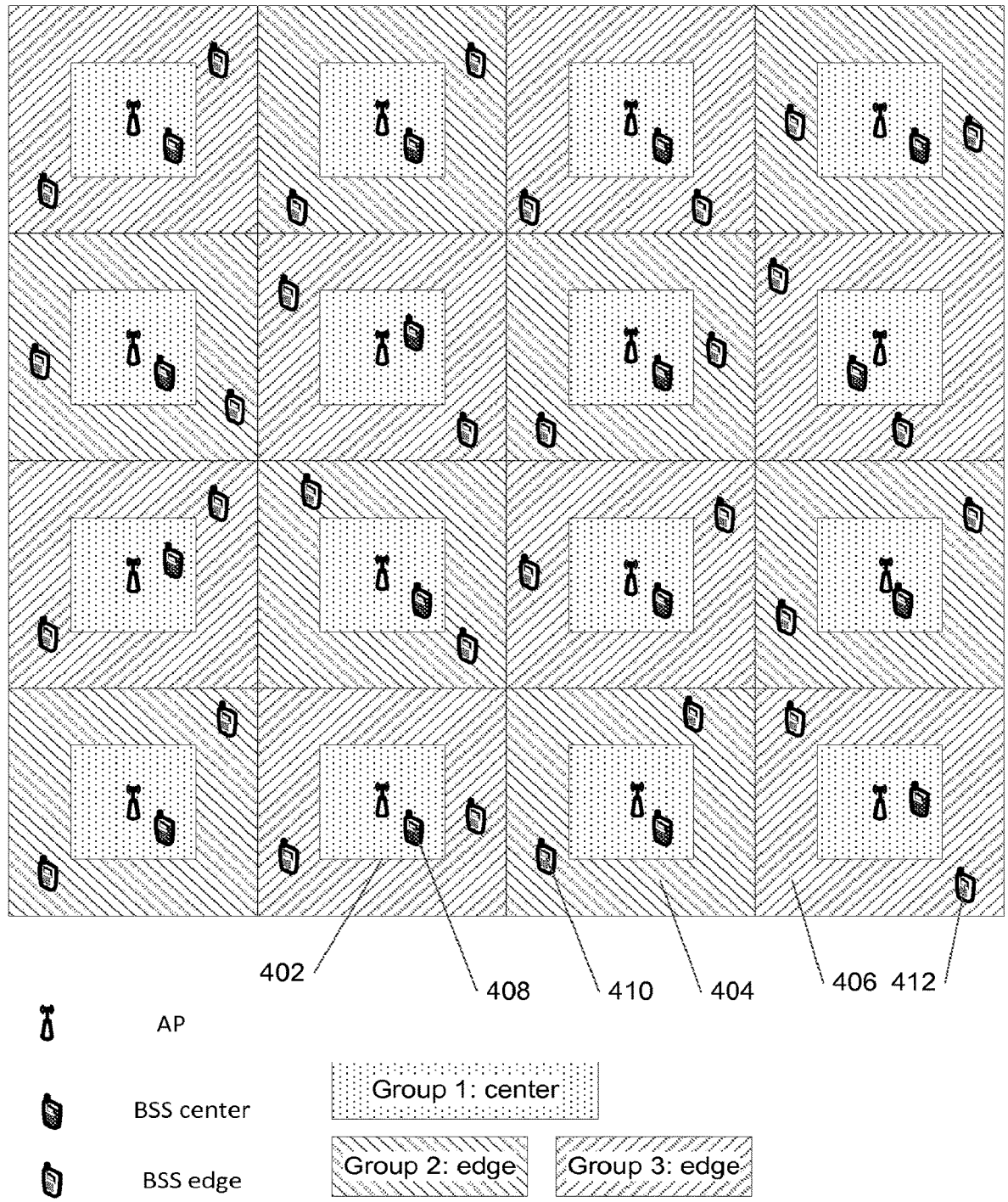
FIG. 4 illustrates an example of an WLAN system with BSS-edge and BSS-center partitioning.

FIG. 4 illustrates an example of a WLAN with BSS-edge and BSS-center partitioning. As illustrated in FIG. 4, a WLAN with one or more APs (e.g., 16 APs or BSSs) may have one or more STAs. The STAs may be placed in group 1 402, group 2 404, and group 3 406. For example, group 1 may be associated with one or more center stations (e.g., STA 408), and group 2 404 and group 3 406 may be associated with the edge stations (e.g., STAs 410 and 412).

Figure 5:
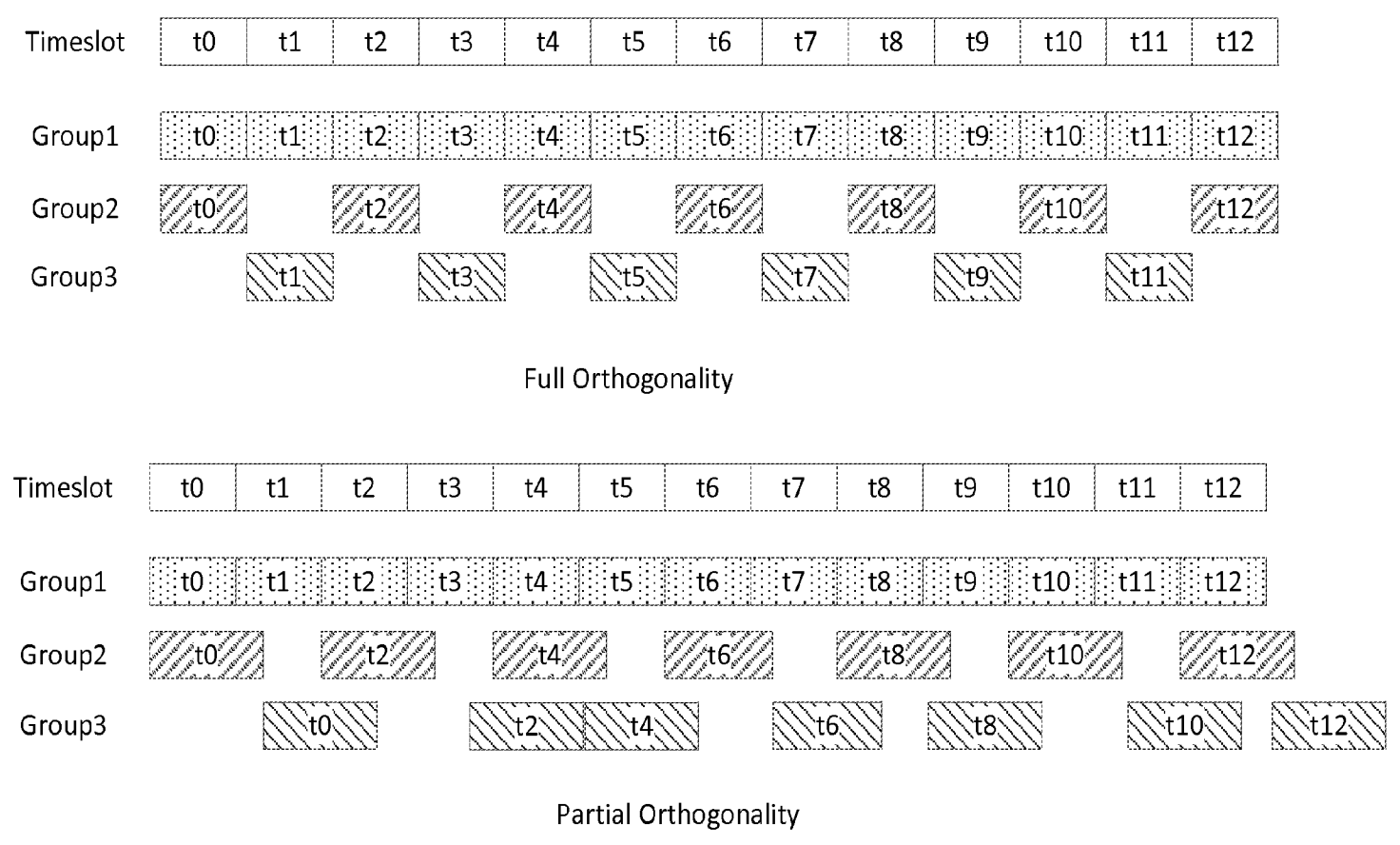

FIG. 5 illustrates an example of partial and full orthogonality of one or more groups (e.g., three groups). As illustrated in FIG. 5 the three exemplary groups may be placed in an active CSMA/CA pool over time. For example, group 1 may be in the active CSMA/CA in each of the time slots, while group 2 and group 3 may be placed in the active CSMA/CA set during specific time-slots. The grouping may be combined with TPC to limit interference. To limit the amount of interference between OBSSs, the timing between the different groups may be coordinated between overlapping BSSs. The coordination may be centralized or distributed.

Methods, systems, and instrumentalities are provided for inter-BSS coordination and timing and signaling. As illustrated in FIG. 5, the coordinated timing across adjacent BSSs may be set to be fully orthogonal (e.g., where there is no interference between interfering groups) or partially orthogonal (e.g., where the interfering groups may have some level of overlap, up to a desired orthogonality level).

Fully orthogonal timing using beacons may be provided. With fractional CSMA/CA, the STAs located in the BSS center may form group 1 (e.g., the dotted areas 402). The BSS edge users may form other groups depending on the network deployment. In the example illustrated in FIG. 4, the STAs in the shaded areas (e.g., 404 and 406) may be placed in groups 2 and 3. These adjacent BSSs may include edge STAs from different groups. In order to use the fractional CSMA/CA, the transmission of the group 2 may be distinguished from that of the group 3, since they may interfere with each other.

As illustrated by example in FIG. 5 (e.g., full orthogonality case), different time slots may be assigned for group 2 and group 3. In this case, the groups 2 and 3 may be fully orthogonal fractional CSMA/CA. The orthogonality may be achieved, for example, by using beacons and the beacon intervals. With 802.11 WLAN systems, the size of the beacon interval may vary, e.g., depending on when the AP may acquire the media and transmit the beacon frame. The frame length of each transmission may vary, e.g., based on the MAC frame length, MCS level, bandwidth, etc. The beacon and/or beacon intervals may be modified to implement fully orthogonal fractional CSMA/CA.

Orthogonal timing using beacon intervals may be provided. A wireless system may use fixed beacon interval lengths and may switch between orthogonal transmissions. The switching may occur at fixed modulo values for each BSS. In this example, group 2 transmission may occur at odd time indices modulo(beacon_timing_index,2)=0, while group 3 transmission may occur at even time indices modulo(beacon_timing_index,2)=1.

A common beacon index may be needed to synchronize the network and identify the correct transmission time. In this example, two BSS edge user groups may be considered and modulo of 2 may be utilized. In a general case, modulo of M may be used when M BSS edge user groups are defined in the system. A delay may be added to allow for the jitter due to the variable beacon duration.

The APs in a network may identify the beacon timing index. This may be performed by a network controller or the BSS-edge STAs may send the current timing index of the AP they are associated with in an aggregated packet when transmitting. This may allow neighboring OBSS APs to retrieve the information.

STAs and the AP in a BSS may calculate the modulo timing value as follows:

Modulo_timing_value=modulo (beacon_timing_index, 2)

If Modulo timing value=0, group 2 is permitted to transmit

If Modulo_timing_value=1, group 3 is permitted to transmit

The active group may wait for an additional time e.g., distributed inter-frame space (DIFS). The permitted groups may be added to active CSMA/CA pool and normal transmission may take place. TPC levels may be used based on the permitted groups.

Figure 6:
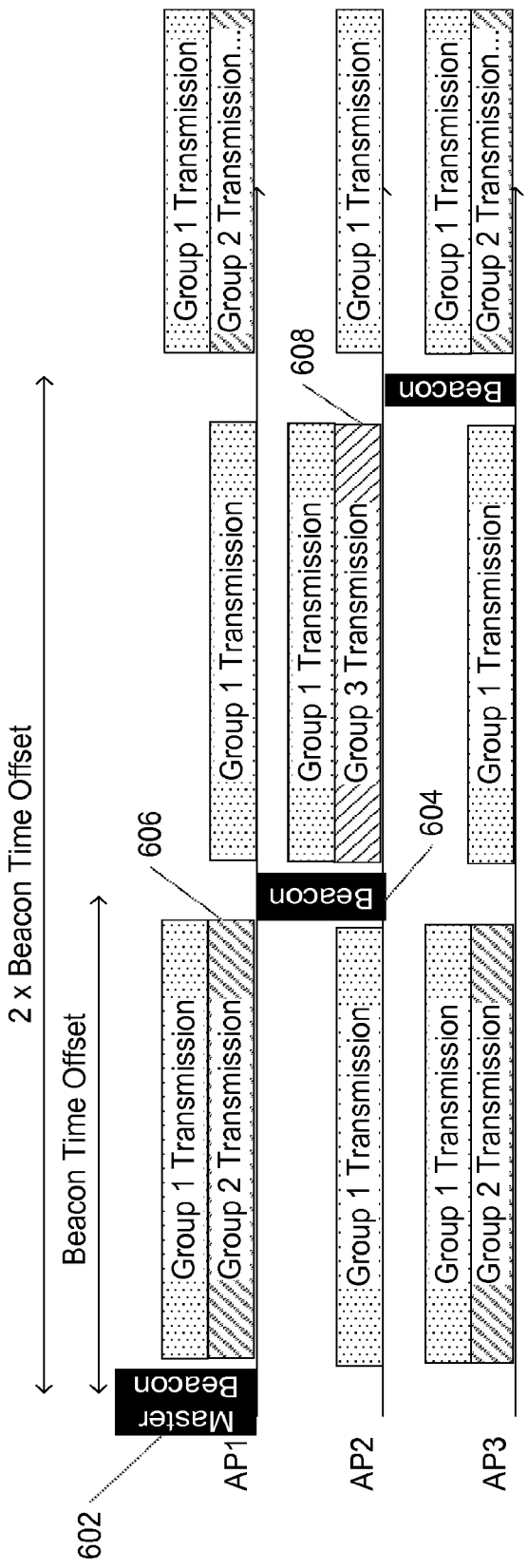
FIG. 6 illustrates an example of a fully orthogonal fractional CSMA/CA transmission, e.g., using beacon timing offsets.

Orthogonal timing using beacon intervals and beacon time offsets may be provided. FIG. 6 illustrates an example of a fully orthogonal fractional CSMA/CA transmission, e.g., using beacon timing offsets. A fixed beacon interval may be used for the system and beacon time offsets may be used to maintain orthogonality of different BSS transmissions within the beacon interval.

A master AP may transmit a synchronization F-CSMA/CA beacon frame, e.g., to synchronize Beacon transmissions. One or more other APs may use the synchronized beacon frame as reference to synchronize the transmission of their own beacon frames and maintain the orthogonality of the transmissions. As illustrated in FIG. 6, AP1 may be used as a master AP. The beacon 602 associated with the AP1 may be designated as a master beacon. AP2 may use the master beacon 602 to synchronize its beacon frame 604.

An orthogonal F-CSMA/CA beacon may be provided. The orthogonal F-CSMA/CA beacon may assist in synchronizing the beacon transmission for the network. The beacon may be sent by a designated F-CSMA/CA master AP (e.g., an AP in the center of the network). The F-CSMA/CA beacon may set up a fixed beacon interval period and beacon time offset periods for the entire network. The beacon interval and the beacon time offset may be network parameters that may be static (e.g., set up during deployment) or dynamic (e.g., assigned in a centralized or distributed manner during network operation).

One Beacon Interval may include one or more of beacon time offset periods. The length of beacon interval and beacon time offset may be implementation dependent and may be announced in each of the F-CSMA/CA beacon frames.

To enable propagation of the F-CSMA/CA beacon frame information, BSS-edge STAs associated with an AP (or within the range of an AP's beacon) may send the F-CSMA/CA beacon frame (e.g., current F-CSMA/CA beacon frame) time-stamp in a beacon synchronization MAC frame. This may allow neighboring OBSS APs to retrieve the information. A beacon time offset may be set for each AP in the network. This offset may be relative to the F-CSMA/CA beacon and may indicate the time that a beacon may be transmitted by that specific AP in the network.

Each of the APs may transmit a synchronized beacon by counting the number of beacon time offsets from their beacon frame to the synchronized beacon frame. The APs may transmit beacon frames at one or multiple beacon time offsets away from the previous F-CSMA/CA beacon frame transmitted by the master AP.

The APs may announce F-CSMA/CA information in their own beacons. Information such as the beacon interval, the beacon time interval, the time stamp of beacon interval, and their own time offset from the synchronization beacon may be broadcasted to their own BSSs.

In case of fully orthogonal transmission, the groups distinguished by non-overlapping time slots may be transmitted by using different beacon time offset periods. As illustrated in FIG. 6, the transmission of group 2 within BSS1 (e.g., operated by AP1) 606 may be allocated in the odd number of beacon time offset period, and transmission of group 3 (e.g., operated by AP2) 608 may be allocated in the even number of beacon time offset period.

The APs may truncate or stop transmission of a packet when they may not complete the transmission before the next expected beacon frame. APs may monitor each of the beacon frames they may receive and detect. Coordination of APs and beacon frame assignment may depend on the architecture of the WLAN system (e.g., a distributed system or a centralized system).

For non-AP STAs, the following transmission rules may apply. Non-AP STAs may be classified by the fractional CSMA/CA groups. The BSS center group (e.g., group 1 in FIG. 6) may be allowed to transmit or it may be allowed to transmit except when that AP may transmit beacon frames. If the second scenario is applied, the non-AP STAs may truncate or stop transmission when the STAs may not finish transmission before the next expected beacon frame.

The BSS edge groups (e.g., group 2 and group 3 in FIG. 6) may communicate according to their fractional CSMA/CA allocation. The non-AP STAs may truncate or stop transmission, e.g., when the STAs does not finish transmission before the next expected beacon frame. The examples illustrated in FIG. 6 may be extended to a general case. For example, the number of BSS edge groups may be more than two and allocation of the groups may be different.

A de-centralized synchronization may be provided. An AP may derive its synchronized beacon from an adjacent AP as opposed to a central master AP in a daisy-chain fashion. For example, in a network with 4 OBSSs (e.g., AP1, AP2, AP3, and AP4), AP2 may derive its clock from AP1, AP3 from AP2, AP4 from AP3, etc.

Partially-orthogonal timing using beacons (e.g., using user priority method) may be provided. With fractional CSMA/CA, one or more STAs located in the BSS center may form a group. The BSS edge users may form other groups. The number of groups formed may depend on a desired deployment. In the example shown in FIG. 4, the STAs in the shaded areas (e.g., shaded area 404) may be placed in group 2 while STAs in other shaded areas (e.g., shaded areas 406) may be placed in group 3. The adjacent BSSs may have edge STAs in different groups. To exploit the benefits given by fractional CSMA/CA scheme, the transmission of group 2 and group 3 may be distinguished since they may interfere with each other.

Figure 7:
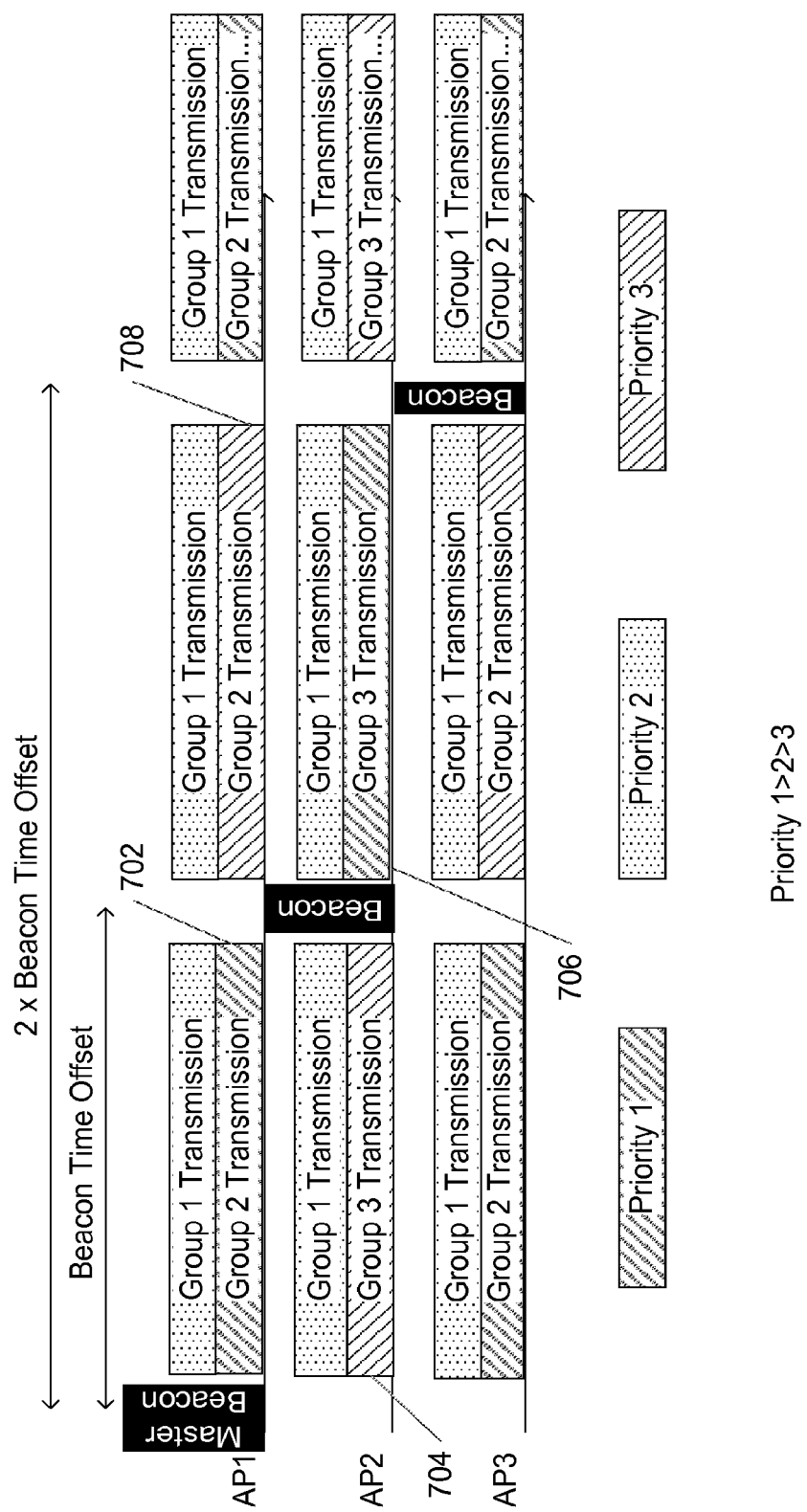
FIG. 7 illustrates an example of partial orthogonality with user Priorities with 3-level priority.
Figure 8:
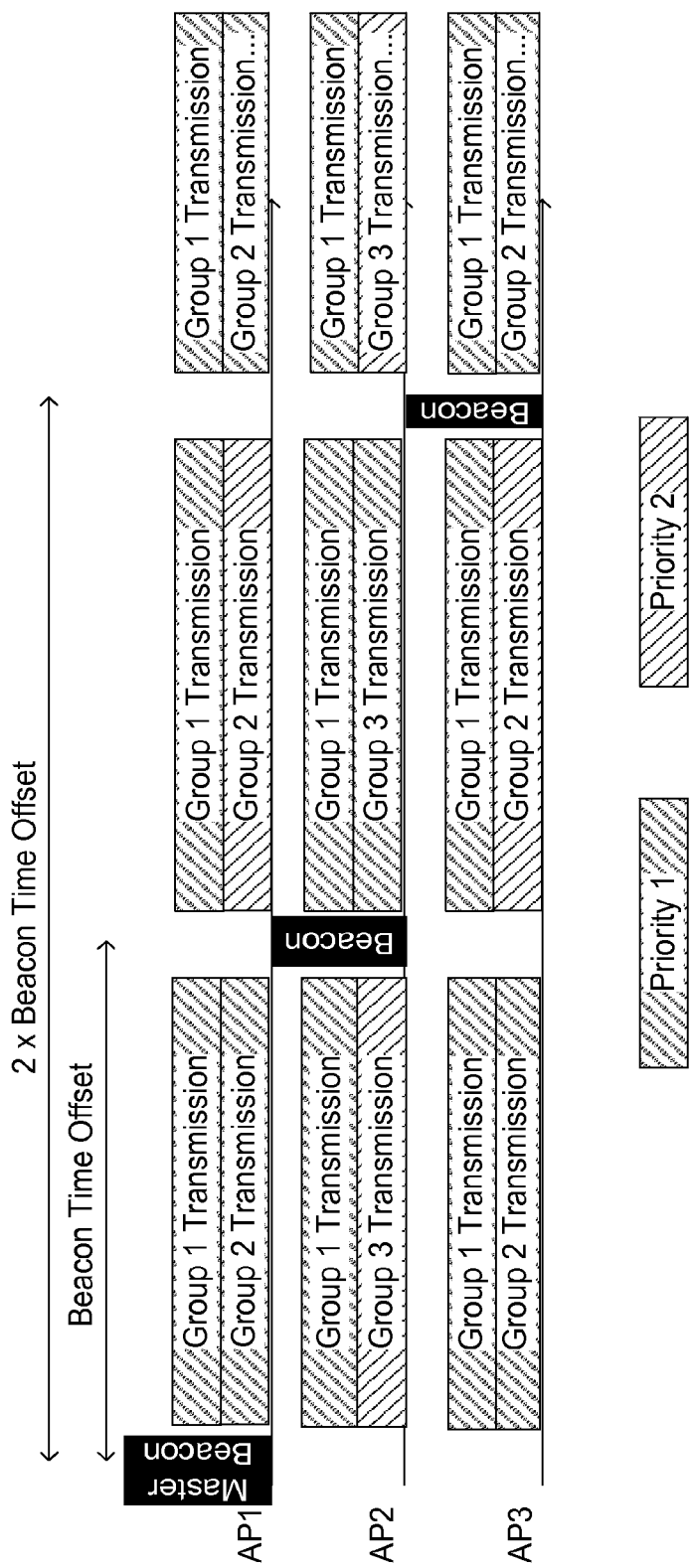
FIG. 8 illustrates an example of partial orthogonality with user Priorities with 2-level priority.

FIG. 7 illustrates an example of partial orthogonality with user Priorities with 3-level priority. FIG. 8 illustrates an example of partial orthogonality with user Priorities with 2-level priority. As illustrated in FIG. 7 and FIG. 8, one or more CSMA/CA user priorities may be assigned to groups 1, 2, and/or 3. For example, as illustrated in FIG. 7, in time slot 1, Group 2 702 may be assigned a higher priority and as such a higher probability of acquiring the medium in the overlapped BSS region than group 3 704. In time slot 2, Group 3 706 may have higher priority than Group 2 708. The STAs/traffic in Group 1 may be assigned a priority, which may be equal to or less than the higher priority group. This may limit the amount of interference offered without preventing other BSS edge users in the adjacent BSSs from transmitting (e.g., in case the BSS edge STAs in the BSS with the higher priority edge STAs may have no traffic to send). The maximum transmit power may be adjusted as needed. For example, in the case a lower priority STA gains access to the channel in the downlink, the maximum power may be adjusted to enable the lower priority group to gain access to the control frames. The partially orthogonal fractional CSMA/CA may not be forced artificially on BSS edge STAs in adjacent BSSs, but may be implicit based on the CSMA/CA multiple access. The partially fractional CSMA/CA may be suitable for networks with a dense deployment of APs but a limited amount of traffic per AP in which there may not be traffic in a group at its scheduled time of transmission.

To prioritize the STAs, QoS (e.g., as provide in IEEE 802.11e) may be extended to the traffic from the associated devices. In enhanced distributed channel access (EDCA), the random delay may be calculated as:

Total Deferral period=AIFS[Access_class]+Backoff [Access_class]

where both the arbitration inter frames Space (AIFS), the contention windows, and the backoff calculated may depend on the access class of the data, e.g., background traffic (AC-BK), best effort traffic (AC_BE), Video (AC_VI), and Voice (AC_Voice). A TxOP limit may be set based on the access class. An additional user priority factor that may modify the total deferral period estimation for the STAs in the group to enable prioritization of the traffic from different groups and modify the upper limit of the TxOP needed for the relay transmission.

The original deferral period for each user in the group (and each traffic class for the user) may be scaled by a desired priority factor ($\alpha$) that may be determined by network. The total deferral period may be given by:

Total Deferral period=$\alpha$\{AIFS[Access_class]+Backoff[Access_class]\}

The original deferral period for each user may be modified by an additional back-off priority factor ($\beta$). In this case, the total deferral period may be given by:

Total Deferral period=AIFS[Access_class]+Backoff [Access_class]-$\beta$, $\beta \geq 0$, Total Deferral period$\geq 0$ The values of the priority factors may be selected to provide correct priority for the group during the beacon time offset. The back-off factor for each group may be transmitted by the beacon at the beginning of the period.

The beacon interval and beacon time offset periods may be used to enable synchronization of the time intervals when the priorities are used. To synchronize beacon transmissions, a synchronization F-CSMA/CA beacon frame may be transmitted by the master AP, and other APs may use the synchronized beacon frame as reference to synchronize the transmission of their own Beacon frames.

An orthogonal F-CSMA/CA beacon may be provided. The orthogonal F-CSMA/CA beacon may assist in synchronizing the beacon transmission for the entire network. The beacon may be sent by a designated F-CSMA/CA master AP (e.g., an AP in the center of the network). The F-CSMA/CA beacon may set up a fixed beacon interval period and beacon time offset periods for the entire network. The beacon interval and the beacon time offset may be network parameters that may be static (e.g., set up during deployment) or dynamic (e.g., assigned in a centralized or distributed manner during network operation). One beacon interval may include integer number of beacon time offset periods. The length of beacon interval and beacon time offset may be implementation dependent and may be announced in each of the F-CSMA/CA beacon frames.

To enable propagation of the F-CSMA/CA beacon frame information, the BSS-edge STAs associated with an AP (or within the range of an APs beacon) may send a F-CSMA/CA beacon frame time-stamp (e.g., the current time stamp) in a special beacon synchronization MAC frame. This may allow neighboring OBSS APs to retrieve the information.

A beacon time offset may be set for each AP in the network. The beacon time offset may be relative to the F-CSMA/CA beacon and may indicate the time that a beacon may be transmitted by that specific AP in the network. Each AP may transmit a synchronized beacon by counting the number of beacon time offsets from their beacon frame to the synchronized beacon frame. The APs may transmit beacon frames at one or multiple beacon time offsets away from the previous F-CSMA/CA beacon frame transmitted by the master AP. The APs may announce F-CSMA/CA information in their beacon such as the beacon interval, the beacon time interval, the time stamp of beacon interval, and their own time offset from the synchronization beacon.

In order to maintain partially orthogonal transmission, the groups that may be distinguished by varying priorities may be transmitted by using different beacon time offset period. The examples are illustrated in FIGS. 7 and 8. FIG. 7 illustrates an example of partial orthogonality with three level priority, whereas FIG. 8 illustrates an example of partial orthogonality two level priority case.

The transmission of group 2 within BSS1 (e.g., operated by AP1) with priority a, may be allocated in the odd number of beacon time offset period, and transmission of group 2 within BSS1 (e.g., operated by AP1) with priority b, (where b<a) may be allocated in the even number of beacon time offset period. Transmission of group 3 within BSS2 (e.g., operated by AP2) with priority b, may be allocated in the odd number of beacon time offset period, and transmission of group 3 within BSS2 (e.g., operated by AP2) with priority a, (where b<a) may be allocated in the even number of beacon time offset period. Transmission of group 1 within BSS1 (e.g., operated by AP1) and group 1 within BSS2 (e.g., operated by AP2) with priority c, may be allocated in each of the beacon time offset periods, (where b<c<a) may be allocated in the even number of beacon time offset period.

The APs may truncate or stop transmission of a packet when they may not complete the transmission before the next expected beacon frame. The APs may monitor each of the beacon frames they may receive and detect. The AP may continue transmission at the beginning of the next expected beacon frame as partial orthogonality may be needed. Coordination of APs and beacon frame assignment may depend on the architecture of the WLAN system, e.g., distributed system or centralized system.

For non-AP STAs, the Non-AP STAs may be classified by the fractional CSMA/CA groups. The BSS center group (e.g., group 1 in FIGS. 7 and 8) may be allowed to transmit with the same user priority, or may be allowed to transmit at the same priority except when that AP may transmit beacon frames.

The BSS edge groups (e.g., group 2 and group 3 in FIG. 6) may communicate according to their fractional CSMA/CA priorities. The examples illustrated in FIGS. 7 and 8 may include one or more BSS edge groups and with one or more priorities.

Partially-orthogonal timing using beacons (e.g., using statistical method) may be provided. With fractional CSMA/CA, the STAs located in the BSS center may form a group. The BSS edge users may form other groups. The number of groups may be dependent on the desired deployment. As illustrated in FIG. 4, the STAs in shaded areas (e.g., shaded area 404) may be placed in group 2 while STAs in other shaded areas (e.g., shaded area 406) may be placed in group 3. Adjacent BSSs may have edge STAs in different groups. In fractional CSMA/CA, the transmission of the group 2 may be distinguished from that of the group 3, since the STAs may interfere with each other.

Different groups may be randomly allowed to access the network in a manner that they may be statistically orthogonal with a desired level of overlap (based on an orthogonality factor). This may be achieved by the use of a beacon interval with random beacon timing offsets after the F-CSMA/CA beacon for each coordinated AP. The random offsets may be generated based on statistically orthogonal probability distributions, e.g., a random CDMA code. The restricted access windows of different durations and start times may be used.

Statistical orthogonality with beacon intervals and random beacon timing offsets may be provided. An orthogonal F-CSMA/CA beacon may assist in synchronizing the beacon transmission for the entire network. The beacon may be sent by a designated F-CSMA/CA master AP (e.g., an AP in the center of the network). The F-CSMA/CA beacon may set up a fixed beacon interval period for the network. The beacon interval and the beacon time offset may be network parameters that may be static (e.g., set up during deployment) or dynamic (e.g., assigned in a centralized or distributed manner during network operation). One beacon interval may include one or more beacon time offset period. The length of beacon interval and beacon time offset may be implementation dependent and may be announced in each F-CSMA/CA beacon frame.

To enable propagation of the F-CSMA/CA beacon frame information, BSS-edge STAs associated with an AP (or within the range of an AP's beacon) may send the current F-CSMA/CA beacon frame time-stamp in a special beacon synchronization MAC frame. This may allow neighboring OBSS APs to retrieve the information. A beacon time offset may be set for each AP in the network. This offset may be relative to the F-CSMA/CA beacon and may indicate the time that a beacon may be transmitted by that particular AP in the network.

Each of the APs may transmit a synchronized beacon, e.g., by counting the number of beacon time offsets from their beacon frame to the synchronized beacon frame. The APs may transmit beacon frames at one or multiple beacon time offsets, e.g., away from the previous F-CSMA/CA beacon frame transmitted by the master AP.

The APs may announce F-CSMA/CA information using beacons. The APs may broadcast information in their BSSs. The information may include, for example, beacon interval, beacon time interval, time stamp of beacon interval, offset of an AP from the synchronization beacon, etc.

In order to maintain the statistically partial-orthogonal transmission, each AP may randomly select a beacon timing offset or a subset of beacon timing offsets. The AP may transmit at the selected beacon timing offset or a subset of beacon timing offsets. The offset values may be generated (e.g., independently generated) by each AP with minimal coordination. The offset values may be generated by a central entity by, for example, using additional coordination and signaling.

One or more APs may truncate or stop transmission of a packet when the APs may not complete the transmission before the next expected beacon frame. APs may monitor each of the beacon frames the APs may receive and/or detect.

One or more non-AP STAs may be classified as fractional CSMA/CA groups. The BSS center group (e.g., group 1 in FIG. 6) may be allowed to transmit, or may be allowed to transmit except when the AP may transmit beacon frames. The non-AP STAs may truncate or stop transmission, e.g., the APs may not finish transmission before the next expected beacon frame.

The BSS edge groups (e.g., group 2 and group 3 in FIG. 6) may communicate according to their fractional CSMA/CA allocation. The non-AP STAs may truncate or stop transmission when they may not finish transmission within the time allocated for the group.

Figure 9:
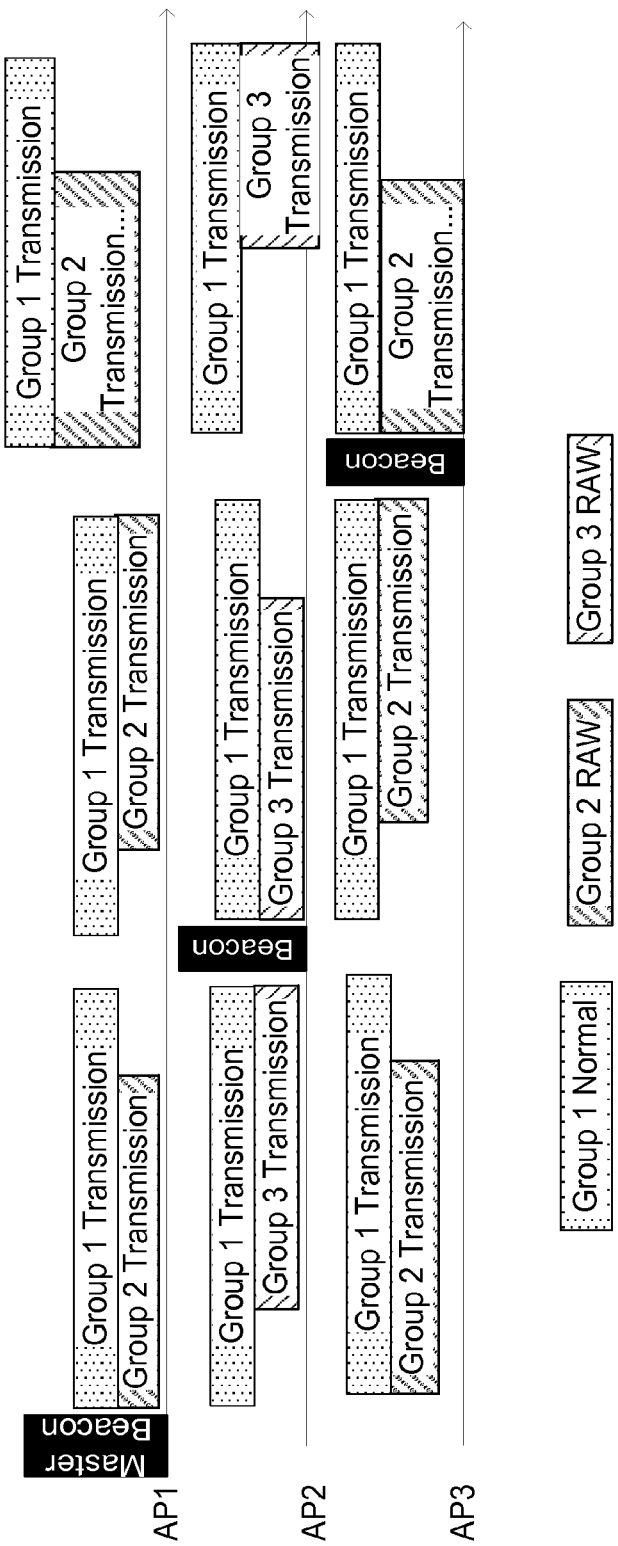
FIG. 9 illustrates an example of partial statistical orthogonality.

Full or statistical orthogonality, e.g., using restricted access windows may be provided. FIG. 9 illustrates an example of partial statistical orthogonality. A Restricted Access Window (RAW) may be a distributed coordination function (DCF) window that may limit the STAs allowed to transmit in the uplink (e.g., as used in IEEE 802.11ah). A restricted access window of various periodicities, window sizes, start times, and coordination levels may be assigned to each group and used to restrict their access to compete for the medium. Full or partial orthogonality may be enabled, for example, using an RAW.

One or more RAW parameters may be set up based on the orthogonality needed. The periodicity, window size, start time, and/or coordination between adjacent BSSs of the RAW in the network may be adjusted to allow for different amounts of coordination in the network. There interfering groups may statistically overlap. The level of overlap may be determined based on an orthogonality factor.

In partial orthogonality (e.g., statistical orthogonality) periodic RAW may be set up with fixed window size for each of the BSSs in the network and random start times for the periodic RAW sessions for each of the BSSs in the network.

In full orthogonality, periodic RAW may be set up with fixed window size for each of the BSSs in the network and random start times for the periodic RAW session. Odd BSSs may have a common window size and start time. The even BSSs may have a different but common window size and start time for even BSSs.

In partial orthogonality (e.g., statistical orthogonality), aperiodic RAW may be set up with a fixed window size for each of the BSSs in the network and random start times for each of the BSSs in the network. Aperiodic RAW may be used with a random window size for each of the BSSs in the network and random start times for each of the BSSs in the network.

In full orthogonality, aperiodic RAW may be set up with a fixed window size for each of the BSSs in the network and random start times for each of the BSSs in the network, but with a common window size and start time for odd BSSs, and a different but common window size and start time for even BSSs. Aperiodic RAW may be used with a random window size for each of the BSSs in the network and random start times for each of the BSSs in the network, but with a common window size and start time for odd BSSs, and a different but common window size and start time for even BSSs.

A RAW parameters set may be assigned. The RAW group may be set to the desired group ID, e.g., Group 1, Group 2 or Group 3. The RAW start time and duration may be set. A maximum TPC parameter may be set, where the TPC parameter may indicate the maximum TPC for control frames in the group. STAs (e.g., for uplink transmission) and APs (e.g., for downlink transmission) may access a channel based on the RAW parameters. TPC may be performed using the maximum of each of the max_TPC parameters in the groups with active RAW parameters. The raw parameters set may be centralized or distributed.

A simulator may be used to show the effect of the TPC and the fractional CSMA/CA on the MAC goodput and energy efficiency of an overlapped BSS WLAN. The simulator may use parameters that may simulate an IEEE802.11ah network. The uplink and downlink transmissions between the AP and the STAs may be simulated.

For the network topology, a grid position allocator, e.g., with 16 APs set in a square 4×4 grid with BSS (x,y), (x=1, . . . , 4, y=1, . . . ,4) indicating the BSS in horizontal position, x, and vertical position, y may be used. The STAs may be uniformly distributed in each BSS and each BSS may have an effective radius, e.g., of 600 m with an inter-AP spacing varying from 1200 m (e.g., normal non-overlapping BSS) to 800 m (e.g., OBSS scenario). The path loss may be given by:

PL=8+37.6*log 10(distance)

The TPC interval update may specify the rate at which TPC estimates may be made. The rate may be based on a packet update interval or a beacon update interval. In packet update interval, the TPC estimate may be made on each of the packets transmitted to a dedicated receiver. The update rate may model the enhanced TPC scheme described herein. In beacon update interval case, the TPC estimate may be made once during a beacon interval of 1.024 seconds. Additional simulation parameters are listed in Table 1.

TABLE 1

| Parameter | Value |
| --- | --- |
| Mobility | 3 km/hr |
| Cannier Sensing Mechanism | RTS/CTS on |
| Traffic | UDP Constant bit Rate |
| Traffic Direction | Uplink/downlink |
| Bandwidth | 2 MHz |
| Packet Size | 500 bytes |
| AMC | Adaptive Automatic Rate Fallback (AARF) |
| Path loss exponent | 3.76 |
| Reference path loss (dB) | 8.0 |
| Shadow fading Std dev | 8.0 |
| TxGain and RxGain | 3.0 dB |
| CCA threshold | −92.0 dBm |
| Energy detection threshold | −88.0 dBm |
| Max Tx Power | 30 dBm |
| Target TPC power | −85 dBm |
| Energy Model | WifiRadioEnergyModel |
| BasicEnergySupplyVoltage | 3.3 V |
| TxCurrentA | 0.144 Amp |
| RxCurrentA | 0.088 Amp |
| IdleCurrentA | 0.017 Amp |
| CcaBusyCurrentA | 0.0017 Amp |
| SwitchingCurrentA | 426e-6 Amp |

TPC and Fractional CSM/CA modeling may be provided. The TPC modeling may include no TPC, basic TPC, unfiltered TPC, and filtered TPC. In no TPC modeling, each of the STAs and APs may transmit at the maximum transmit power. In basic TPC modeling, an AP may use a transmit power sufficient to reach the farthest STA in its BSS. STAs may transmit power to satisfy the link of the farthest STA in the BSS at a target received power to allow for reception of the lowest MCS. The target may established, e.g., at −85 dBm. The transmit power used may be based on a single TPC request/response frame.

In unfiltered TPC modeling, the AP and the STAs may transmit at a power that may satisfy the link at a time interval. In the case where the packet may not directed at a specific STA (e.g., the beacon), the AP may transmit at a power to satisfy the link of the farthest STA in the BSS. The TPC may be updated on a beacon interval. This modeling may be open loop link margin method (e.g., as provided in 802.11ah) with a per packet update rate (e.g., the enhanced TPC).

In filtered TPC modeling, the AP and STAs may transmit at a power level derived from the transmit power to satisfy the link at that point in time. The power used may be estimated by a unit norm, single pole TTR filter of the form:

$y(n)=a\ y(n-1)+(1-a) \times x(n)$, where y(n) may be the transmit power, y(n−1) may be the transmit power used in earlier transmissions, and x(n) may be the instantaneous power needed. a may be set to a value, e.g., of 0.8. In the case, the TPC may be updated on a beacon interval. This modeling may be open loop link margin method (e.g., as provided in 802.11ah) with a per packet update rate (e.g., the enhanced TPC). The results obtained here may be with and without fractional CSMA/CA.

FIGS. 10 to 13 illustrate an example of Energy Normalized MAC Goodput (e.g., in kbps/Joule) that is plotted against inter-AP spacing (e.g., in meters) for the four middle BSSs of the exemplary 16 AP network as illustrated in FIG. 4. The middle BSSs may be chosen to eliminate the edge-effects on the performance. The energy Normalized MAC goodput may be the ratio of the data payload that may be successfully delivered at the MAC layer to the total transmission time and the energy that may be expended by each of the elements of the network. The energy Normalized MAC goodput may include the effect of MAC retransmissions and may represent the capacity of the network. As illustrated in FIGS. 10 to 13, the inter-AP spacing may range from no over-lap (e.g., at 1200 m) to significant overlap (e.g., at 800 m).

Figure 10:
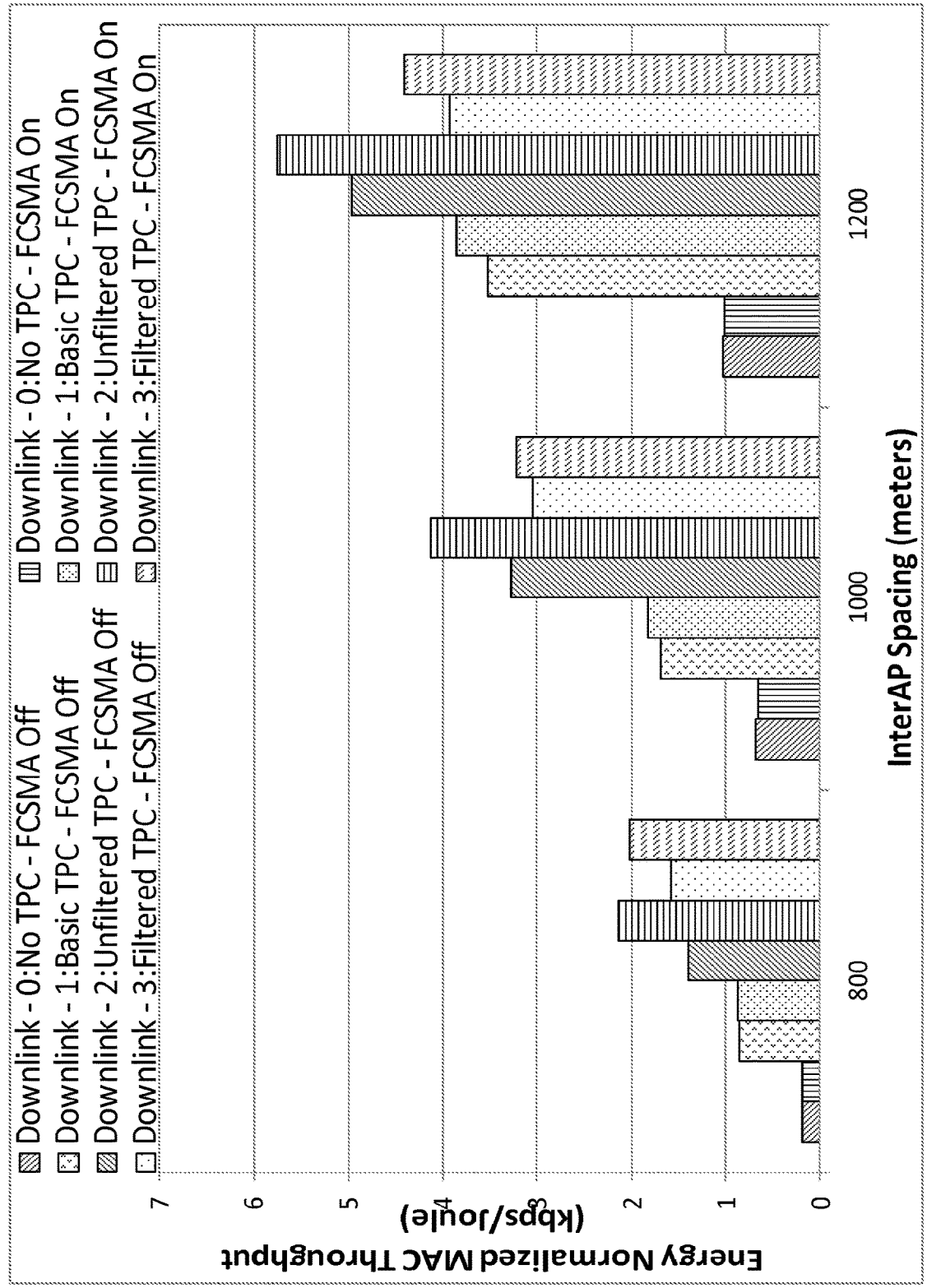
FIG. 10 illustrates an example of downlink performance (packet interval update).
Figure 11:
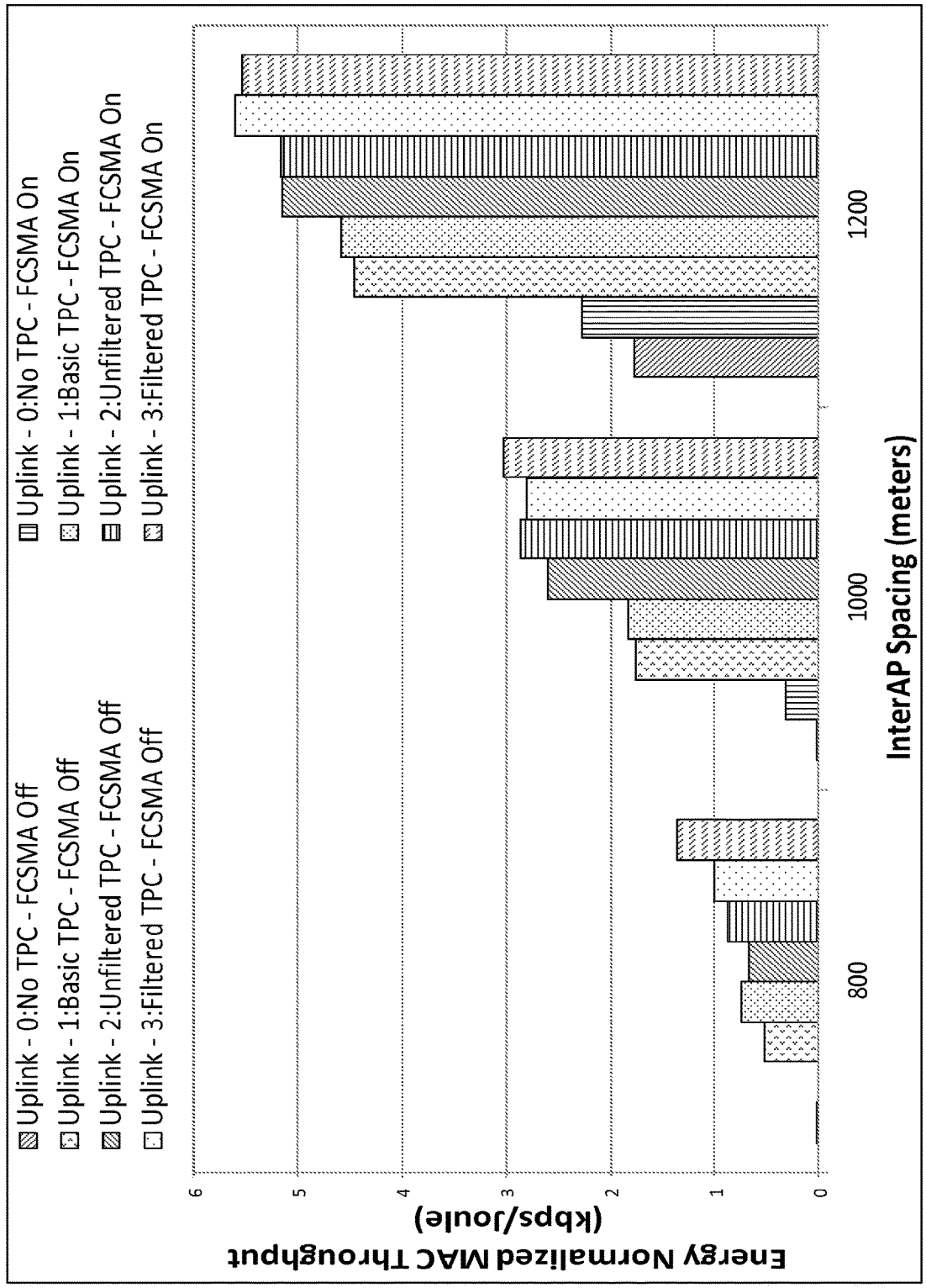
FIG. 11 illustrates an example of uplink performance (packet interval update).
Figure 12:
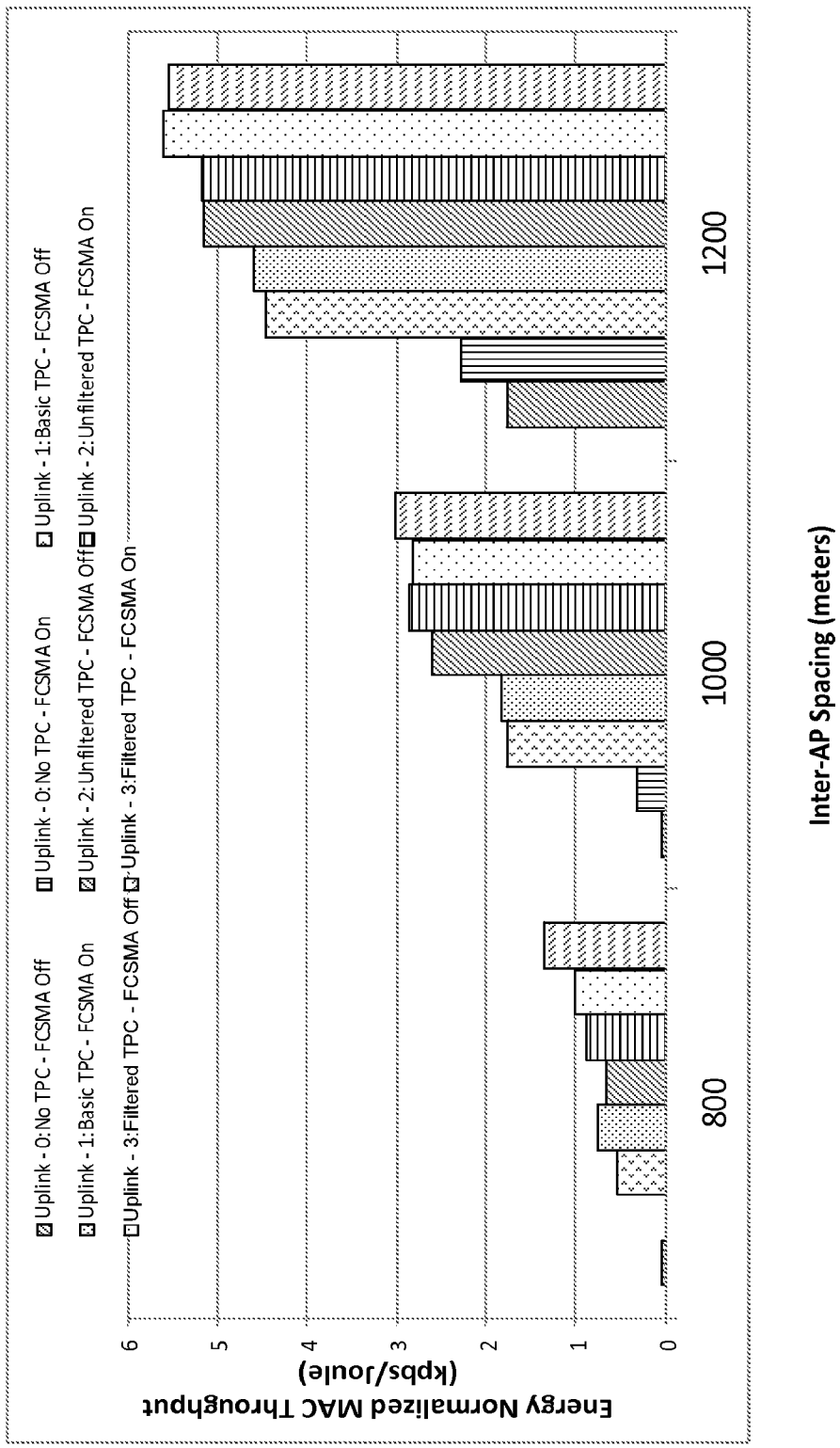
FIG. 12 illustrates an example of downlink performance (beacon interval update).
Figure 13:
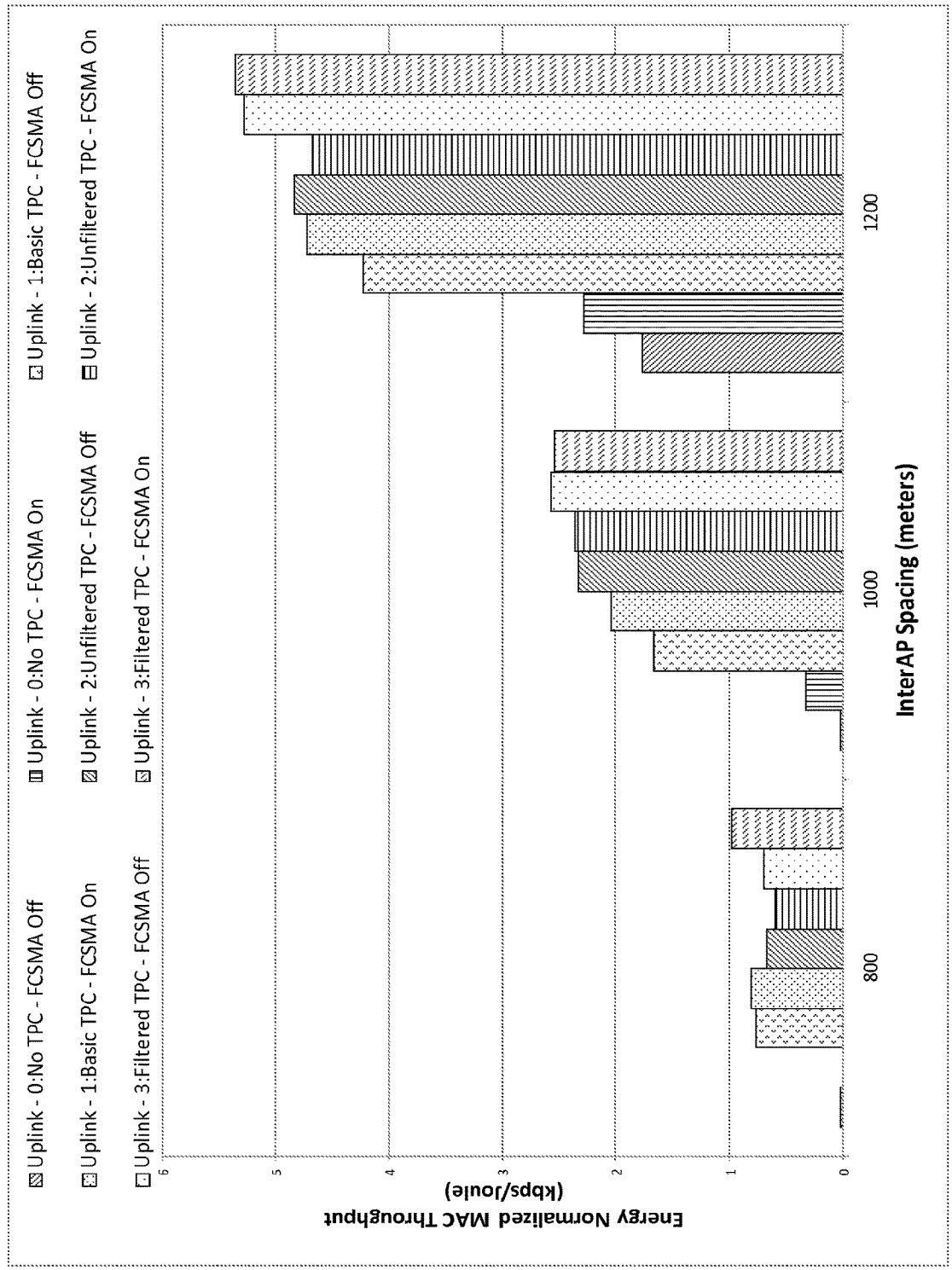
FIG. 13 illustrates an example of uplink performance (beacon interval update).

FIG. 10 and FIG. 11 illustrate an example of downlink and uplink performances respectively, e.g., using per packet updates. FIG. 12 and FIG. 13 illustrate downlink and uplink performances respectively, e.g., using beacon interval updates (e.g., 1.024 seconds updates).

As illustrated in FIG. 10, in downlink transmission with per packet updates, the performance may demonstrate a manner of TPC with increasing overlap based on the performance of the no TPC scheme. In the cases where F-CSMA/CA is off, unfiltered TPC may perform best with little or no overlap in the BSSs, while filtered TPC may perform best when there is overlap. This may be due to the effect of the interference on the transmit power estimation algorithm. With increasing overlap, the estimation algorithm may be less reliable based on the effect of one or more factors, e.g., channel fading, interference, variation from adjacent overlapping BSSs, etc. Filtering may help average the interference and reduce the effect of the variation. The basic TPC may perform the worst of the TPC models. With F-CSMA/CA, each of the TPC models may show an improvement in performance and unfiltered TPC may have the best performance at each of the levels of overlap unlike without F-CSMA/CA. F-CSMA/CA may coordinate the BSS-edge users, which may cause the variation in interference.

As illustrated in FIG. 11, in uplink transmissions using per packet updates, with increasing overlap and no TPC, there is may be no transmission, e.g., at 800 m and 1000 m. In this case, the unfiltered TPC model, may perform best. In the uplink, the interference from STA to AP transmission in adjacent BSSs may be larger than in the downlink and as such, filtering may be needed to mitigate the effect of a mis-estimation of the transmit power that may be needed due to the constantly varying interference. In uplink transmissions, the receiver (e.g., the AP) may be far away enough from the edge STAs in this case to not have the additional scheme. As the overlap increases, the value of F-SCMA may be apparent, e.g., in the case where there may be no TPC (e.g., at 1000 m separation).

As illustrated in FIG. 12, in downlink transmission with beacon interval updates, the filtered TPC may perform best for the scenarios with and without F-CSMA/CA. The non-filtered case may perform even worse than the basic TPC.

As illustrated in FIG. 13, in uplink transmission with beacon interval updates, filtered TPC may perform best, e.g., at 1200 m and 1000 m overlap but the basic TPC may perform best, e.g., at 800 m without F-CSMA/CA. This may be due to the use of ineffective TPC estimates. The non-filtered case may perform even worse than the basic TPC. With F-CSMA/CA, the filtered TPC may perform best even with large overlap.

Combining filtered TPC with fractional CSMA/CA may be used to obtain better energy normalized goodput performances. The adaptation of the filter parameter may enable the use of unfiltered or heavily filtered TPC estimates based on the direction of transmission (e.g., uplink/downlink), and the rate of update in relation to the channel Doppler and interference variation.

FIGS. 14 to 17 illustrate examples of relative performance of an IEEE802.11ah network modeled with a filtered TPC model, beacon interval updates, and F-CSMA/CA off The performance may be modeled having downlink and uplink with no overlap (e.g., 1200 m inter-AP separation) and/or downlink and uplink with overlap (e.g., 800 m inter-AP separation).

As illustrated in the FIGS. 14 to 17, the legend may indicate the TPC type (e.g., filtered vs. unfiltered), the update rate (e.g., packet interval vs. beacon interval), and the F-CSMA/CA state (e.g., on/off) used. The y-axis may indicate the percentage gain in energy normalized MAC throughput of the different schemes over the 802.11ah TPC baseline performance.

Figure 14:
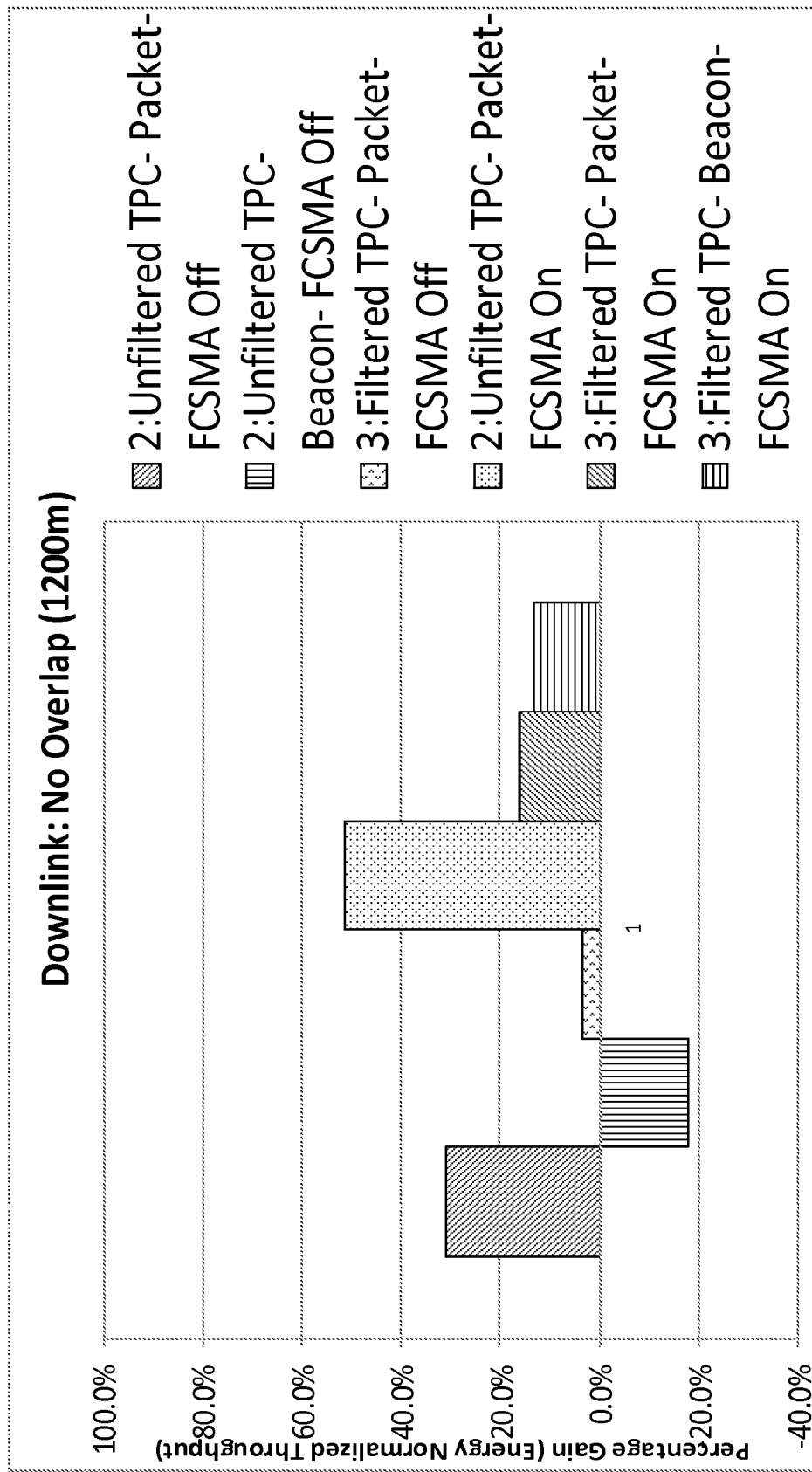
FIG. 14 illustrates an example of downlink no overlap relative performance.
Figure 15:
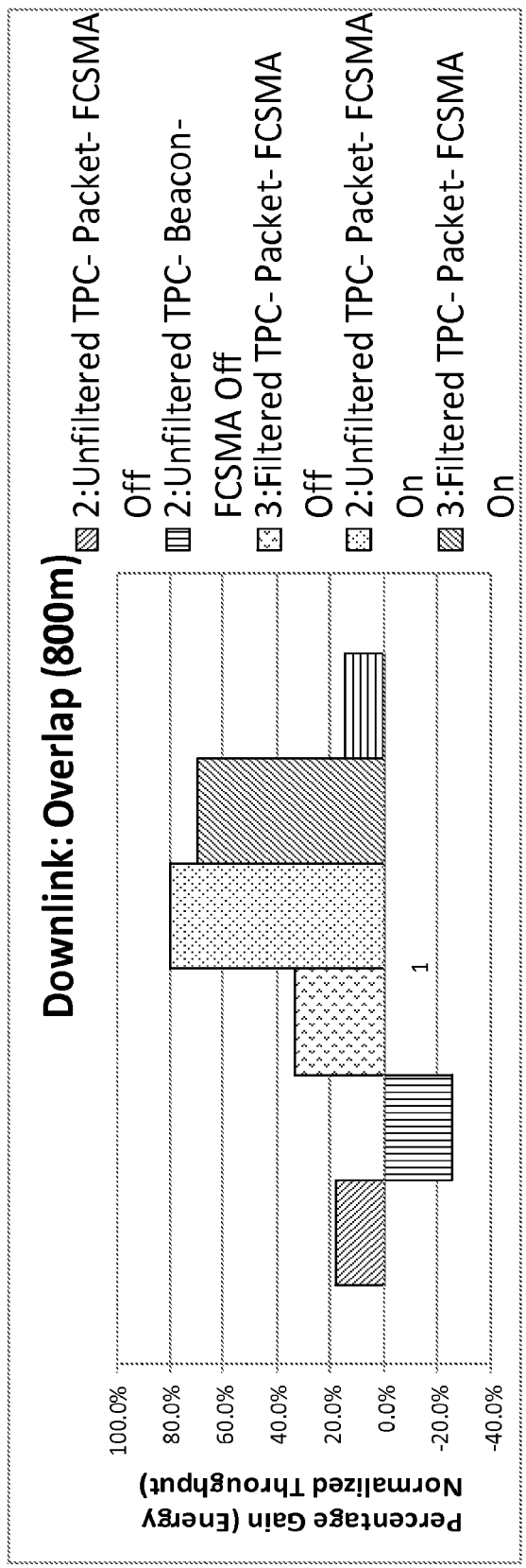
FIG. 15 illustrates an example of downlink overlap relative performance.
Figure 16:
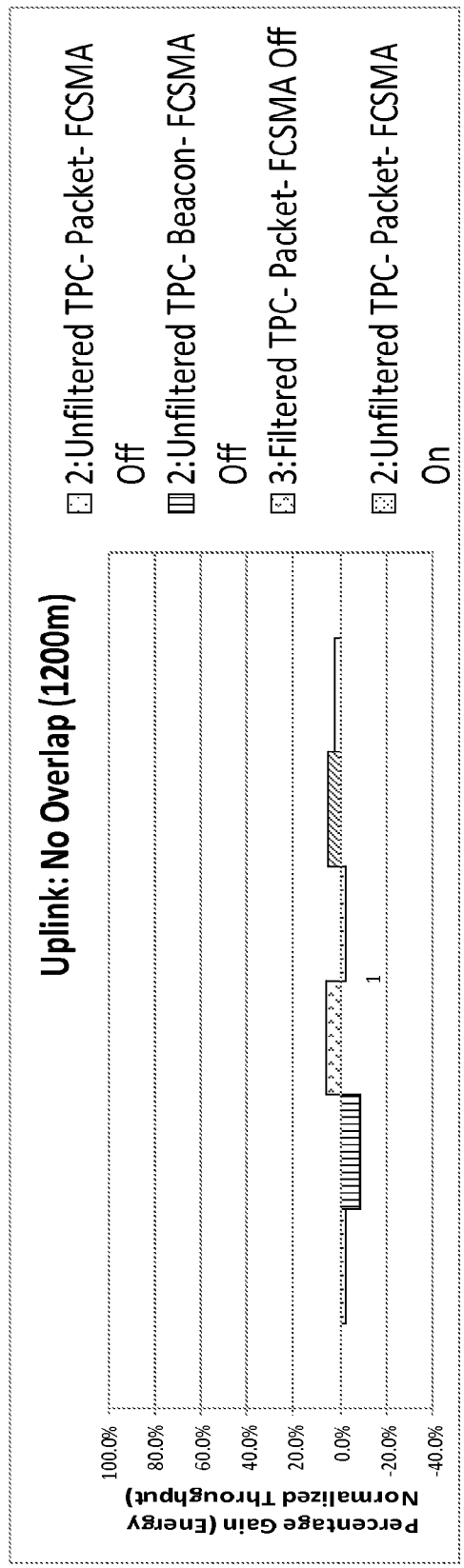
FIG. 16 illustrates an example of uplink no overlap relative performance.
Figure 17:
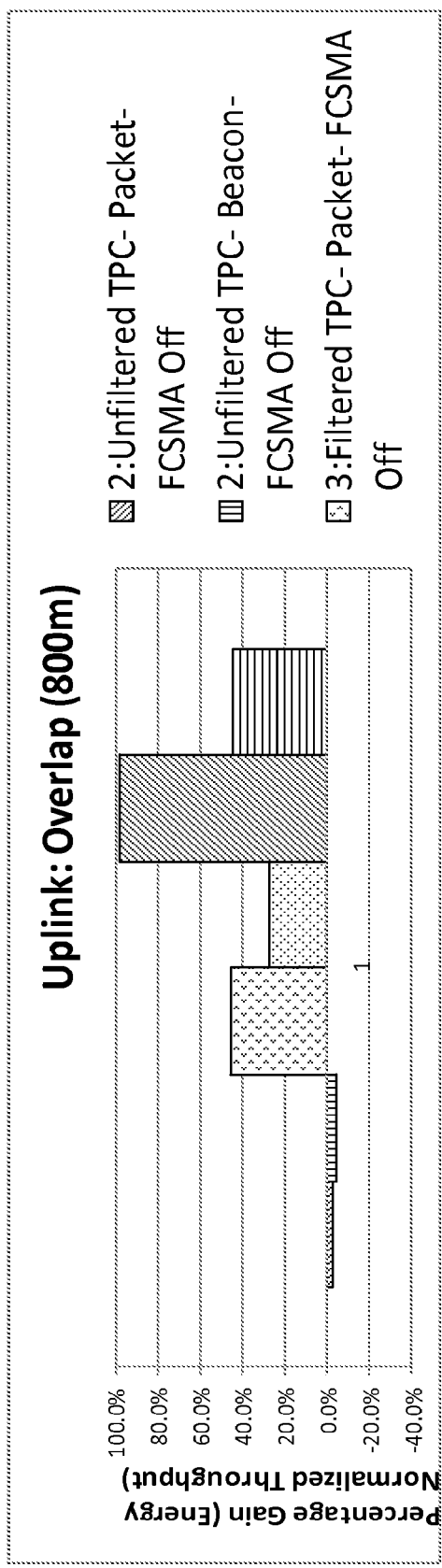
FIG. 17 illustrates an example of uplink overlap relative performance.

As illustrated in FIG. 14, in downlink transmission with no overlap, gains may be obtained by using enhanced TPC (e.g., up to 30%). Combining enhanced TPC and F-CSMA/CA may realize gains of up to 50% over the baseline scheme. As illustrated in FIG. 15, with overlap in BSSs, the benefits of TPC and F-CSMA/CA may be apparent with gains, e.g., of up to 80% over the baseline. As illustrated in FIG. 16, in uplink, with no overlap, the benefits of the schemes may be limited as the receiver (e.g., the AP) may be far away from a transmitter. As illustrated in FIG. 17, in the OBSS scenario, gains of, e.g., up to 100% may be achieved.

Coordination of the transmission/reception of BSS-edge STAs in adjacent BSSs may result in performance improvement in fractional CSMA/CA. The coordination may be centralized or distributed between BSSs and may require transmission of fractional CSMA/CA parameters such as timing, user priorities, random access window durations, beacon intervals etc. Coordination may be by an AP controller, multi-band master AP, or in-band master AP (e.g., in a centralized architecture), or BSS edge STA propagation (e.g., in a distributed architecture).

For fractional CSMA/CA coordination, information may be propagated in a distributed manner through the network. One or more APs in the network may define a master BSS. The master AP or BSS may announce itself as the master AP to the network. The master AP may be manually set up, e.g., during network installation. The master AP may be dynamically designated, e.g., based on one or more network parameters. The master AP may be located near the center of the network. The master AP may send the parameters of its elected groups. The information may include, e.g., number of groups, start time and duration of orthogonal time slots used associated with BSS-edge group (e.g., in the case of orthogonal timing) and start time and duration of restricted access windows slots used associated with BSS-edge group (e.g., in the case of partially-orthogonal timing using a statistical method). The information may further include start time, duration, and priorities associated with BSS-edge group (e.g., in the case of partially-orthogonal timing using the user priority method).

BSS edge STAs in the overlapping regions may overhear the neighboring AP and may relay (e.g., periodically relay) the information to the APs, the STAs are associated with. A new AP added to the network may adjust its parameters based on the incoming information and send this information on its beacon. The information relayed may include, e.g., the distance from the master AP. The distance parameter may enable the parameter estimation to give higher priority to APs that are located nearer to the master AP. The neighboring STAs may overhear the information and may propagate the coordination information throughout the network.

Frequency Domain Fractional CSMA/CA may be provided. An AP may perform fractional CSMA, e.g., when the AP senses interference from an overlapping BSSs (e.g., from other APs). Intra-BSS F-CSMA grouping may be provided. For example, an AP may divide one or more users into a center group and an edge group. The AP may request one or more stations (STAs) to report grouping measurements (e.g., necessary grouping measurements) by sending an intra-BSS F-CSMA Grouping Request frame. The AP may receive from the STAs an intra-BSS F-CSMA Grouping Response frame. The STAs may send the intra-BSS F-CSMA Grouping Response frame in response to the intra-BSS F-CSMA Grouping Request frame. The AP may request the STAs to send one or more of received RSSI, SNR, or SINR as feedback. The AP may use the received feedback information to perform grouping. The AP may request the STAs to provide transmit power and necessary processing margin. The AP may calculate the SNR for each STA using the uplink traffic. The AP may use the transmit power and processing margin information to perform grouping.

Maintenance of the Intra-BSS F-CSMA group may be provided. When a STA associates with the AP, the AP may not have the necessary information to assign the STA a group. The AP may treat the STA as a member of the edge group, e.g., until the AP receives necessary grouping information. The AP may query one or more of the STAs to perform the grouping algorithm, e.g., if the AP determines the current group for STAs may not be suitable. The AP may communicate (e.g., broadcast or multicast) an intra-BSS F-CSMA Grouping Request frame to the STAs. The AP may request the STAs to perform the grouping procedure. A cluster head may communicate (e.g., broadcast) the grouping request information after creating a cluster. One or more APs, for example, not part of the cluster may decide to join the cluster. For example, the APs may join the cluster after the cluster is formed. The AP may repeat the frame on each of the sub-channels with transmit power control. The AP may assign different time slots for the one or more groups (e.g., two groups) of STAs to feedback the intra-BSS F-CSMA Grouping Response frame. The STAs may use the corresponding time slot to send the feedback frame. For example, the STAs may use the time slot according to their current group. A STA may request the AP to check whether the STA may move to another group by sending necessary information to the AP.

The AP may announce the grouping information in intra-BSS Parameter Set element, e.g., when the intra-BSS F-CSMA grouping is determined. The intra-BSS Parameter Set element may be transmitted by one or more of a Beacon frame, a probe response frame, an association authentication frame, or a reassociation response frame.

Figure 18:
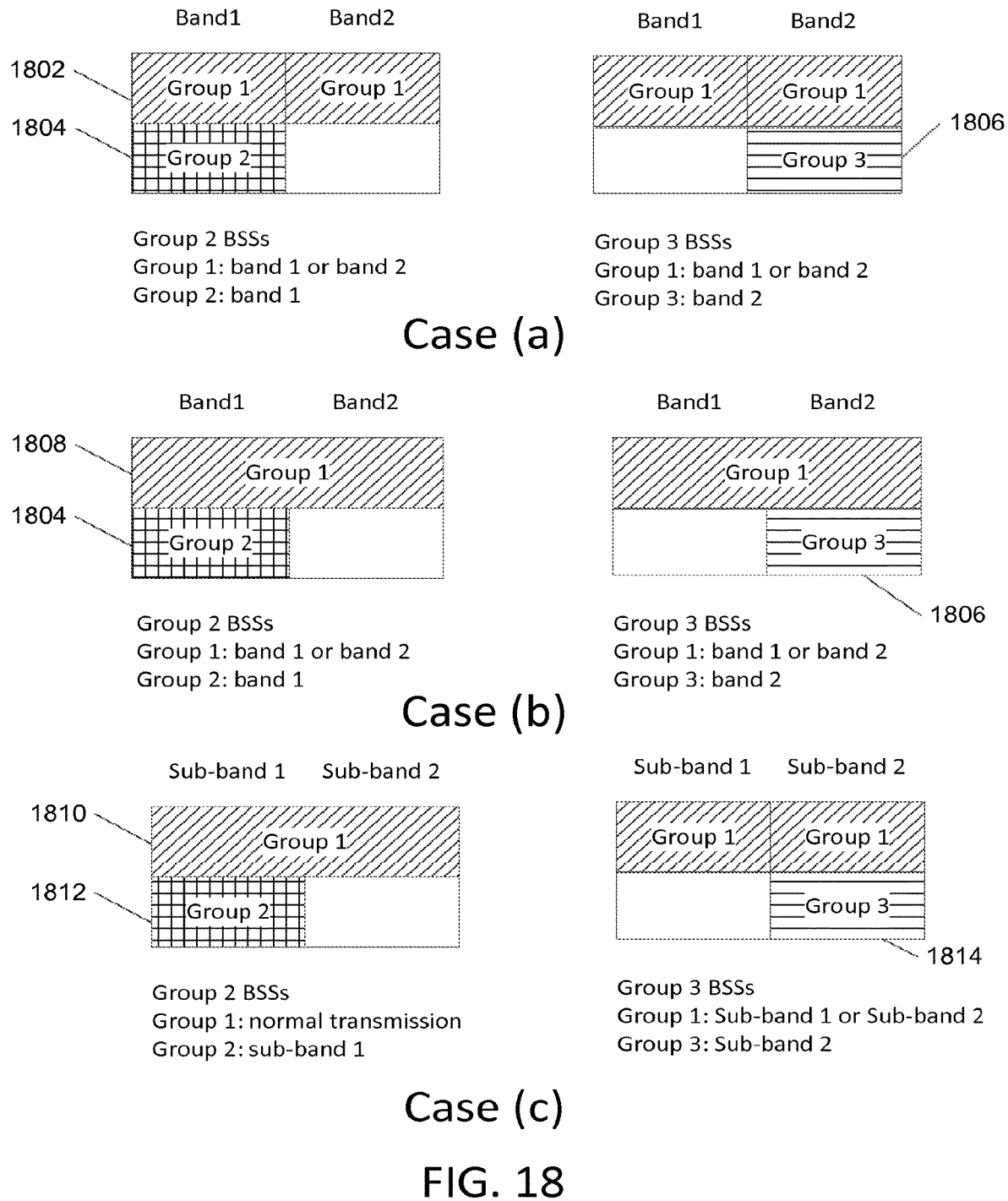
FIG. 18 illustrates an example of frequency domain F-CSMA frequency allocation.

F-CSMA frequency allocation may be provided. FIG. 18 illustrates an example of frequency domain F-CSMA frequency allocation. As illustrated in FIG. 18, one or more STAs (e.g., center STAs) may be assigned to Group 1 and the edge STAs may be assigned to Group 2 or Group 3, e.g., depending on the BSS. The frequency allocation may be one of the Orthogonal Frequency Bands with the same STA/AP bandwidth, Orthogonal Frequency Bands with Different STA/AP Bandwidths, or Orthogonal Frequency Bands with the same STA/AP bandwidth, but different data transmission bands. As illustrated in FIG. 18 (case (a)), in Orthogonal Frequency Bands with the same STA/AP bandwidth, each of the STAs may have the same bandwidth and each group may be transmitted in a separate WLAN band (e.g., a 20 MHz band). As illustrated in FIG. 18, Group 1 1802 may transmit on Band 1 or Band 2, Group 2 1804 may transmit on Band 1 while Group 3 1806 may transmit on Band 2.

As illustrated in FIG. 18 (case (b)), in Orthogonal Frequency Bands with Different STA/AP Bandwidths, the center STAs transmit using a different bandwidth from the edge STAs (e.g., 40 MHz vs. 20 MHz transmission). Group 1 1808 may transmit on Band 1 and Band 2. Group 2 1804 may transmit on Band 1 while Group 3 1806 may transmit on Band 2.

As illustrated in FIG. 18 (case (c)), in Orthogonal Frequency Bands with the same STA/AP bandwidth but different data transmission bands, each of the STAs may have the same bandwidth and each group may be transmitted the same WLAN band (e.g., a 20 MHz band). Within the transmission band, one or more groups may be assigned different sub-carriers/sub-bands. The sub-carriers/sub-bands may be contiguous and/or distributed. As illustrated in FIG. 18 (case (c)), Group 1 1810 may transmit on the entire band, Group 2 1812 may transmit on sub-band 1 while group 3 1814 may transmit on sub-band 2. The frequency bands may be partially orthogonal and/or randomly assigned, allowing some level of overlap between Groups 2 and Group 3.

An AP may perform Intra-BSS F-CSMA using one or more of the following rules. For example, in case of the users that belong to the center group, the AP may allocate one or more sub-channels available to the BSS. In case of the users that belong to the edge group, the AP may coordinate with overlapping BSS (OBSS) STAs and assign one or more sub-channel(s) to them to limit the interference. In case of the users that may join (e.g., newly join) the BSS and have no group is assigned, the AP may treat them temporarily as edge group users, and assign the edge group sub-channels to them. The AP may assign one or more sub-channel(s) for uplink random access sub-channel(s) where each of the associated STAs may utilize to ask for uplink resource allocation. When intra-BSS F-CSMA is utilized, the AP may allocate the one or more edge group sub-channels for uplink random access sub-channels for each of the users. The AP may schedule the two groups of users using different sub-channels for uplink random access. The two groups of users may perform the uplink random access simultaneously on the same time slot, or on different time slots.

An AP may have F-CSMA channel access and regular CSMA channel access. Within F-CSMA channel access period, intra-BSS F-CSMA may be performed as described herein. Within CSMA channel access period, the AP may choose whether F-CSMA is utilized. If F-CSMA is utilized, the AP may use time/frequency domain F-CSMA scheme defined in previous embodiments or the AP may transmit to the two groups using different power control algorithms and CCA thresholds.

The F-CSMA may be combined with transmit power control so that the center BSS transmission in one BSS may not impact the interfered BSS. The transmit power, e.g., may be adjusted based on the group in the active CSMA/CA pool. The maximum transmit power may determine the power at which control frames to each of the STAs may be sent. For example, if group 1 is in the pool, the maximum transmit power may be limited to the worst STA in the limited group, e.g., the STA that may need the maximum transmit power in Group 1. The maximum transmit power may be used for the data and/or the control frames. If each of the STAs are in the pool, the maximum transmit power may be limited to the worst STA in the BSS, e.g., the STA that may require the maximum transmit power in the BSS.

Inter-BSS Coordination may be provided. APs may conduct inter-BSS coordination in order to achieve the optimal operations for Frequency Domain Fractional CSMA/CA (FD F-CSMA). Such inter-BSS coordination may be distributed or centralized. In addition, FD F-CSMA may be uniform for each of the BSSs, for example, in a uniformly deployed hot spot scenario, or it may be customized for each BSS and may be negotiated by individual APs in the neighboring BSSs.

An AP that may be capable of inter-BSS coordination for FD F-CSMA may include an Inter-BSS Coordination Capability element in its beacon, probe request/response, (re) association request/response, and/or other type management, control or extension frames to indicate its FD-F-CSMA inter-BSS coordination capabilities.

Figure 19:
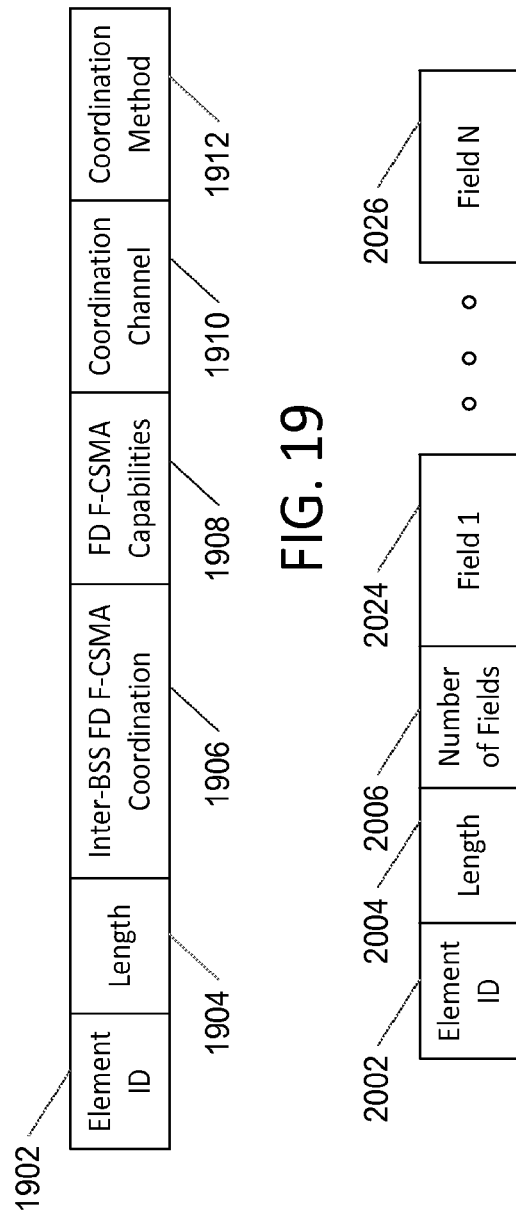
FIG. 19 illustrates an example of the Inter-BSS Coordination Capability element.

FIG. 19 illustrates an example of the Inter-BSS Coordination Capability element. The information element may include one or more of an Element ID field 1902, a Length field 1904, an Inter-BSS FD F-CSMA Coordination field 1906, a FD F-CSMA Capabilities field 1908, a Coordination Channel field 1910, or a Coordination Method field 1912.

The Element ID 1902 field may indicate that the current element is an Inter-BSS Coordination Capability element. The Length field 1904 may indicate that the length of the Inter-BSS Coordination Capability element. The Inter-BSS FD F-CSMA Coordination field 1906 may indicate whether the transmitting STA/AP is capable of Inter-BSS FD F-CSMA Coordination. For example, the Inter-BSS FD F-CSMA Coordination field 1906 may be implemented as one bit. The Inter-BSS FD F-CSMA Coordination field 1906 may indicate that the transmitting STA/AP is capable of Inter-BSS FD F-CSMA Coordination, e.g., when the bit is set to a value of 1. The bit may indicate that the Inter-BSS FD F-CSMA capability may be part of an Inter-BSS Coordination Capability field. The Inter-BSS Coordination Capability field 1906 may indicate the capabilities for coordination between the BSSs. The capability of inter-BSS FD F-CSMA coordination may be indicated by the inclusion of the Inter-BSS Coordination Capability element.

The FD F-CSMA Capabilities field 1908 may indicate the various FD F-CSMA capabilities that the transmitting STA/AP may be capable of. The FD F-CSMA Capabilities Feld 1908 may include one or more of a Uniform FD F-CSMA subfield, an Individual FD F-CSMA subfield, a Sectorized FD F-CSMA subfield, a Detailed OBSS reporting subfield, an Individual STAs FD F-CSMA feedback subfield, or an FD F-CSMA Resources subfield.

The Uniform FD F-CSMA subfield may indicate that the transmitting STA/AP is capable of conducting uniform FD F-CSMA in its BSS (e.g., assigned by a centralized coordinator in an uniformly deployed OBSS scenario). The Individual FD F-CSMA subfield may indicate that the transmitting STA/AP is capable of conducting individual FD F-CSMA in its BSS (e.g., negotiating with APs in the neighboring BSS). The Sectorized FD F-CSMA subfield may indicate that the transmitting STA/AP is capable of conducting individual FD F-CSMA in each sectors of its BSS. The Detailed OBSS reporting subfield may indicate whether the transmitting STA/AP is capable of providing detailed information on the OBSS operations or OBSS FD F-CSMA operations. Individual STAs FD F-CSMA feedback subfield may indicate that the transmitting STA/AP is capable of receiving feedback on the FD F-CSMA behavior for one or more individual STAs in its BSS. The FD F-CSMA Resources subfield may indicate the FD F-CSMA Resources that the transmitting STA/AP is capable of adjusting for its FD F-CSMA operations in its BSS.

The FD F-CSMA Resources subfield may include one or more of a Channel sub-subfield, a Sub-carrier Groups sub-subfield, a Resource Blocks sub-subfield, or a Sectors sub-subfield. The Channel sub-subfield may indicate that the FD F-CSMA is based on channels. The Sub-carrier Groups sub-subfield may indicate that the FD F-CSMA is based on sub-carrier groups. The Resource Blocks sub-subfield may indicate that the FD F-CSMA is based on resource blocks. The Sectors sub-subfield may indicate that the FD F-CSMA is based on sectors. This sub-subfield may be used in combination with one of the other sub-subfields in this field to indicate the exact FD F-CSMA resources used in each of the sectors of the transmitting STA/AP's BSS.

As illustrated in FIG. 19, the Coordination Channel field 1910 may indicate the channel, sub-carrier group or RB that the transmitting STA/AP uses for coordination for the FD F-CSMA or other types of inter-BSS coordination. The Coordination Method field 1910 may include one or more of a Distributed subfield, a Centralized subfield, a Coordinator Capable subfield, a Coordinator subfield, a Coordination Relay Capable subfield, a Coordination Relay subfield, or a Coordination interface subfield.

The Distributed subfield may indicate that the transmitting STA/AP is capable of distributed inter-BSS FD F-CSMA coordination. The Centralized subfield may indicate that the transmitting STA/AP is capable of centralized inter-BSS FD F-CSMA coordination. The Coordinator Capable subfield may indicate whether the transmitting STA/AP is capable of functioning as the centralized coordinator. The Coordinator subfield may indicate whether the transmitting STA/AP currently functions as the centralized coordinator. The Coordination Relay Capable subfield may indicate whether the transmitting STA/AP is capable of relaying coordination related traffic. The Coordination Relay subfield may indicate whether the transmitting STA/AP currently functions as a relay for coordination related traffic. The Coordination interface subfield may indicate the interface that the transmitting STA/AP may use for coordination for the FD F-CSMA or other types of inter-BSS coordination. For example, the interface may be the same 802.11 interface through which the current Inter-BSS Coordination element may be transmitted or a different 802.11 interface, which may be on a different frequency band, or a wired interface (e.g., an Ethernet interface, a Distribution System (DS), etc.), or other type of wireless interface.

As illustrated in FIG. 19, the coordination method field 1912 may indicate the coordination method used. The coordination method may be centralized or distributed.

An Inter-BSS Coordination Operation element may be provided. The Inter-BSS Coordination Operation element may have the same fields as the Inter-BSS Coordination Capability element except that the Element ID field may indicate that the current element is an Inter-BSS Coordination Operation element.

The Inter-BSS Coordination Capability and/or Operation element(s), or any set or subset of any fields or subfields thereof, may be implemented as a part of information element, such as HEW/VHSE Capability element, HEW/VHSE Operation element, or a part of a control, management or extension frames.

An AP may include the Inter-BSS Coordination Capability element in its beacon, short beacon, probe response, association response or other types of frames such as control, management, or extension frames, e.g., if an AP is capable of inter-BSS FD F-CSMA coordination. If an STA is capable of supporting certain inter-BSS FD F-CSMA capabilities, such as Detailed OBSS Reporting, or Coordination Relay Capable, the STA may include an Inter-BSS Coordination Capability element in its probe request, (re)

association request, or other types of frames such as control, management or extension frames. An AP may reject (re) association request from a STA based on the STA's Inter-BSS FD F-CSMA capabilities. An AP may send Inter-BSS FD F-CSMA coordination related packets to another AP or STA, e.g., if the STA/AP has indicated that they are also Inter-BSS FD F-CSMA coordination capable. An AP or STA may send an Inter-BSS FD F-CSMA coordination related packets to another AP or STA to forward to another AP or the centralized coordination, e.g., if the AP or STA has indicated that they are capable of Coordination Relay and/or they are currently functioning as a Coordination Relay.

Figure 20:
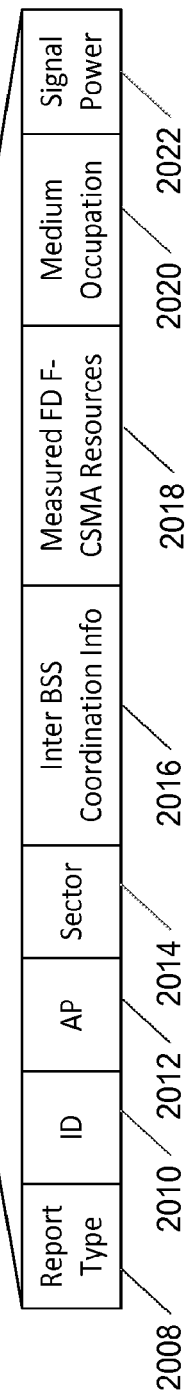
FIG. 20 illustrates an example of the OBSS Reporting element.

An AP or STA may provide a detailed report on the overlapping BSS' that it may detect using the OBSS Reporting element to another AP or a central Inter-BSS coordinator (IBC). FIG. 20 illustrates an example of the OBSS Reporting element. The OBSS Reporting element may include one or more of an Element ID field 2002, a Length field 2004, Number of Fields field 2006, or one or more fields, e.g., Field 1 2024 to Field N 2026.

The Element ID field 2002 may indicate that the current element is an OBSS Reporting element. The Length field 2004 may indicate that the length of the OBSS Reporting element. The Number of Fields field 2006 may indicate the number of reporting fields included. Each of the Field 1 to Field N reporting fields may include a report of the type specified in Report Type subfield. Each of the Field 1 to Field N may include a Report Type subfield 2008, an ID subfield 2010, an AP subfield 2012, a Sector subfield 2014, an Inter-BSS Coordination Info subfield 2016, a Measured FD F-CSMA resources subfield 2018, a Medium Occupation subfield 2020, or Signal Power subfield 2022.

The Report Type subfield 2008 may indicate the type of reported entities included in the current reporting Field. The Report Type subfield 2008 may include one or more of BSSs (e.g., the report may be a report on a BSS), one or more Sector(s) (e.g., the report may be a report on a BSS' sector), one or more STA(s) (e.g., the report may be a report on one or more STAs, such as an individual STA or a group of STAs), a Coordinator (e.g., the report may be on a central inter-BSS coordinator), a Coordination Relay (e.g., the report may be on a coordination relay), an Interference report (e.g., this report may be on interference that may not be determined to be related a BSS, such as non-Wi-Fi interference, or WLAN packets that cannot be decoded).

The ID subfield 2010 may indicate the ID of the entity being reported. The ID may be implemented using the MAC address and/or the BSSID, e.g., when the report type is BSS or Sector(s). The ID may be implemented using the MAC address of the Coordinator or Coordination Relay, e.g., when the report type is Coordinator or Coordination Relay. The ID may be implemented using the MAC address of the STA or the group address or group ID of a group of STAs, e.g., when the report type is STA(s).

The AP subfield 2012 may be included, for example, when the report type is Sector(s), STA(s). This subfield may be implemented using the MAC address of the AP. The Sector subfield 2214 may indicate the sector of the AP's BSS for which the Resource allocation may apply.

The Inter-BSS Coordination Info subfield 2016 may include the information found in the Inter-BSS Coordination Capability or Operation element transmitted by the STA/AP. The AP subfield 2012 may indicate No Inter-BSS Coordination, e.g., if the BSS of the reported entity is not capable of Inter-BSS Coordination.

The Measured FD F-CSMA resources subfield 2018 may indicate the FD F-CSMA resources for which the reported measurement may be conducted. The Measured FD F-CSMA resources subfield 2018 may indicate channel(s), sub-carrier group(s), Resource Block(s). The Measured FD F-CSMA resource may be included once in front of the reporting fields or in one of the reporting fields, e.g., if the measured FD F-CSMA resources are the same for each of the reporting fields.

The Medium Occupation subfield 2020 may indicate the measured medium occupation time of the entity being reported. The measured medium occupation time may be implemented as a percentage of unit time or may be implemented using mean, maximal and minimal value of the percentage of unit time.

The Signal Power subfield 2022 may include the Signal Power that may be received from the BSS or the STA being reported. The Signal Power subfield 2022 may include one or more of a received signal power from the AP of the BSS of the reported entity, a received signal power from the STAs which are part of the reported entity, each of the signal power may be implemented as a tuple of (max, min, average) or a list of percentile values or as a distribution.

The OBSS Report element, or a set or subset of the fields or subfields thereof may be implemented as a part of an information element or a part of a control, management, or extension frames. In OBSS reporting, an AP may conduct measurement for one or more of its neighboring BSSs. The AP may create an OBSS Report element. The AP may request a STA, e.g., in its BSS, to conduct measurements for one or more of its neighboring BSSs and create an OBSS Report element and send it to the AP. A STA may provide an unsolicited OBSS Report element to its AP, e.g., if the STA experiences high interference from an OBSS. An AP or a STA may construct an OBSS Report element on one or a group of STAs, or sectors, e.g., if the AP or the STA experiences high level of interference from that particular entity. An AP may request a STA to provide information using an OBSS Report element of a presence of an Inter-BSS Coordinator or a Coordination Relay.

In a distributed Inter-BSS FD F-CSMA coordination, an AP, e.g., AP1 in BSS1, may conduct negotiation (e.g., one-on-one negotiation) with another AP, e.g., AP2 in BSS2. The AP1 may include an OBSS Report element on BSS2 or entities within BSS2, or parts thereof as a part of the negotiation packet exchanges. As a part of the FD F-CSMA negotiation packet exchanges, AP1 may include OBSS Report elements on multiple OBSSs or other reported entities or parts thereof.

In Inter-BSS FD F-CSMA coordination (e.g., centralized Inter-BSS FD F-CSMA coordination), an AP may construct one or more OBSS Report elements on each of the OBSSs or other reported entities within each of the OBSSs. The AP may forward the OBSS Report elements to an IBC. An AP may request an STA and/or an AP that may function as Coordination Relay to forward the OBSS Report element or parts thereof to a target AP or an IBC. An AP may periodically send OBSS Report elements on its OBSS to its neighboring APs or the IBC for updates.

Figure 21:
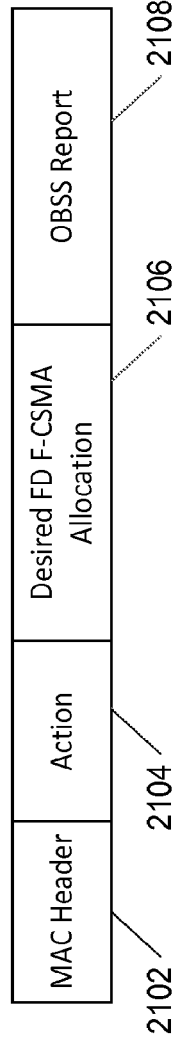
FIG. 21 illustrates an example of a Centralized frequency domain fractional CSMA (FD F-CSMA) Coordination Request frame.

FIG. 21 illustrates an example of a Centralized FD F-CSMA Coordination Request frame. An AP may send a Centralized Inter-BSS FD F-CSMA Coordination Request (CIBCReq) to an IBC. The CIBCReq may be implemented as an HEW/VHSE action frame or HEW/VHSE Action no ACK frame. As illustrated in FIG. 21, the CIDBReq frame may include one or more of a MAC Header field 2102, an Action field 2104, a Desired FD F-CSMA Allocation field 2106, or an OBSS Report field 2108. The Action field 2104 may include a Category subfield and/or an Action Details subfield. The Category subfield may be indicated as HEW/VHSE. The Action Details subfield may indicate that the frame is a CIBCReq frame. The CIBCReq may be may be communicated as one of an extension frame, a management frame, or a control frame. The CIBCReq may include additional fields including an OBSS Report field 2108, and Desired FD F-CSMA Allocation field. The OBSS Report field 2108 may be implemented using the OBSS Report element or include parts thereof. The OBSS Report field 2108 may include reporting fields for multiple entities in the OBSS of the reporting AP/BSS.

Figure 22:
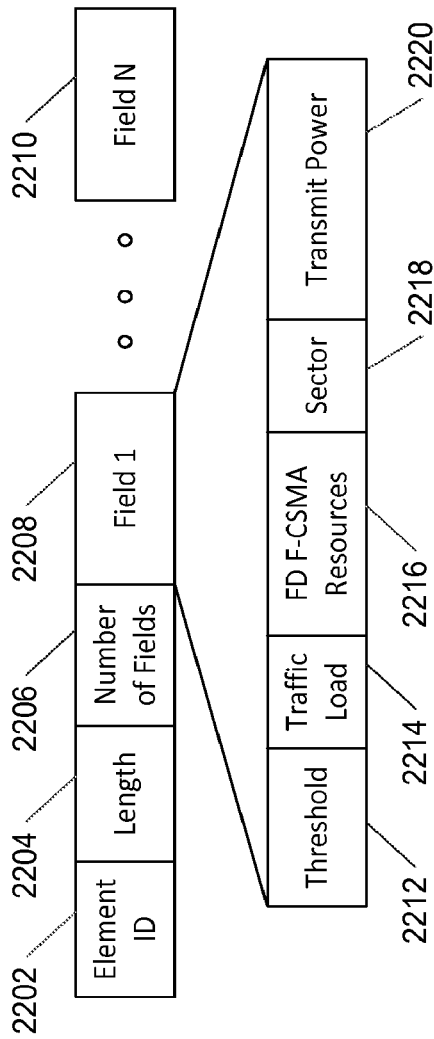
FIG. 22 illustrates an example of an FD F-CSMA Allocation element.

An AP may include a Desired FD F-CSMA Allocation field to indicate the FD F-CSMA Allocation desired by the transmitting AP/BSS. The Desired FD F-CSMA Allocation field may be implemented using the FD F-CSMA Allocation clement. FIG. 22 illustrates an example of an FD F-CSMA Allocation element. As illustrated in FIG. 22, the Desired FD F-CSMA Allocation element may include one or more of an Element ID field 2202, a Length field 2204, a Number of fields field 2206, or one or more fields (e.g., Field 1 2208 to Field N 2210.

The Element ID field 2202 may indicate that the current element is a FD F-CSMA Allocation element. The Element ID field 2202 may be included in the CIBCReq frame. The Length field 2204 may indicate the length of the element. The Number of fields field 2206 may indicate the number of fields included in this element. This field may be omitted, e.g., if the number of fields is fixed. Each of the fields Field 1 2208 to Field N 2210 may include the allocation of the FD F-CSMA resources. Each of the fields Field 1 2208 to Field N 2210 may include one or more subfields, e.g., a Threshold subfield 2212, a Traffic load subfield 2214, an FD F-CSMA Resources subfield 2216, a Sector subfield 2218, a Transmit power subfield 2220.

The Threshold subfield 2212 may indicate the area for which the specified FD F-CSMA Resource allocation may apply. The Threshold subfield 2212 may be provided as a distance, e.g., distance from the AP, or a signal power value, e.g., as measured at the AP. The Threshold field 2212 may be implemented as the maximal or the minimal value for which the FD F-CSMA Resource allocation may apply. For example, the FD F-CSMA resources allocation may apply for each of the STAs that may be at least Threshold meters away from the AP. The FD F-CSMA resources allocation may apply for each of the STAs that may not be more than Threshold meters away from the AP. The FD F-CSMA resource allocation may be valid for STAs whose parameters fall between the current threshold value and the threshold value of the immediately previous field (or 0 or infinity depending whether the threshold value is maximal or minimal), e.g., if multiple field are included.

The AP may include (e.g., optionally include) in the Traffic Load Subfield 2214 the expected traffic load for the area which e.g., may be determined using the Threshold value specified by the Threshold subfield 2212. The FD F-CSMA Resources subfield 2216 may indicate the FD F-CSMA Resources requested by the AP. The FD F-CSMA Resources subfield 2216 may be implemented as channel(s), sub-carrier groups, or resource blocks (RBs). A number may be used to refer to the pre-defined patterns or groups of resources, e.g., if the resources are grouped into pre-defined patterns. The Sector subfield 2218 may indicate the sector of the AP's BSS for which the Resource allocation may apply. The Transmit power subfield 2220 may indicate the transmit power to be used for the STAs located in the area using the proposed FD F-CSMA resources.

The FD F-CSMA Allocation element, or a set or subset of any fields or subfields thereof, may be implemented as any part of an element (e.g., a new or an existing element), or a part of a control frame, a management frame, or an extension frame.

An AP may request an STA and/or an AP to function as a Coordination Relay to forward a CIBCReq to an IBC. The AP may use the Coordination method indicated by the IBC in its Inter-BSS Coordination Capability/Operation element.

Figure 23:
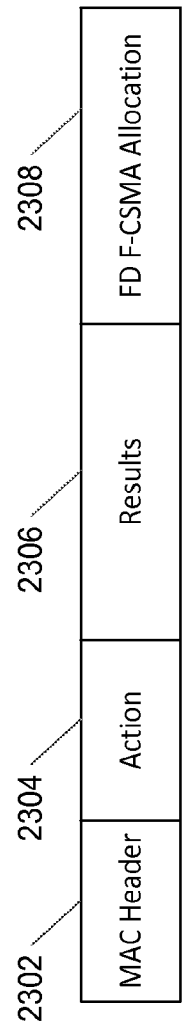
FIG. 23 illustrates an example of a Centralized Inter-BSS FD F-CSMA Coordination Response (CIBCRep) frame.

An IBC may maintain a database of the OBSS reports on each of the deployed BSSs. When the IBC receives a CIBCReq frame from an AP, e.g., if a Desired FD F-CSMA Allocation is included, the IBC may evaluate whether the proposed FD F-CSMA Allocation is acceptable. The IBC may reply with a Centralized Inter-BSS Coordination Reply (CIBCRep) accepting the proposed FD F-CSMA Allocation, e.g., if the FD F-CSMA Allocation is acceptable. The IBC may deny the proposal and include a proposed FD F-CSMA Allocation in the CIBCRep, e.g., if the proposed FD F-CSMA Allocation is not acceptable. The IBC may provide an assigned allocation for the AP in the CIBCRep frame, e.g., if the AP does not include any proposed FD F-CSMA allocation in its CIBCRep frame. FIG. 23 illustrates an example of a CIBCRep frame. The CIBCRep may be implemented as an HEW/VHSE Action frame or an HEW/VHSE Action no ACK frame. As illustrated in FIG. 23, the CIBSRep frame may include one or more of a MAC Header 2302, an Action field 2304, a Results field 2306, or an FD F-CSMA Allocation field 2308. The Action field 2304 may include a Category subfield and/or an Action detail subfield. The Category subfield may be indicated as HEW/VHSE. The Action detail field may indicate that it is a CIBCRep frame. The CIBCReq may be defined as one of an extension frame, a management frame, or a control or. The Results field 2306 may indicate whether the proposed FD F-CSMA Allocation is accepted or denied. The FD F-CSMA Allocation field 2308 may be the proposed FD F-CSMA Allocation by the IBC.

An AP may receive the CIBCRep frame from an IBC. The AP may ACK the received CIBCReq frame and may start to use the FD F-CSMA allocation, e.g., if the AP's proposed Allocation has been accepted by the IBC and/or the AP decides to accept the assigned FD F-CSMA Allocation by the IBC. The AP may repeat the Inter-BSS Coordination process by sending another CIBCReq frame to the IBC until a satisfactory assignment of the FD F-CSMA allocation has been received.

The distributed Inter-BSS FD F-CSMA Coordination may be provided. An AP may send a Distributed Inter-BSS FD F-CSMA Coordination Request (DIBCReq) to each of its overlapping BSSs. The DIBCReq may be similar to the CIBCReq. The DIBCReq may be implemented as an HEW/VHSE Action frame or an HEW/VHSE Action no ACK frame. In the Action field of the DIBCReq frame, the Category subfield may be indicated as HEW/VHSE. The Action detail subfield may indicate that it is a DIBCReq frame. The DIBCReq may be defined one of an extension frame, a management frame, or a control frame. The DIBCReq may include OBSS Report and Desired FD F-CSMA Allocation fields.

The OBSS Report field may be implemented using the OBSS Report element or include parts thereof. The OBSS Report may include reporting fields for multiple entities in the OBSS of the reporting AP/BSS.

An AP may include the Desired FD F-CSMA Allocation field to indicate the FD F-CSMA Allocation desired by the transmitting AP/BSS. The Desired FD F-CSMA Allocation field may be implemented using the FD F-CSMA Allocation element, e.g., as illustrated in FIG. 22.

An AP may request an STA and/or an AP that functions as a Coordination Relay that it may forward the DIBCReq to the APs of its OBSS. Each AP capable of distributed Inter-BSS FD F-CSMA Coordination may maintain a database of the OBSS reports on each of its OBSS. When an AP receives a DIBCReq frame from a requesting AP, the AP may evaluate whether the proposed FD F-CSMA Allocation is acceptable for its own BSS, e.g., if a Desired FD F-CSMA Allocation is included. The AP may reply with a Distributed Inter-BSS Coordination Reply (DIBCRep) frame (e.g., as illustrated in FIG. 23). The AP may accept the proposed FD F-CSMA Allocation, e.g., if the FD F-CSMA Allocation is acceptable. The AP may deny the proposal and may include a proposed FD F-CSMA Allocation in the DIBCRep, e.g., if the proposed FD F-CSMA Allocation is not acceptable. The DIBCRep frame may be similar to the CIBCRep. The DIBCRep may be implemented as a HEW/VHSE Action frame or HEW/VHSE Action no ACK frame. In the Action field, the Category subfield may be indicated as HEW/VHSE, and the Action detail field may indicate that it is a DIBCRep frame. The DIBCReq may be defined as an extension frame, or any other type of management, control or extension frames. The DIBCReq may have a Results field and an FD F-CSMA Allocation field. The Results field may indicate whether the proposed FD F-CSMA Allocation is accepted or denied. The FD F-CSMA Allocation field may be the proposed FD F-CSMA Allocation by the responding AP.

The requesting AP may start to use the FD F-CSMA allocation if each of the APs (or a particular set of APs) in its OBSS may have accepted its proposed Allocation, e.g., when the requesting AP receives the DIBCRep frame from each OBSS AP or from a particular set of APs. The AP may repeat the Inter-BSS Coordination process by sending an DIBCReq frame to each of the APs of its OBSS until a satisfactory FD F-CSMA allocation has been accepted by each of the APs in its OBSS or by a particular set of APs.

Figure 24:
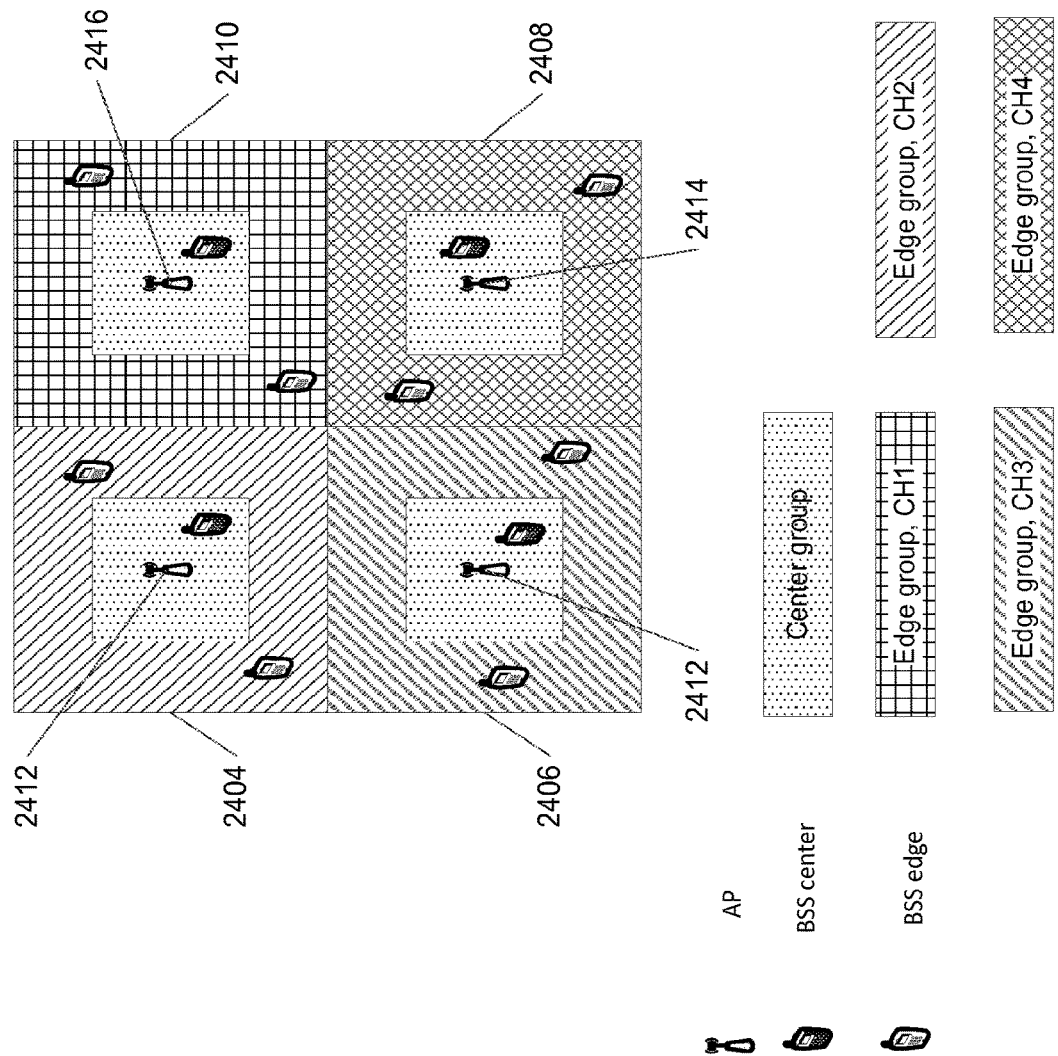
FIG. 24 illustrates an example of Coordinated Block Based Resource Allocation fractional CSMA (COBRA F-CSMA).

Coordinated Block-Based Resource Allocation (COBRA) with Fractional CSMA/CA may be provided. The combination of COBRA with fractional CSMA may provide a flexible operation with limited co-channel interference. FIG. 24 illustrates an example of COBRA F-CSMA. As illustrated in FIG. 24 each BSS may be associated with a center group and/or an edge group. The association with a center group and/or an edge group may depend on the transmit power of the AP and/or power control algorithms utilized by the WLAN system. In some scenarios, a group (e.g., a center group or an edge group) in a BSS may be provided. The transmission in the center group may have no interference with neighboring overlapping BSSs. The edge group may be expected to experience a level of interference from OBSSs. As illustrated by example in FIG. 24, the four BSSs 2404, 2406, 2408, and 2410 may operate on the same channel (e.g., frequency reuse may be equal to 1). Each COBRA AP may have four sub-channels. For users located within center group, the COBRA APs may follow COBRA process and allocate one or more sub-channels to each COBRA user. For users located within edge group, the overlapping COBRA APs may coordinate in a centralized or distributed way to assign sub-channels, such that the interference between OBSS is limited. These sub-channels may be referred as edge sub-channels. For center group users one or more sub-channels may be assigned that are distinct from the edge sub-channels. The power control procedures utilized for these center and the edge groups may be different.

As illustrated in FIG. 24, the four BSSs 2404, 2406, 2408, and 2410 may operate on overlapped channels (e.g., channels 1, 2, 3, and 4). The BSSs may operate on fully overlapping or partially overlapping channels. For example, AP1 2412 may operate on 80 GHz channel including channels 48, 52, 56, or 60, AP2 2414 may operate on channels 52, 56, 60, or 64, AP3 2416 may operate on channels 48, 52, and AP4 2418 may operate on channels 52 or 56. One or more sub-channels in one BSS may be overlapped partially with sub-channels in another BSS. The users in center group of each BSS may use each of the sub-channels. The users in edge group, for example, AP1 2412 may use channel 48, AP2 2414 may use channel 64, AP3 2416 may use channel 52, and AP4 2418 may use channel 56.

Intra-BSS COBRA F-CSMA may be provided. A COBRA AP may use fractional CSMA, e.g., when the AP senses the interference from other overlapping BSSs. COBRA F-CSMA may provide user grouping. The COBRA AP may divide the users into center group and edge group. The COBRA AP may request the STAs to provide feedback regarding one or more of the received RSSI, SNR, or SINR. The AP may use the received feedback information to perform grouping. The COBRA AP may request the STAs to provide transmit power and necessary processing margin so that the AP may calculate the SINR for each STA using the uplink traffic. The AP may use the transmit power and necessary processing margin information to perform grouping. The COBRA AP may request the STAs to report necessary grouping measurements, e.g., by sending the COBRA F-CSMA Grouping Request frame. The STAs may reply with a COBRA F-CSMA Grouping Response frame.

Maintenance of the COBRA F-CSMA group may be provided. For example, the AP may not know the necessary information to assign the STA a group. The AP may treat the STA as a member of edge group until the AP gets enough grouping information. The AP may request one or more STAs to perform grouping algorithm, e.g., if the AP discovers that the current group for the STAs may not be suitable. The AP may broadcast and/or multicast a COBRA F-CSMA Grouping Request frame to STAs that may be requested or may request to perform grouping procedure. The AP may repeat the frame on each of the sub-channels with transmit power control. The AP may assign different time slots for the two groups of STAs to feedback the COBRA F-CSMA Grouping Response frame. The STAs, e.g., according to their current group may use the corresponding time slot to feedback the frame. A STA may request the AP to check whether the STA may move to another group by sending necessary information to the AP.

When the COBRA F-CSMA grouping is assigned, the AP may announce the grouping information in a COBRA Parameter Set element. The COBRA Parameter Set element may be transmitted via one of a beacon frame, a probe response frame, an association authentication frame, or a reassociation response frame.

A COBRA AP may perform COBRA F-CSMA. The AP may allocate one or more sub-channels available to the BSS to the users in a center group. The AP may coordinate with OBSS STAs and assign one or more sub-channel(s) to the edge group users to limit the interference. For users that may join the BSS with no assigned group, the AP may treat them temporally as edge group users, and assign the edge group sub-channels.

COBRA may allow the STAs to transmit uplink transmission request through one or more sub-channels, e.g., using random access scheme. The COBRA AP may assign one or more sub-channel(s) for uplink random access sub-channel(s). Each of the associated STAs may request for uplink resource allocation. In COBRA F-CSMA, the COBRA AP may allocate the one or more edge group sub-channels for uplink random access sub-channels for each of the users. One or more (e.g., two) groups of users may be scheduled using different sub-channels for uplink random access. The One or more (e.g., two) groups of users may perform the uplink random access (e.g., simultaneously) on the same time slot, or on different time slots.

A COBRA AP may have COBRA channel access and CSMA channel access. Within COBRA channel access period, COBRA F-CSMA may be performed as described herein. Within CSMA channel access period, the COBRA AP may determine whether F-CSMA is utilized. If F-CSMA is utilized, the COBRA AP may use time/frequency domain F-CSMA (e.g., as described herein), or the COBRA AP may transmit to one or more groups using different power control algorithms and CCA thresholds.

Inter-BSS COBRA F-CSMA may be provided. Co-channel or overlapping BSSs may coordinate and perform COBRA F-CSMA. Systems, methods, and instrumentalities used to coordinate between OBSSs are herein described.

One or more distributed methods of inter-BSS COBRA F-CSMA may be provided. Distributed systems, methods, and instrumentalities to begin and/or to join a COBRA F-CSMA cluster may be provided. The COBRA AP may begin a COBRA F-CSMA cluster by sending out the COBRA F-CSMA transmission request frame to one or more neighboring OBSS COBRA APs, e.g., if a COBRA AP does not detect any COBRA F-CSMA information element in the neighboring OBSS APs. The COBRA F-CSMA transmission request frame may be transmitted on one or more of each of the sub-channels the AP may operates on. The transmission request frame may be encoded and modulated on each sub-channels (e.g., independently modulated), and repeated with or without phase rotation on each of the sub-channels, such that other APs operating on partially overlapped BSS may decode the packet. The COBRA AP may begin the COBRA F-CSMA transmission after sending the transmission request frame. The COBRA AP may include a COBRA F-CSMA information element, e.g., in a Beacon frame to announce the COBRA F-CSMA transmission periodically. The COBRA CSMA information element may be updated, e.g., when a new AP joins the transmission or an existing AP leaves the transmission cluster.

The COBRA APs that may receive the COBRA F-CSMA transmission request frame, and may participate in the COBRA F-CSMA transmission, may reply with a COBRA F-CSMA transmission reply frame. The COBRA APs that may miss the COBRA F-CSMA transmission request frame, but may receive the COBRA F-CSMA information element from other COBRA APs may send a COBRA F-CSMA transmission reply frame to the COBRA F-CSMA cluster. The COBRA F-CSMA information element may be included in a Beacon frame.

The COBRA AP may perform one or more of the following actions, e.g., if a COBRA AP attempts to initiate COBRA F-CSMA transmission and each of the edge sub-channels it may utilize are used by neighboring COBRA APs. The COBRA AP may send a COBRA F-CSMA negotiation frame to one or more COBRA APs that may occupy the potential edge sub-channel the inquiring COBRA AP intends to utilize and check whether inquired COBRA APs may use other edge sub-channels. The COBRA AP may share one edge sub-channel with one or more of neighboring COBRA APs. The COBRA AP may send a COBRA F-CSMA common edge sub-channel frame to those COBRA AP(s) that may utilize the same edge sub-channel. The COBRA APs that share the same edge sub-channel may utilize extra protection mechanisms, e.g., RTS/CTS, CTS-to-self, backoff procedures, etc. for each of the edge group users (e.g., group uses using schedule based COBRA channel access period). The COBRA AP may not join the COBRA F-CSMA transmission, and may use extra protection mechanisms, e.g., RTS/CTS, CTS-to-self, backoff procedures, etc. for each of the edge group users (e.g., group uses using schedule based COBRA channel access period).

The COBRA AP may start and/or join a COBRA F-CSMA transmission. The COBRA AP may sense heavy interference from OBSSs. The sensing of heavy interference may be performed by monitoring the energy of OBSSs, the channel or sub-channel occupation of OBSSs, etc. The COBRA AP may set up a threshold to determine whether the interference is severe enough to switch to COBRA F-CSMA transmissions. The COBRA AP may receive a COBRA F-CSMA transmission request frame, and the COBRA AP may sense heavy interference from OBSS. The COBRA AP may decide to join the COBRA F-CSMA transmission.

The maintenance of COBRA F-CSMA clusters may be provided. A COBRA AP may leave a cluster by sending out a COBRA F-CSMA termination frame. The COBRA AP that sends the COBRA F-CSMA termination frame may cease to transmit the COBRA F-CSMA information element. The COBRA AP may transmit one more beacons with COBRA F-CSMA information element with updated information. The other COBRA APs in the cluster may update the COBRA F-CSMA information element, and transmit the updated COBRA F-CSMA information element in a Beacon frame.

Centralized systems, methods, and instrumentalities to begin and/or to join a COBRA F-CSMA cluster may be provided. A COBRA AP may begin a COBRA F-CSMA cluster by sending out the COBRA F-CSMA transmission request frame to one or more neighboring OBSS COBRA APs, e.g., if the COBRA AP does not detect any COBRA F-CSMA information element in the neighboring OBSS APs. With a centralized system, the AP may designate itself the COBRA F-CSMA cluster head. In other cases, a dedicated centralized controller may be designated as a COBRA F-CSMA cluster head. The COBRA F-CSMA transmission request frame may be transmitted on some or each of the sub-channels the AP may operate on. The frame may be encoded and modulated (e.g., independently modulated) on each sub-channels. The frame may be repeated with or without phase rotation on each of the sub-channels such that other APs operating on partially overlapped BSS may decode the packet. The COBRA AP may begin the COBRA F-CSMA transmission after sending the COBRA F-CSMA transmission request frame. The COBRA AP may include a COBRA F-CSMA information element in a Beacon frame to announce (e.g., periodically announce) the COBRA F-CSMA transmission. The COBRA F-CSMA information element may be updated, e.g., when an AP (e.g., a new AP) may join the transmission cluster or an existing AP may leave the transmission cluster. With Centralized system, the cluster head may schedule the COBRA F-CSMA reply frames for other OBSS APs explicitly in the COBRA F-CSMA transmission request frame. The cluster head may poll next scheduled AP, e.g., when it receives a COBRA F-CSMA transmission reply frame.

A COBRA F-CSMA cluster head may transmit COBRA F-CSMA transmission request frame, e.g., after creating the cluster. The cluster head may broadcast COBRA F-CSMA transmission request frame after creating the cluster so that the APs not in the cluster may decide to join the cluster when the cluster formed. The COBRA APs that may receive the COBRA F-CSMA transmission request frame may reply with a COBRA F-CSMA transmission reply frame. The replying COBRA APs may indicate to the cluster head whether the APs may join the COBRA F-CSMA cluster. The COBRA APs that may miss the COBRA F-CSMA transmission request frame, but may receive the COBRA F-CSMA information element from other COBRA APs may send a COBRA F-CSMA transmission reply frame to the COBRA F-CSMA cluster head to request to join the cluster.

Once the cluster head receives the COBRA F-CSMA transmission reply frame, it may perform one or more of the following actions. The cluster head may reply with a COBRA F-CSMA assignment frame to assign an edge sub-channel to the AP. The cluster head may decline the AP to join the cluster by indicating that in the COBRA F-CSMA assignment frame. The cluster head may update the COBRA F-CSMA information element transmitted in the Beacon frame by adding the new cluster member and corresponding edge sub-channel. The cluster head may not modify the COBRA F-CSMA information element, e.g., if the cluster head declines the AP to join the cluster. Other member APs may or may not transmit the COBRA F-CSMA information element in beacon frames.

The maintenance of a COBRA F-CSMA cluster in a centralized system may be provided. A cluster member AP may leave the cluster by sending out a COBRA F-CSMA termination frame to the cluster head AP. The cluster head AP may reply with a COBRA F-CSMA termination confirmation frame to the member AP and update the COBRA F-CSMA information element in Beacon frames. The other COBRA APs in the cluster may update the COBRA F-CSMA information element accordingly.

A frame and/or an information element for COBRA F-CSMA transmission may be provided. For example, a COBRA F-CSMA transmission request frame may include one or more of a COBRA F-CSMA cluster ID (e.g., used to indicate the COBRA cluster identification), one or more members of APs in the cluster, one or more operation channels and sub-channels of each member AP, one or more edge sub-channel(s) of each member AP, or indication of a distributed cluster or a centralized cluster.

COBRA F-CSMA transmission reply frame may be provided. For example, the COBRA F-CSMA transmission reply frame may include a COBRA F-CSMA cluster ID (e.g., used to indicate the COBRA cluster identification), one or more operation channels and sub-channels of the transmitting AP, or one or more suggested edge sub-channel(s) of the transmitting AP.

COBRA F-CSMA information element may be provided. COBRA F-CSMA information element may include one or more of a COBRA F-CSMA cluster ID (e.g., used to indicate the COBRA cluster identification), one or more members of APs in the cluster one or more operation channels and sub-channels of each member AP, one or more edge sub-channel(s) of each member AP, or indication of a distributed cluster or a centralized cluster.

COBRA F-CSMA termination frame may be provided. The COBRA F-CSMA termination frame may include a COBRA F-CSMA cluster ID (e.g., used to indicate the COBRA cluster identification), one or more operation channels and sub-channels of the transmitting AP, or one or more edge sub-channel(s) of the transmitting AP.

COBRA F-CSMA termination confirmation frame may be provided. The COBRA F-CSMA termination confirmation frame may include a COBRA F-CSMA cluster ID (e.g., used to indicate the COBRA cluster identification), one or more updated members of APs in the cluster, one or more updated operation channels and sub-channels of each member AP, one or more updated edge sub-channel(s) of each member AP, or an indication of a distributed cluster or a centralized cluster.

Time/Frequency Domain based Fractional CSMA/CA may be provided. Time based F-CSMA/CA and frequency based F-CSMA/CA are described herein. The time based F-CSMA/CA and frequency based F-CSMA/CA may be combined to allow separation of the BSS edge STAs, e.g., by a combination of time and frequency. The grouping of cell center and cell edge STAs may be similar to the time and/or frequency based F-CSMA/CA.

One or more APs may coordinate to allow access of each to the pool of STAs performing CSMA/CA based on the BSS index. As illustrated by example in FIG. 18, Group 1 may be placed in the active CSMA/CA pool, Group 2 and Group 3 may be placed in the active CSMA/CA pool in a coordinated manner during specific time slots and frequency bands. The grouping may be combined with transmit power control (TPC) to limit interference. The coordination may be such that Group 2 and Group 3 are in orthogonal pools, e.g., when Group 2 is in the pool, and Group 3 is not. The coordination may be such that Group 2 and Group 3 are in partially orthogonal pools, e.g., Group 2 and Group 3 are in the pool based on a desired orthogonality factor (f) where $0 <= f <= 1$ and $f=0$ implies fully orthogonal while $f=1$ implies no orthogonality.

The transmit power may be adjusted based on the group in the active CSMA/CA pool. The maximum transmit power is important as this determines the power at which control frames needed by each of the STAs may be sent. If Group 1 is in the pool, the maximum transmit power may be limited to the worst STA in the limited group, e.g., the STA that requires the maximum transmit power in group 1. The maximum transmit power may be used for data frames and/or control frames. If each of the STAs are in the pool, the maximum transmit power may be limited to the worst STA in the BSS, e.g., the STA that requires the maximum transmit power in the BSS. The inter-BSS methods described herein may be used for Time/Frequency Doman based F-CSMA/CA.

Priority-adaptation based CSMA/CA may be provided. For example, priority adaptation of CSMA-CA may be based on the geo-location and/or the distances from the AP a STA is associated with and other OBSS APs. The priority adaptation of CSMA-CA may be based on the effect of the channel (path loss, and long term/short term channel variations such as shadowing and fast fading) of the STA. When TPC is enabled, a STA may transmit at higher power, e.g., if the STA is far away from AP it may be associated with. The STA may affect the OBSS traffic. The channel access priority of the STA may be reduced when the STA is closer to an OBSS AP. The STA may continue to operate at highest priority level, e.g., if no OBSS AP is present.

Figure 25:
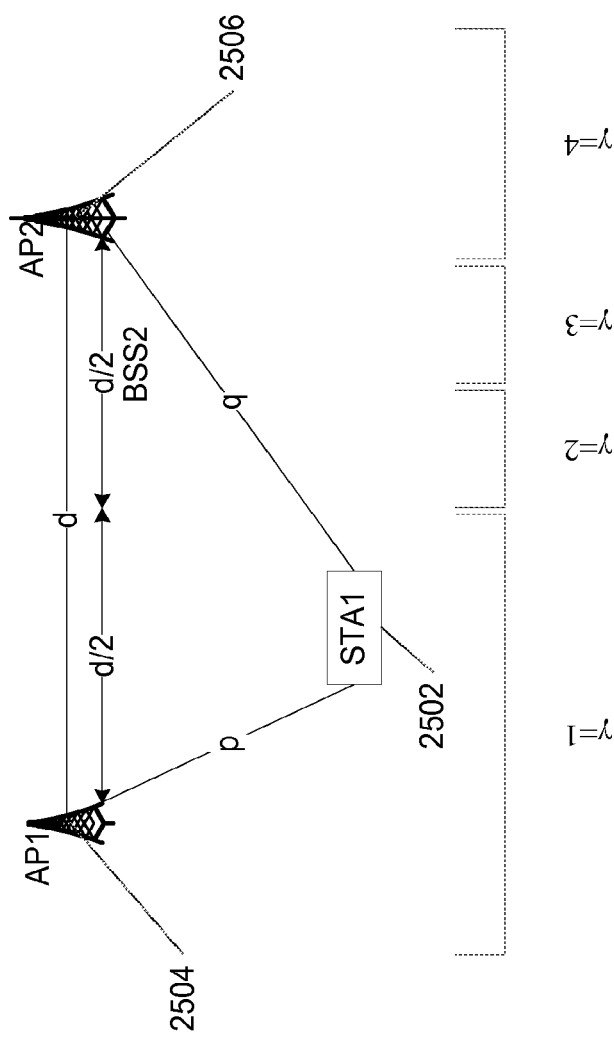
FIG. 25 illustrates an example of a priority adaptation based on distance of a STA from two APs.

FIG. 25 illustrates an example of a priority adaptation based on distance of a STA (e.g., STA1 2502) from one or more APs (e.g., AP1 2504 and AP2 2506). As illustrated by example in FIG. 25, a STA1 may be associated with AP1 2504 and AP2 2506 may be the neighboring AP (e.g., not part of same BSS as AP1). The distance between STA1 2502 and AP1 2504, e.g., is p. The distance between STA1 2502 and AP2 2506 is, e.g., q. The Priority Y may be a function of distances p and q (e.g., Y(p, q)). The priority may be a function of the path loss and shadow fading. The AP1 may be assigned higher priority (e.g., lower numeric value of Y, or higher probability of acquiring the medium, while transmitting at relatively lower power), e.g., if the STA1 2502 is close to AP1 2504. When STA1 2502 moves away from AP1 2504 and closer to AP2 2506, the STA1 2502 may start interfering with the traffic of AP2 2506. The priority of STA1 2502 may be reduced (e.g., lower numeric value of Y and reducing the higher probability of acquiring the medium, when transmitting at much higher power). This function may be continuous, discrete and/or conditional.

For example, a discrete function may represented as:

$$\Upsilon(p, q) = \text{ceil}\left(\frac{p}{q}\right).$$

An example of a conditional non-linear function may be represented as:

$$\Upsilon(p, q) = \begin{cases} 1, & \frac{p}{q} < 1 \\ 2, & 1 < \frac{p}{q} < 2 \\ 3, & 2 < \frac{p}{q} < 4 \\ 4, & \frac{p}{q} > 4 \end{cases}$$

As illustrated in FIG. 25, when the STA1 2502 is closer to AP1 2504 than AP2 2506, the STA1 2502 may have highest priority level Y(p, q)=1. When the STA1 is closer to AP2 2506 than AP1 2504, the priority level of the STA1 2502 may be reduced (e.g., Y(p, q)=2, Y(p, q)=3), etc.

For different Y(p, q) value, different aCWmax and aCWmin may be selected. Table 1 illustrates an example of Y(p, q) values and corresponding CWmin[ac] and CWmax [ac] values, where ac may be an access category.

TABLE 1

| Y (p, q) | aCWmin | aCWmax |
|---|---|---|
| 1 | 15 | 1023 |
| 2 | 31 | 2047 |
| 3 | 63 | 4095 |
| 4 | 127 | 8191 |

As illustrated in Table 1, a change in the Y(p, q) value may result in change in the CWmin[ac] and CWmax[ac] values.

In case of more OBSS APs in the vicinity, the distance from each of the APs may be computed. For example, if the distance between a STA and an associated AP is p and the distances from each of the OBSS APs are $\vec{q}=[q_1 \ldots q_n]$. The priority for each pair $Y_i(p, q_i)$ may be computed (e.g., independently computed). The max(Yi) or ceil(avg(Yi)) may be used as final priority for the transmission.

Figure 26:
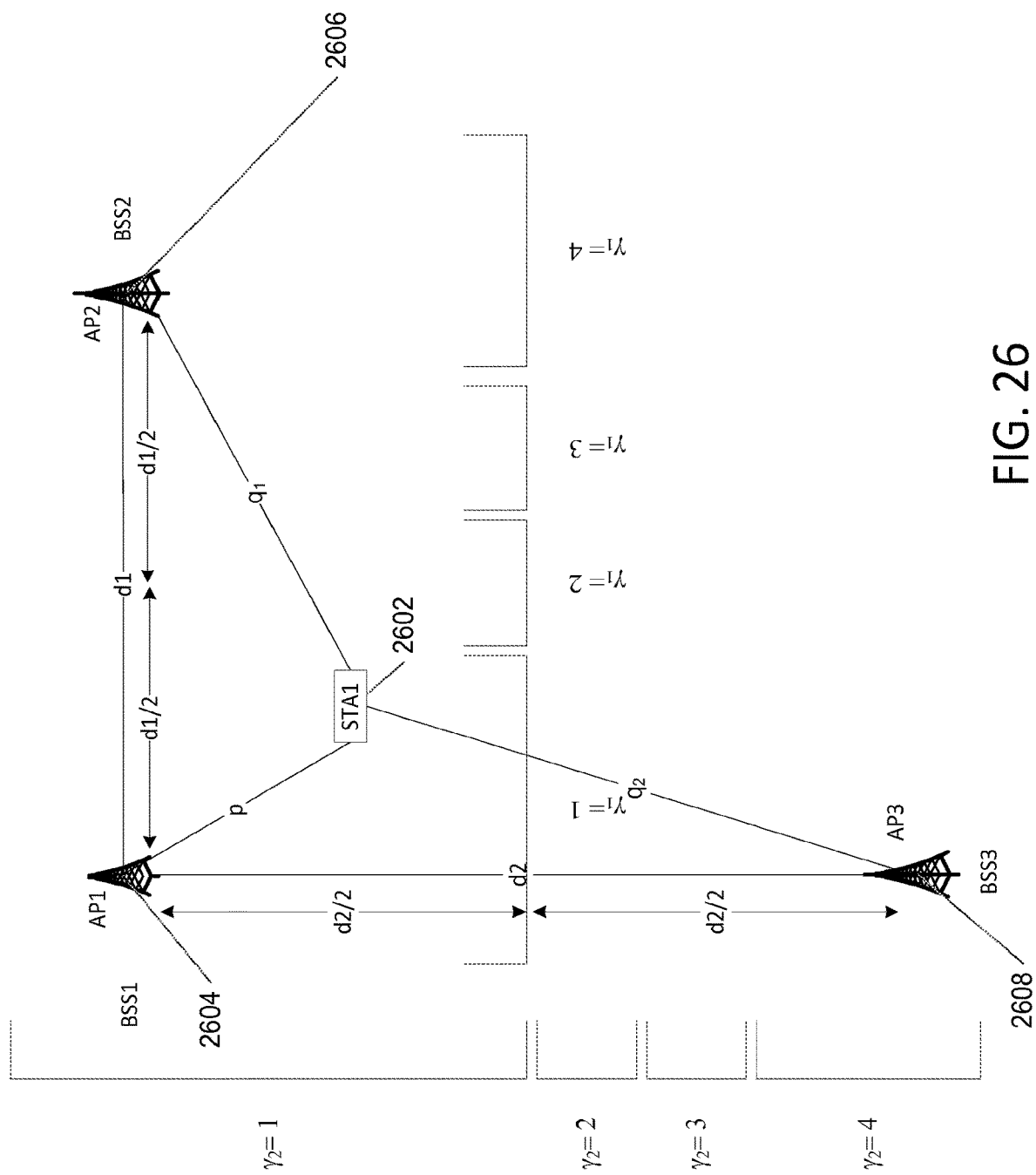
FIG. 26 illustrates an example of a priority adaptation based on distance of a STA from three APs.

FIG. 26 illustrates an example of priority adaptation based on distance of three APs. As illustrate in FIG. 26, out of the three APs (e.g., AP1 2604, AP2 2606 and AP3 2608), the STA STA1 2602 may be in BSS1 and associated with AP1 2604. The two nearby APs may be AP2 2606 and AP3 2608. In OBSS scenario, an AP (e.g., AP1) may compute the STA1's priority based on the other nearby AP (e.g., AP2 and/or AP3). The AP may compute the priority ($Y_1$ and $Y_2$) based on distances from other APs and ($q_1$ and $q_2$) independently and take max out of them or ceiling of average. A function $Y(p, \vec{q})$ that jointly optimizes the priority based the distance vector $\vec{q}$ also may be used.

The RSSI measured during beacon from respective APs may be used as an indicator of distance from that AP and may be a linear function of distance from AP. The RSSI may be used instead of distances p and q for the computation of priority as mentioned above. Change in priority level may depend on distance, e.g., when power control is used. A STA may be closer to OBSS AP, e.g., if STA is associated with an AP that is far away from the STA. The STA may affect the traffic of OBSS, e.g., if the STA uses higher power to communicate with the AP it may be associated with. The priority of STA may be reduced, e.g., depending on the distance from AP the STA is associated with. The algorithm used for computation of priority on each of the APs may be enhanced, e.g., if GPS support is available and/or physical location of each of the AP is known.

The computation described herein may be performed at the STA and priority value may be set at STA. The computation may be performed at the AP and the AP may indicate the priority value to the STAs associated with the AP, e.g., using a management frame. The STA may set its priority based on the received priority value and change its contention window values aCWMax and aCWMin accordingly.

Figure 27A:
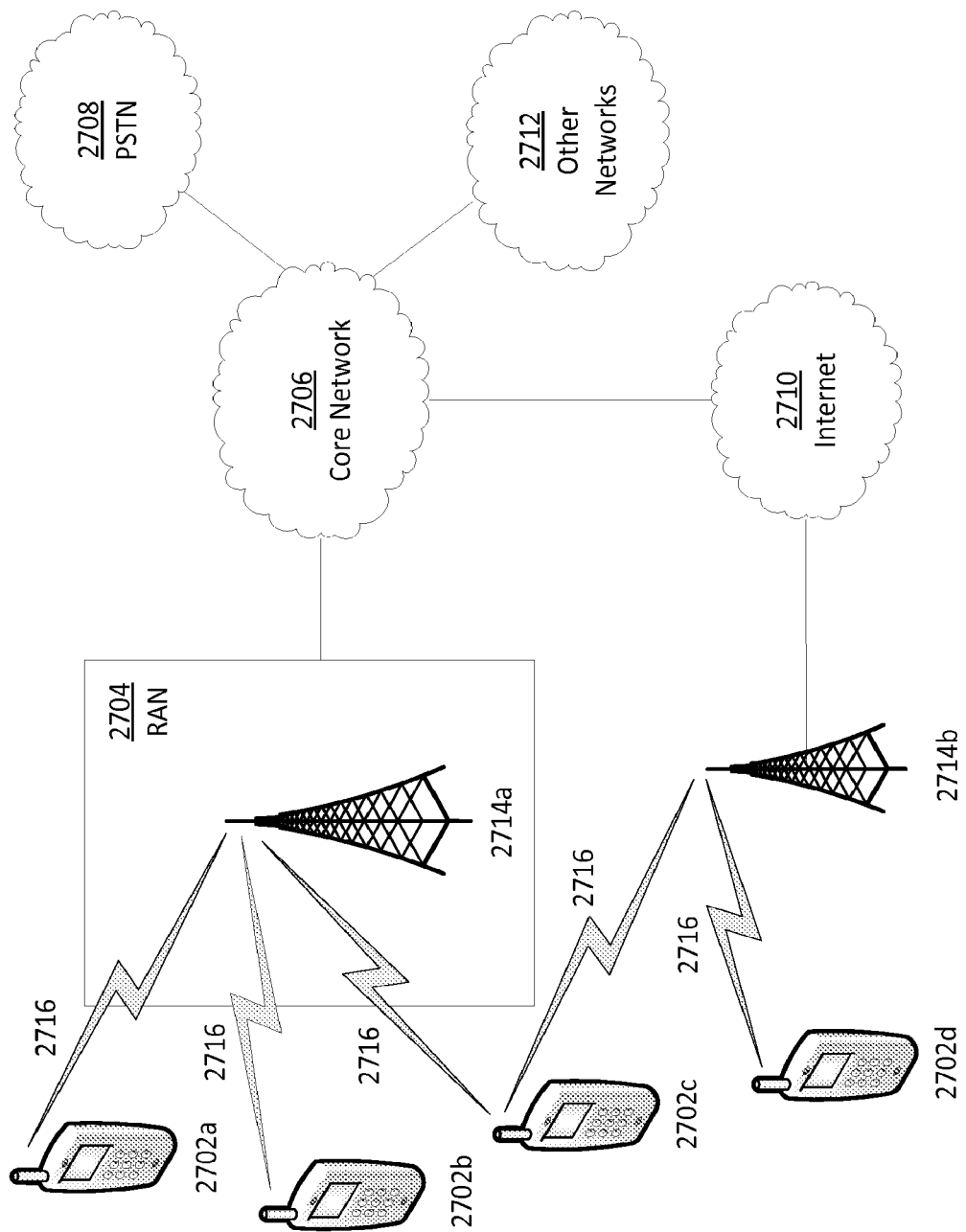
FIG. 27A is a system diagram of an example communications system in which one or more disclosed embodiments may be implemented.

FIG. 27A is a diagram of an example communications system 2700 in which one or more disclosed embodiments may be implemented. The communications system 2700 may be a multiple access system that provides content, such as voice, data, video, messaging, broadcast, etc., to multiple wireless users. The communications system 2700 may enable multiple wireless users to access such content through the sharing of system resources, including wireless bandwidth. For example, the communications systems 2700 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 27A, the communications system 2700 may include at least one wireless transmit/receive unit (WTRU), such as a plurality of WTRUs, for instance WTRUs 2702a, 2702b, 2702c, and 2702d, a radio access network (RAN) 2704, a core network 2706, a public switched telephone network (PSTN) 2708, the Internet 2710, and other networks 2712, though it should be appreciated that the disclosed embodiments contemplate any number of WTRUs, base stations, networks, and/or network elements. Each of the WTRUs 2702a, 2702b, 2702c, 2702d may be any type of device configured to operate and/or communicate in a wireless environment. By way of example, the WTRUs 2702a, 2702b, 2702c, 2702d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 2700 may also include a base station 2714a and a base station 2714b. Each of the base stations 2714a, 2714b may be any type of device configured to wirelessly interface with at least one of the WTRUs 2702a, 2702b, 2702c, 2702d to facilitate access to one or more communication networks, such as the core network 2706, the Internet 2710, and/or the networks 2712. By way of example, the base stations 2714a, 2714b may be a base transceiver station (BTS), a Node-B, an eNode B, a Home Node B, a Home eNode B, a site controller, an access point (AP), a wireless router, and the like. While the base stations 2714a, 2714b are each depicted as a single element, it should be appreciated that the base stations 2714a, 2714b may include any number of interconnected base stations and/or network elements.

The base station 2714a may be part of the RAN 2704, which may also include other base stations and/or network elements (not shown), such as a base station controller (BSC), a radio network controller (RNC), relay nodes, etc. The base station 2714a and/or the base station 2714b may be configured to transmit and/or receive wireless signals within a particular geographic region, which may be referred to as a cell (not shown). The cell may further be divided into cell sectors. For example, the cell associated with the base station 2714a may be divided into three sectors. Thus, in one embodiment, the base station 2714a may include three transceivers, e.g., one for each sector of the cell. In another embodiment, the base station 2714a may employ multiple-input multiple output (MIMO) technology and, therefore, may utilize multiple transceivers for each sector of the cell.

The base stations 2714a, 2714b may communicate with one or more of the WTRUs 2702a, 2702b, 2702c, 2702d over an air interface 2716, which may be any suitable wireless communication link (e.g., radio frequency (RF), microwave, infrared (IR), ultraviolet (UV), visible light, etc.). The air interface 2716 may be established using any suitable radio access technology (RAT).

More specifically, as noted above, the communications system 2700 may be a multiple access system and may employ one or more channel access schemes, such as CDMA, TDMA, FDMA, OFDMA, SC-FDMA, and the like. For example, the base station 2714a in the RAN 2704 and the WTRUs 2702a, 2702b, 2702c may implement a radio technology such as Universal Mobile Telecommunications System (UMTS) Terrestrial Radio Access (UTRA), which may establish the air interface 2716 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 2714a and the WTRUs 2702a, 2702b, 2702c may implement a radio technology such as Evolved UMTS Terrestrial Radio Access (E-UTRA), which may establish the air interface 2716 using Long Term Evolution (LTE) and/or LTE-Advanced (LTE-A).

In other embodiments, the base station 2714a and the WTRUs 2702a, 2702b, 2702c may implement radio technologies such as IEEE 802.16 (e.g., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 1314b in FIG. 27A may comprise a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 2714b and the WTRUs 2702c, 2702d may implement a radio technology such as IEEE 802.11 to establish a wireless local area network (WLAN). In another embodiment, the base station 2714b and the WTRUs 2702c, 2702d may implement a radio technology such as IEEE 802.15 to establish a wireless personal area network (WPAN). In yet another embodiment, the base station 2714b and the WTRUs 2702c, 2702d may utilize a cellular-based RAT (e.g., WCDMA, CDMA2000, GSM, LTE, LTE-A, etc.) to establish a picocell or femtocell. As shown in FIG. 27A, the base station 2714b may have a direct connection to the Internet 2710. Thus, the base station 2714b may not be required to access the Internet 2710 via the core network 2706.

The RAN 2704 may be in communication with the core network 2706, which may be any type of network configured to provide voice, data, applications, and/or voice over internet protocol (VoIP) services to one or more of the WTRUs 2702a, 2702b, 2702c, 2702d. For example, the core network 2706 may provide call control, billing services, mobile location-based services, pre-paid calling, Internet connectivity, video distribution, etc., and/or perform high-level security functions, such as user authentication. Although not shown in FIG. 27A, it should be appreciated that the RAN 2704 and/or the core network 2706 may be in direct or indirect communication with other RANs that employ the same RAT as the RAN 2704 or a different RAT. For example, in addition to being connected to the RAN 2704, which may be utilizing an E-UTRA radio technology, the core network 2706 may also be in communication with another RAN (not shown) employing a GSM radio technology.

The core network 2706 may also serve as a gateway for the WTRUs 2702a, 2702b, 2702c, 2702d to access the PSTN 2708, the Internet 2710, and/or other networks 2712. The PSTN 2708 may include circuit-switched telephone networks that provide plain old telephone service (POTS). The Internet 2710 may include a global system of interconnected computer networks and devices that use common communication protocols, such as the transmission control protocol (TCP), user datagram protocol (UDP) and the internet protocol (IP) in the TCP/IP internet protocol suite. The networks 2712 may include wired or wireless communications networks owned and/or operated by other service providers. For example, the networks 2712 may include another core network connected to one or more RANs, which may employ the same RAT as the RAN 2704 or a different RAT.

Some or all of the WTRUs 2702a, 2702b, 2702c, 2702d in the communications system 2700 may include multi-mode capabilities, e.g., the WTRUs 2702a, 2702b, 2702c, 2702d may include multiple transceivers for communicating with different wireless networks over different wireless links. For example, the WTRU 2702c shown in FIG. 27A may be configured to communicate with the base station 2714a, which may employ a cellular-based radio technology, and with the base station 2714b, which may employ an IEEE 802 radio technology.

Figure 27B:
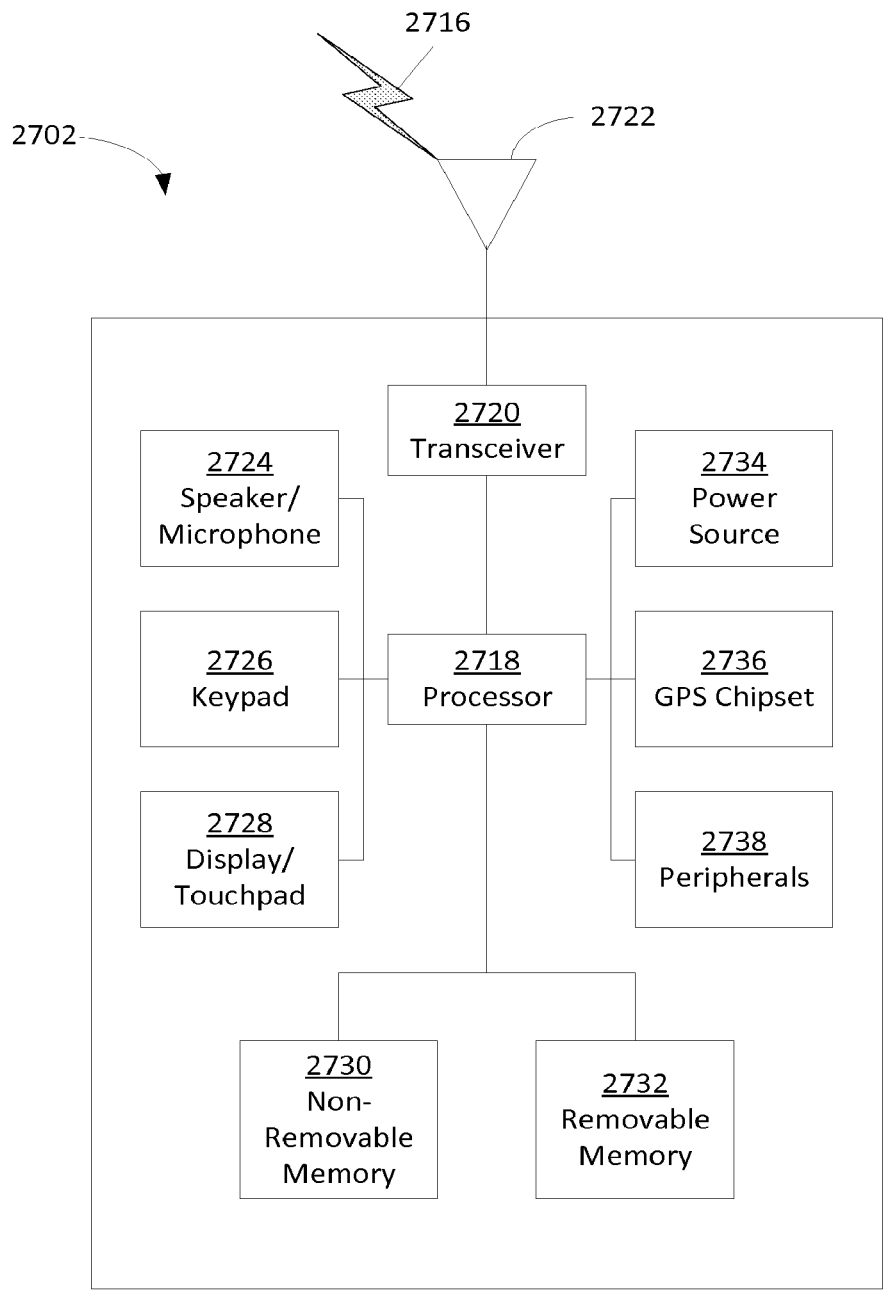
FIG. 27B is a system diagram of an example wireless transmit/receive unit (WTRU) that may be used within the communications system illustrated in FIG. 27A.

FIG. 27B is a system diagram of an example WTRU 2702. As shown in FIG. 27B, the WTRU 2702 may include a processor 2718, a transceiver 2720, a transmit/receive element 2722, a speaker/microphone 2724, a keypad 2726, a display/touchpad 2728, non-removable memory 2730, removable memory 2732, a power source 2734, a global positioning system (GPS) chipset 2736, and other peripherals 2738. It should be appreciated that the WTRU 2702 may include any sub-combination of the foregoing elements while remaining consistent with an embodiment.

The processor 2718 may comprise a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 2718 may perform signal coding, data processing, power control, input/output processing, and/or any other functionality that enables the WTRU 2702 to operate in a wireless environment. The processor 2718 may be coupled to the transceiver 2720, which may be coupled to the transmit/receive element 2722. While FIG. 27B depicts the processor 2718 and the transceiver 2720 as separate components, it should be appreciated that the processor 2718 and the transceiver 2720 may be integrated together in an electronic package or chip.

The transmit/receive element 2722 may be configured to transmit signals to, or receive signals from, a base station (e.g., the base station 2714a) over the air interface 2716. For example, in one embodiment, the transmit/receive element 2722 may be an antenna configured to transmit and/or receive RF signals. In another embodiment, the transmit/receive element 2722 may be an emitter/detector configured to transmit and/or receive IR, UV, or visible light signals, for example. In yet another embodiment, the transmit/receive element 2722 may be configured to transmit and receive both RF and light signals. It should be appreciated that the transmit/receive element 2722 may be configured to transmit and/or receive any combination of wireless signals.

In addition, although the transmit/receive element 2722 is depicted in FIG. 27B as a single element, the WTRU 2702 may include any number of transmit/receive elements 2722. More specifically, the WTRU 2702 may employ MIMO technology. Thus, in one embodiment, the WTRU 2702 may include two or more transmit/receive elements 2722 (e.g., multiple antennas) for transmitting and receiving wireless signals over the air interface 2716.

The transceiver 2720 may be configured to modulate the signals that are to be transmitted by the transmit/receive element 2722 and to demodulate the signals that are received by the transmit/receive element 2722. As noted above, the WTRU 2702 may have multi-mode capabilities. Thus, the transceiver 2720 may include multiple transceivers for enabling the WTRU 2702 to communicate via multiple RATs, such as UTRA and IEEE 802.11, for example.

The processor 2718 of the WTRU 2702 may be coupled to, and may receive user input data from, the speaker/microphone 2724, the keypad 2726, and/or the display/touchpad 2728 (e.g., a liquid crystal display (LCD) display unit or organic light-emitting diode (OLED) display unit). The processor 2718 may also output user data to the speaker/microphone 2724, the keypad 2726, and/or the display/touchpad 2728. In addition, the processor 2718 may access information from, and store data in, any type of suitable memory, such as the non-removable memory 2730 and/or the removable memory 2732. The non-removable memory 2730 may include random-access memory (RAM), read-only memory (ROM), a hard disk, or any other type of memory storage device. The removable memory 2732 may include a subscriber identity module (SIM) card, a memory stick, a secure digital (SD) memory card, and the like. In other embodiments, the processor 2718 may access information from, and store data in, memory that is not physically located on the WTRU 2702, such as on a server or a home computer (not shown).

The processor 2718 may receive power from the power source 2734, and may be configured to distribute and/or control the power to the other components in the WTRU 2702. The power source 2734 may be any suitable device for powering the WTRU 2702. For example, the power source 2734 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 2718 may also be coupled to the GPS chipset 2736, which may be configured to provide location information (e.g., longitude and latitude) regarding the current location of the WTRU 2702. In addition to, or in lieu of, the information from the GPS chipset 2736, the WTRU 2702 may receive location information over the air interface 2716 from a base station (e.g., base stations 2714a, 2714b) and/or determine its location based on the timing of the signals being received from two or more nearby base stations. It should be appreciated that the WTRU 2702 may acquire location information by way of any suitable location-determination method while remaining consistent with an embodiment.

The processor 2718 may further be coupled to other peripherals 2738, which may include one or more software and/or hardware modules that provide additional features, functionality and/or wired or wireless connectivity. For example, the peripherals 2738 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Although features and elements are described above in particular combinations, one of ordinary skill in the art will appreciate that each feature or element may be used alone or in any combination with the other features and elements. Other than the 802.11 protocols described herein, the features and elements described herein may be applicable to other wireless systems. Although the features and elements described herein may have been described for uplink operation, the methods and procedures may be applied to downlink operation. Although SIFS may have been used herein to indicate various inter frame spacing, other inter frame spacing, e.g., RIFS or other agreed time interval may be applied. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, optical media such as CD-ROM disks, and digital versatile disks (DVDs). A processor in association with software may be used to implement a radio frequency transceiver for use in a WTRU, WTRU, terminal, base station, RNC, or any host computer.

What is claimed:
1. A first access point (AP) comprising:
a processor; and
a transceiver, wherein:
the processor and the transceiver are configured to transmit, to a second AP, first allocation information for a first group of stations (STAs) associated with the first AP;

the processor and the transceiver are configured to receive, from the second AP, second allocation information for a second group of STAs associated with the second AP; and the processor and the transceiver are configured to determine channel access and allocate channel resources for the first group of STAs based on the first allocation information and the second allocation information.

2. The first AP of claim 1, wherein the first group of STAs include edge STAs and a third group of STAs associated with the first AP include non-edge STAs.

3. The first AP of claim 1, wherein the processor and the transceiver are configured to allocate channel resources for the first group of STAs by allocating sub-channels.

4. The first AP of claim 1, wherein the processor and the transceiver are configured to determine channel access such that the first group of STAs have channel access during a first time period and a third group of STAs associated with the first AP do not have channel access during the first time period.

5. The first AP of claim 1, wherein the processor and the transceiver are configured to determine channel access such that the first group of STAs have channel access during a first time period and the first group of STAs do not have channel access during a second time period.

6. The first AP of claim 1, wherein the processor and the transceiver are configured to determine channel access such that the first group of STAs have channel access during any time period not designated for beacon frame transmission by the first AP.

7. The first AP of claim 1, wherein the first AP and the first group of STAs are associated with a first base service set (BSS) and the second AP and the second group of STAs are associated with a second BSS.

8. A method performed by a first access point (AP) comprising:

transmitting, to a second AP, first allocation information for a first group of stations (STAs) associated with the first AP;

receiving, from the second AP, second allocation information for a second group of STAs associated with the second AP; and determining channel access and allocating channel resources for the first group of STAs based on the first allocation information and the second allocation information.

9. The method of claim 8, wherein the first group of STAs include edge STAs and a third group of STAs associated with the first AP include non-edge STAs.

10. The method of claim 8, wherein the channel resources are allocated for the first group of STAs by allocating sub-channels.

11. The method of claim 8, wherein the channel access is determined such that the first group of STAs have channel access during a first time period and a third group of STAs associated with the first AP do not have channel access during the first time period.

12. The method of claim 8, wherein the channel access is determined such that the first group of STAs have channel access during a first time period and the first group of STAs do not have channel access during a second time period.

13. The method of claim 8, wherein the channel access is determined such that the first group of STAs have channel access during any time period not designated for beacon frame transmission by the first AP.

14. The method of claim 8, wherein the first AP and the first group of STAs are associated with a first base service set (BSS) and the second AP and the second group of STAs are associated with a second BSS.

* * * * *